United States Patent
Shin et al.

(10) Patent No.: US 9,348,188 B2
(45) Date of Patent: May 24, 2016

(54) LIQUID CRYSTAL DISPLAY

(71) Applicant: SAMSUNG DISPLAY CO., LTD., Yongin, Gyeonggi-do (KR)

(72) Inventors: Yong-Hwan Shin, Yongin-si (KR); Hwa-Sung Woo, Suwon-si (KR); Kwang-Chul Jung, Seongnam-si (KR); Chong-Chul Chai, Seoul (KR); Mee-Hye Jung, Suwon-si (KR)

(73) Assignee: Samsung Display Co., Ltd. (KR)

( * ) Notice: Subject to any disclaimer, the term of this patent is extended or adjusted under 35 U.S.C. 154(b) by 15 days.

(21) Appl. No.: 14/273,188

(22) Filed: May 8, 2014

(65) Prior Publication Data

US 2014/0247409 A1    Sep. 4, 2014

Related U.S. Application Data

(62) Division of application No. 12/350,698, filed on Jan. 8, 2009, now Pat. No. 8,760,479.

(30) Foreign Application Priority Data

Jun. 16, 2008 (KR) .......... 10-2008-0056321
Jun. 17, 2008 (KR) .......... 10-2008-0057043

(51) Int. Cl.
  *G02F 1/1362*    (2006.01)
  *G09G 3/36*    (2006.01)

(52) U.S. Cl.
  CPC ........ *G02F 1/136286* (2013.01); *G09G 3/3659* (2013.01); *G09G 3/3614* (2013.01);
  (Continued)

(58) Field of Classification Search
  CPC ............... G02F 1/134363; G02F 1/134309;
  G02F 1/136286; G02F 1/136213; G02F 1/13624; G02F 1/136245; G02F 3/0412; G02F 3/044; G02F 2203/04103; G02F 2203/04111; G09G 3/3659; G09G 3/3614; G09G 2300/0434; G09G 2300/0465; G09G 2320/0252; G09G 2320/0257; G09G 2320/028
  USPC ......... 345/87, 204, 208, 694; 349/33, 37, 182
  See application file for complete search history.

(56) References Cited

U.S. PATENT DOCUMENTS

| 5,745,207 | A | 4/1998 | Asada et al. |
| 6,798,466 | B2 * | 9/2004 | Takeichi ........... G02F 1/134336 |
| | | | 257/59 |

(Continued)

FOREIGN PATENT DOCUMENTS

| CN | 1573443 A | 2/2005 |
| CN | 1716067 | 1/2006 |

(Continued)

*Primary Examiner* — Tom Sheng
(74) *Attorney, Agent, or Firm* — Innovation Counsel LLP

(57) ABSTRACT

A liquid crystal display according to an embodiment of the present invention includes: first and second substrates opposed to each other; a liquid crystal layer including liquid crystal molecules interposed between the first and second substrates; a gate line formed on the first substrate and transmitting a gate signal; first and second data lines formed on the first substrate and transmitting first and second data voltages having different polarities; a first switching element connected to the gate line and the first data line; a second switching element connected to the gate line and the second data line; and first and second pixel electrodes that are connected to the first and second switching elements, respectively, and separated from each other, wherein the liquid crystal layer has positive dielectric anisotropy.

7 Claims, 51 Drawing Sheets

(52) U.S. Cl.
CPC .............. *G09G2300/0434* (2013.01); *G09G 2300/0465* (2013.01); *G09G 2320/028* (2013.01); *G09G 2320/0252* (2013.01); *G09G 2320/0257* (2013.01)

(56) References Cited

U.S. PATENT DOCUMENTS

| | | | |
|---|---|---|---|
| 7,403,253 B2 | 7/2008 | Kang | |
| 7,425,940 B2 | 9/2008 | Kawachi | |
| 7,671,930 B2 * | 3/2010 | Lin | G02F 1/13624 349/143 |
| 7,821,609 B2 | 10/2010 | Ootsu et al. | |
| 7,880,845 B2 | 2/2011 | Lee et al. | |
| 8,760,479 B2 * | 6/2014 | Shin | G09G 3/3659 345/204 |
| 2002/0050967 A1 | 5/2002 | Hashimoto et al. | |
| 2004/0246425 A1 | 12/2004 | Ootsu et al. | |
| 2005/0190133 A1 | 9/2005 | Kawachi | |
| 2005/0286003 A1 | 12/2005 | Lee et al. | |
| 2006/0164352 A1 | 7/2006 | Yoo et al. | |
| 2006/0227273 A1 * | 10/2006 | Shin | G02F 1/13624 349/139 |
| 2007/0195027 A1 | 8/2007 | Yang et al. | |
| 2007/0285369 A1 | 12/2007 | Park | |
| 2008/0001873 A1 | 1/2008 | Choi | |
| 2008/0001901 A1 | 1/2008 | Lee | |
| 2008/0024406 A1 | 1/2008 | Kim et al. | |
| 2008/0074601 A1 | 3/2008 | Lee et al. | |
| 2008/0136759 A1 | 6/2008 | Kim | |
| 2008/0238842 A1 | 10/2008 | Yatabe | |
| 2008/0239182 A1 | 10/2008 | Huang et al. | |
| 2008/0266230 A1 | 10/2008 | Lee et al. | |
| 2008/0278651 A1 | 11/2008 | Lee et al. | |
| 2009/0185091 A1 * | 7/2009 | Kim | C09K 19/02 349/39 |
| 2010/0002161 A1 * | 1/2010 | Shin | G02F 1/134363 349/38 |
| 2010/0149475 A1 | 6/2010 | Kim et al. | |
| 2010/0156874 A1 * | 6/2010 | Jung | G02F 1/134363 345/211 |
| 2010/0157185 A1 * | 6/2010 | Kim | G02F 1/1362 349/38 |
| 2010/0225839 A1 | 9/2010 | Kim et al. | |
| 2010/0296015 A1 * | 11/2010 | Kim | G02F 1/134309 349/37 |
| 2010/0302471 A1 * | 12/2010 | Kim | G02F 1/134363 349/37 |
| 2011/0037913 A1 * | 2/2011 | Kim | G09G 3/3659 349/37 |
| 2011/0164198 A1 * | 7/2011 | Shin | G02F 1/13624 349/46 |
| 2011/0215993 A1 * | 9/2011 | Cho | G09G 3/36 345/87 |

FOREIGN PATENT DOCUMENTS

| | | |
|---|---|---|
| CN | 1800930 A | 7/2006 |
| CN | 1806190 A | 7/2006 |
| CN | 1967334 | 5/2007 |
| CN | 100350303 C | 11/2007 |
| CN | 101089684 A | 12/2007 |
| JP | 06-148596 | 5/1994 |
| JP | 07-092504 A | 4/1995 |
| JP | 10-003092 A | 1/1998 |
| JP | 10-062802 | 3/1998 |
| JP | 2001-133808 A | 5/2001 |
| JP | 2003-131636 A | 5/2003 |
| JP | 2003-149664 A | 5/2003 |
| JP | 2003-156754 | 5/2003 |
| JP | 2003-329997 | 11/2003 |
| JP | 2004-163943 A | 6/2004 |
| JP | 2004-301984 | 10/2004 |
| JP | 2005-062882 A | 3/2005 |
| JP | 2005-122173 A | 5/2005 |
| JP | 2006-292854 A | 10/2006 |
| JP | 2006-323280 A | 11/2006 |
| JP | 2006-343697 | 12/2006 |
| JP | 2007-011377 A | 1/2007 |
| JP | 2007-101972 | 4/2007 |
| JP | 2007-140467 A | 6/2007 |
| JP | 2007-156407 A | 6/2007 |
| KR | 1020020002590 A | 1/2002 |
| KR | 1020020077008 A | 10/2002 |
| KR | 1020030038345 A | 5/2003 |
| KR | 1020060072774 A | 6/2006 |
| KR | 1020060077852 A | 7/2006 |
| KR | 1020070118509 A | 12/2007 |
| TW | 200636331 | 10/2006 |

* cited by examiner

LIQUID CRYSTAL DISPLAY

CROSS-REFERENCE TO RELATED APPLICATION

This application is a divisional application of U.S. patent application Ser. No. 12/350,698 filed on Jan. 8, 2009, which claims the benefit of Korean Patent Application Nos. 10-2008-0057043 and 10-2008-0056321 filed in the Korean Intellectual Property Office on Jun. 17, 2008 and Jun. 16, 2008, and all the benefits accruing therefrom under 35 U.S.C. §119, the contents of the prior applications being herein incorporated by reference.

BACKGROUND OF THE INVENTION (a) Field of the Invention

The present invention relates to a liquid crystal display.

(b) Description of the Related Art

A liquid crystal display is one of the most commonly used flat panel displays. The liquid crystal display includes two display panels respectively having electric field generating electrodes such as pixel electrodes and common electrodes formed thereon, and a liquid crystal layer interposed between the two display panels. An electric field is generated in the liquid crystal layer by applying a voltage to the electric field generating electrodes to determine the alignment of liquid crystal molecules of the liquid crystal layer and control the polarization of incident light, thereby displaying an image.

The liquid crystal display also includes a switching element connected to each pixel electrode and a plurality of signal lines such as gate lines, data lines, and the like for applying the voltage to the pixel electrodes by controlling the switching element.

Such a liquid crystal display receives an input image signal from an external graphics controller. The input image signal contains luminance information of each pixel, and each luminance level has a predetermined number. Each luminance level is represented by a data voltage corresponding to desired luminance information. The data voltage applied to the pixel is displayed with a pixel voltage according to a difference of a common voltage. Each pixel displays luminance indicated by the gray of the image signal according to the pixel voltage. At this time, a pixel voltage range that the liquid crystal display can use is determined according to a driver.

Meanwhile, the driver of the liquid crystal display is mounted directly on a display panel in the form of a plurality of integrated circuit chips or is attached to the display panel while being mounted on a flexible circuit membrane. The integrated circuit chips represent a high ratio of the manufacturing cost of the liquid crystal display.

In addition, as the number of wires such as the gate lines or the data lines forming a liquid crystal panel assembly increases, the aperture ratio of the liquid crystal display is remarkably reduced.

The above information disclosed in this Background section is only for enhancement of understanding of the background of the invention and therefore it may contain information that does not form the prior art that is already known in this country to a person of ordinary skill in the art.

SUMMARY OF THE INVENTION

A liquid crystal display according to an embodiment of the present invention includes: first and second substrates opposed to each other; a liquid crystal layer including liquid crystal molecules interposed between the first and second substrates; a gate line formed on the first substrate and transmitting a gate signal; first and second data lines formed on the first substrate and respectively transmitting first and second data voltages having different polarities; a first switching element connected to the gate line and the first data line; a second switching element connected to the gate line and the second data line; and first and second pixel electrodes that connected to the first and second switching elements, respectively, and separated from each other, wherein the liquid crystal layer has positive dielectric anisotropy.

The liquid crystal molecules may be aligned substantially vertical to the first and second substrates.

The liquid crystal molecules may be aligned substantially parallel to surfaces of the first and second substrates.

The liquid crystal display may further include: third and fourth data lines formed on the first substrate and respectively transmitting third and fourth data voltages having different polarities; a third switching element connected to the gate line and the third data line; a fourth switching element connected to the gate line and the fourth data line; a third pixel electrode connected to the third switching element; and a fourth pixel electrode separated from the third pixel electrode and connected to the fourth switching element.

The liquid crystal display may further include: a third data line formed on the first substrate and transmitting a third data voltage; a third switching element connected to the gate line and the second data line; a fourth switching element connected to the gate line and the third data line; the third pixel electrode connected to the third switching element; and a fourth pixel electrode separated from the third pixel electrode and connected to the fourth switching element, wherein the second data voltage and the third data voltage have different polarities.

A polarity of each of the first and second data voltages may change for every frame.

The first and second pixel electrodes may be formed in the same layer.

The first and second pixel electrodes may be formed in different layers.

The liquid crystal display may further include a common electrode that is formed on the first substrate and applied with a common voltage.

The liquid crystal display may further include a common electrode that is formed on the second substrate and applied with a common voltage.

The first and second pixel electrodes may include a plurality of branch electrodes, and the branch electrodes of the first pixel electrode and the branch electrodes of the second pixel electrode may be alternately disposed.

Distances between adjacent branch electrodes of the first pixel electrode and the second pixel electrode may be uniform over their positions.

Distances between the adjacent branch electrodes of the first pixel electrode and the second pixel electrode may be different according to their positions.

The branch electrodes of the first and second pixel electrodes may be bent one or more times.

The plurality of branch electrodes of the first and second pixel electrodes may be obliquely inclined with respect to the gate line.

The first and second data lines may be bent one or more times.

The liquid crystal display may further include a storage electrode line formed on the first substrate, wherein the first switching element includes a first drain electrode connected to the first pixel electrode, the second switching element includes a second drain electrode connected to the second pixel electrode, and at least one of the first pixel electrode, the second pixel electrode, the first drain electrode, and the second drain electrode overlaps the storage electrode line.

The first pixel electrode or an electrode connected to the first pixel electrode may overlap the second pixel electrode.

A liquid crystal display according to another embodiment of the present invention includes: first and second substrates opposing each other; a liquid crystal layer including liquid crystal molecules and interposed between the first and second substrates; a gate line formed on the first substrate and transmitting a gate signal; first and second data lines formed on the first substrate and respectively transmitting first and second data voltages that are different from each other; first and second switching elements connected to the gate line and the first data line; third and fourth switching elements connected to the gate line and the second data line; and first, second, third, and fourth pixel electrodes connected to the first, second, third, and fourth switching elements, respectively, wherein the liquid crystal layer has positive dielectric anisotropy.

Polarities of the first data voltage and the second data voltage may be opposite to each other.

The liquid crystal molecules may be aligned substantially vertical or parallel to the first and second substrates.

The liquid crystal display may further include: third and fourth data lines formed on the first substrate and respectively transmitting third and fourth data voltages that are different from each other; fifth and sixth switching elements connected to the gate line and the third data line; seventh and eighth switching elements connected to the gate line and the fourth data line; and fifth, sixth, seventh, and eighth pixel electrodes connected to the fifth, sixth, seventh, and eighth switching elements, respectively.

The liquid crystal display may further include: a third data line formed on the first substrate and transmitting a third data voltage; fifth and sixth switching elements connected to the gate line and the second data line; seventh and eighth switching elements connected to the gate line and the third data line; and fifth, sixth, seventh, and eighth pixel electrodes connected to the fifth, sixth, seventh, and eighth switching elements, respectively, wherein the second data voltage and the third data voltage are different from each other.

The first, second, third, and fourth switching elements have first, second, third, and fourth gate electrodes and first, second, third, and fourth drain electrodes, respectively; the first, second, third, and fourth drain electrodes are connected to the first, second, third, and fourth pixel electrodes, respectively; and when an overlapping area of the first gate electrode and the first drain electrode is represented as a first area, an overlapping area of the second gate electrode and the second drain electrode is represented as a second area, an overlapping area of the third gate electrode and the third drain electrode is represented as a third area, and an overlapping area of the fourth gate electrode and the fourth drain electrode is represented as a fourth area, at least one among the first to fourth areas may be different from the other areas.

The first area may be greater than the third area, or the fourth area may be greater than the third area.

Each of the first to fourth pixel electrodes may include a plurality of branch electrodes, the branch electrodes of the first pixel electrode and the branch electrodes of the third pixel electrode may be alternately disposed, and the branch electrodes of the second pixel electrode and the branch electrodes of the fourth pixel electrode may be alternately disposed.

The branch electrodes of the first to fourth pixel electrodes may be obliquely inclined with respect to the gate line.

The liquid crystal display may further include a storage electrode line formed on the first substrate.

A liquid crystal display according to another embodiment of the present invention includes: first and second substrates opposing each other; a liquid crystal layer including liquid crystal molecules and interposed between the first and second substrates; a gate line formed on the first substrate and transmitting a gate signal; first, second, third, and fourth data lines formed on the first substrate and respectively transmitting first, second, third, and fourth data voltages that are different from each other; a first switching element connected to the gate line and the first data line; a second switching element connected to the gate line and the second data line; a third switching element connected to the gate line and the third data line; a fourth switching element connected to the gate line and the fourth data line; and first, second, third, and fourth subpixel electrodes connected to the first, second, third, and fourth switching elements, respectively, wherein the first to fourth subpixel electrodes are applied with different voltages acquired from information for an image, and the liquid crystal layer has positive dielectric anisotropy.

Polarities of the first data voltage and the second data voltage may be opposite to each other, and polarities of the third data voltage and the fourth data voltage are opposite to each other.

The liquid crystal molecules may be aligned substantially vertical or parallel to the first and second substrates.

The liquid crystal display may further include a storage electrode line formed on the first substrate.

A liquid crystal display according to another embodiment of the present invention includes: first and second substrates opposing each other; a liquid crystal layer including liquid crystal molecules and interposed between the first and second substrates; first and second gate lines formed on the first substrate; first and second data lines formed on the first substrate and respectively transmitting first and second data voltages that are different from each other; a first switching element connected to the first gate line and the first data line; a second switching element connected to the first gate line and the second data line; a third switching element connected to the second gate line and the first data line; a fourth switching element connected to the second gate line and the second data line; and first, second, third, and fourth subpixel electrodes connected to the first, second, third, and fourth switching elements, respectively, wherein the first to fourth subpixel electrodes are applied with different voltages acquired from information for an image, and the liquid crystal layer has positive dielectric anisotropy.

Polarities of the first data voltage and the second data voltage may be opposite to each other.

The liquid crystal molecules may be aligned vertical or parallel to the first and second substrates.

The liquid crystal display may further include a storage electrode line formed on the first substrate.

A liquid crystal display according to another embodiment of the present invention includes: a pixel including first and second subpixels and a coupling capacitor; a gate line formed on a substrate and transmitting a gate signal; and first and second data lines formed on the substrate and respectively transmitting first and second data voltages that are different from each other, wherein the first subpixel includes a first switching element connected to the gate line and the first data line, a second switching element connected to the gate line and the second data line, and a first liquid crystal capacitor connected to the first and second switching elements, the coupling capacitor is connected to the first switching element, the second subpixel includes the second switching element, the coupling capacitor, and a second liquid crystal capacitor connected to the second switching element, and the first and second liquid crystal capacitors include a liquid crystal layer having positive dielectric anisotropy.

Polarities of the first data voltage and the second data voltage may be opposite to each other.

The liquid crystal layer may include liquid crystal molecules that are aligned substantially vertical or parallel to the substrate.

The liquid crystal display may further include a storage electrode line formed on the first substrate.

A liquid crystal display according to another embodiment of the present invention includes: a plurality of pixels including first and second subpixels and a boost-up unit; first and second gate lines formed on a substrate and transmitting a gate signal; and first and second data lines formed on the substrate and respectively transmitting first and second data voltages that are different from each other. The first subpixel includes a first switching element connected to the first gate line and the first data line, a second switching element connected to the first gate line and the second data line, and a first liquid crystal capacitor connected to the first and second switching elements, the second subpixel includes a third switching element connected to the first gate line and the first data line, the second switching element, and a second liquid crystal capacitor connected to the second and third switching elements. The boost-up unit includes a boost-up capacitor connected to the first switching element, a fourth switching element controlled by the gate signal of the first gate line and connected between the boost-up capacitor and a common voltage, and a fifth switching element controlled by the gate signal of the second gate line and connected between the boost-up capacitor and the second liquid crystal capacitor, and the second gate line is applied with a gate-on voltage later than the first gate line and the first and second liquid crystal capacitors include a liquid crystal layer having positive dielectric anisotropy.

Polarities of the first data voltage and the second data voltage may be opposite to each other.

The liquid crystal layer may include liquid crystal molecules that are aligned substantially vertical or parallel to the substrate.

When two adjacent pixels are represented as a first pixel and a second pixel, the second data voltage transmitted by the second data line of the first pixel may be the same as the second data voltage transmitted by the second data line of the second pixel.

The first subpixel may further include a first storage capacitor connected to the first switching element and a second storage capacitor connected to the second switching element, and the second subpixel may further include a third storage capacitor connected to the third switching element and the second storage capacitor.

The first subpixel may further include a first storage capacitor connected to the first and second switching elements, and the second subpixel may further include a second storage capacitor connected to the second and third switching elements.

A liquid crystal display according to another embodiment of the present invention includes: first and second substrates opposing each other; a liquid crystal layer including liquid crystal molecules and interposed between the first and second substrates; a gate line formed on the first substrate and transmitting a gate signal; first, second, and third data lines formed on the first substrate and respectively transmitting first, second, and third data voltages; a first switching element connected to the gate line and the first data line; a second switching element connected to the gate line and the second data line; a third switching element connected to the gate line and the second data line; a fourth switching element connected to the gate line and the third data line; and first, second, third, and fourth pixel electrodes connected to the first, second, third, and fourth switching elements, respectively.

The liquid crystal layer may have positive dielectric anisotropy.

The liquid crystal molecules may be aligned substantially vertical or parallel to the first and second substrates.

The second data voltage may vary between a first level and a second level by a predetermined period.

The first level may be the highest voltage that is usable in the liquid crystal display, and the second level may be the lowest voltage that is usable in the liquid crystal display.

The predetermined period may be one frame.

The first to third data lines may be formed in the same layer.

The second data line may be formed in the same layer as the gate line.

The liquid crystal display may further include a storage electrode line formed on the first substrate.

The first and second pixel electrodes may include a plurality of branch electrodes, and the branch electrodes of the first pixel electrode and the branch electrodes of the second pixel electrode may be alternately disposed.

Distances between adjacent branch electrodes of the first pixel electrode and the second pixel electrode may be different according to their positions.

A liquid crystal display according to another embodiment of the present invention includes: a pixel including a first subpixel and a second subpixel; a gate line formed on a substrate; and first, second, and third data lines formed on the substrate, wherein the first subpixel includes a first switching element connected to the gate line and the first data line, a second switching element connected to the gate line and the second data line, and a liquid crystal capacitor connected to the first and second switching elements, the second subpixel includes a third switching element connected to the gate line and the second data line, a fourth switching element connected to the gate line and the third data line, and a liquid crystal capacitor connected to the third and fourth switching elements, and the first and second subpixels are applied with different data voltages acquired from information for an image.

The liquid crystal capacitor may have positive dielectric anisotropy.

The liquid crystal layer may include liquid crystal molecules that are aligned substantially vertical or parallel to the substrate.

A voltage applied to the second data line may vary between a first level and a second level by a predetermined period.

The first to third data lines may be formed in the same layer.

The second data line may be formed in the same layer as the gate line.

The liquid crystal display may further include a storage electrode line formed on the substrate.

A liquid crystal display according to another embodiment of the present invention includes: a plurality of pixels arranged in a matrix, each including a first subpixel and a second subpixel; a plurality of first and second gate lines formed on a substrate; and a plurality of first and second data lines formed on the substrate, wherein the first subpixel includes a first switching element connected to the first gate line and the first data line, a second switching element connected to the first gate line and the second data line, and a first liquid crystal capacitor connected to the first and second switching elements, the second subpixel includes a third switching element connected to the second gate line and the first data line, a fourth switching element connected to the second gate line and the second data line, and a second liquid crystal capacitor connected to the third and fourth switching elements, and the first and second subpixels are applied with different data voltages acquired from information for an image.

The liquid crystal capacitor may include a liquid crystal layer having positive dielectric anisotropy.

The liquid crystal layer may include liquid crystal molecules that are aligned substantially vertical or parallel to the substrate.

A voltage applied to the second data line may be varied between a first level and a second level in a predetermined cycle.

The second data line may be formed in the same layer as the first and second gate lines.

The liquid crystal display may further include a plurality of third data lines formed on the substrate, wherein when two adjacent pixels among the plurality of pixels represent a first pixel and a second pixel, the first subpixel of the second pixel includes a fifth switching element connected to the first gate line and the third data line, a sixth switching element connected to the first gate line and the second data line, and a third liquid crystal capacitor connected to the fifth and sixth switching elements, the second subpixel of the second pixel includes a seventh switching element connected to the second gate line and the third data line, an eighth switching element connected to the second gate line and the second data line, and a fourth liquid crystal capacitor connected to the seventh and eighth switching elements, and the first and second subpixels of the second pixel are applied with different data voltages acquired from one set of image information.

The liquid crystal display may further include a storage electrode line formed on the substrate.

A liquid crystal display according to another embodiment of the present invention includes: first and second pixels adjacent to each other, each including a first subpixel and a second subpixel; a gate line formed on a substrate; and first, second, and third data lines formed on the substrate, wherein the first subpixel of the first pixel includes a first switching element connected to the first gate line and the first data line, a second switching element connected to the first gate line and the second data line, and a first liquid crystal capacitor connected to the first and second switching elements, the coupling capacitor of the first pixel is connected to the first switching element, the second subpixel of the first pixel includes the second switching element and a second liquid crystal capacitor connected between the coupling capacitor and the second switching element, the first subpixel of the second pixel includes a third switching element connected to the first gate line and the second data line, a fourth switching element connected to the first gate line and the third data line, and a third liquid crystal capacitor connected to the third and fourth switching elements, the coupling capacitor of the second pixel is connected to the fourth switching element, and the second subpixel of the second pixel includes the third switching element and a fourth liquid crystal capacitor connected between the coupling capacitor and the third switching element.

The first to fourth liquid crystal capacitors may include a liquid crystal layer having positive dielectric anisotropy.

The liquid crystal layer may be a vertical or horizontal alignment layer.

A voltage applied to the second data line may be varied between a first level and a second level in a predetermined cycle.

The first to third data lines may be formed in the same layer.

The second data line may be formed in the same layer as the gate line.

A liquid crystal display according to another embodiment of the present invention includes: a plurality of pixels arranged in a matrix; a plurality of gate lines formed on a substrate and transmitting a gate signal; and a plurality of the first and second data lines formed on the substrate and respectively transmitting first and second data voltages, wherein each pixel includes a first switching element connected to the gate line and the first data line, a second switching element connected to the gate line and the second data line, and a liquid crystal capacitor connected to the first and second switching elements, the liquid crystal capacitor includes a first pixel electrode, a second pixel electrode, and a liquid crystal layer having positive dielectric anisotropy and positioned between the first and second pixel electrodes, the liquid crystal layer is a vertical alignment layer, and each pixel displays a low-gray image for at least one frame after displaying an image for one or more frames.

The plurality of pixels may display the low-gray image for the same frame.

The low-gray image may be displayed for one frame.

At least one pixel row or at least one pixel column among the plurality of pixels may display the low-gray image and the remaining pixels may display the image for the same frame.

Two adjacent pixel rows or two adjacent pixel columns may sequentially display the low-gray image for two successive frames.

At least one pixel row displaying the low-gray image may simultaneously display the low-gray image for the same frame.

A data voltage of the low-gray image may be equal to ⅔ or less than a data voltage of the image.

DETAILED DESCRIPTION OF THE EMBODIMENTS

Figure 1:
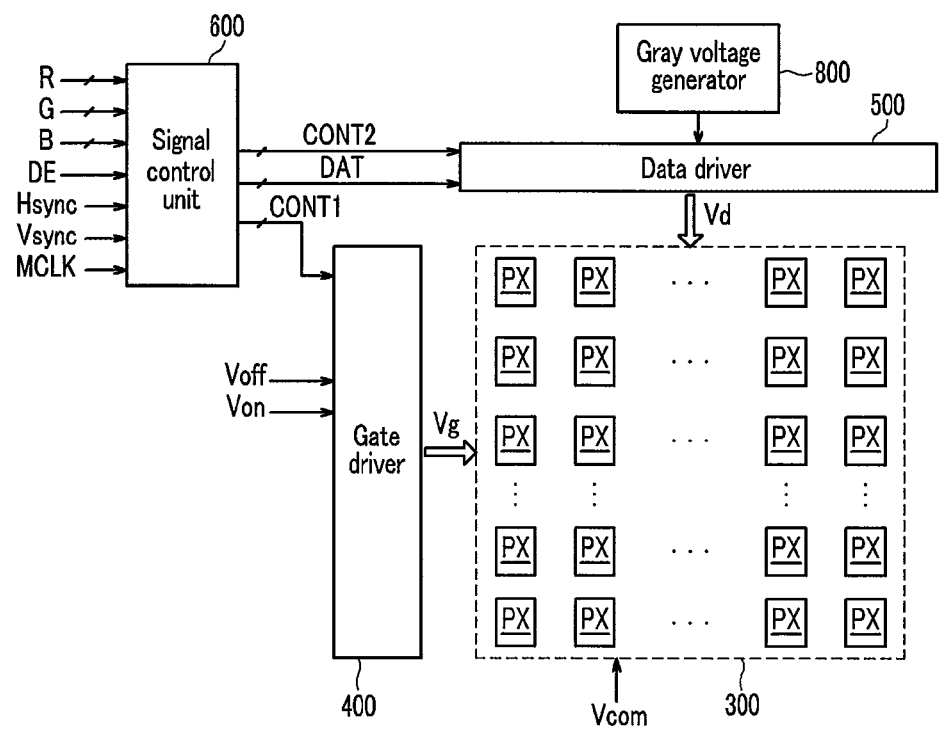
FIG. 1 is a block diagram of a liquid crystal display according to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a liquid crystal display according to an embodiment of the present invention will be described in detail with reference to the accompanying drawings.

Figure 2:
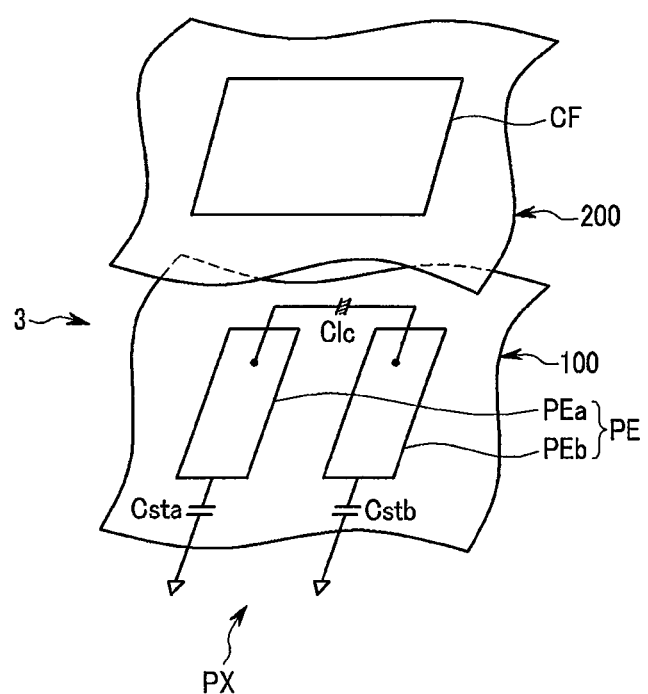
FIG. 2 is an equivalent circuit diagram of a structure of a liquid crystal display and one pixel according to an embodiment of the present invention.
Figure 3:
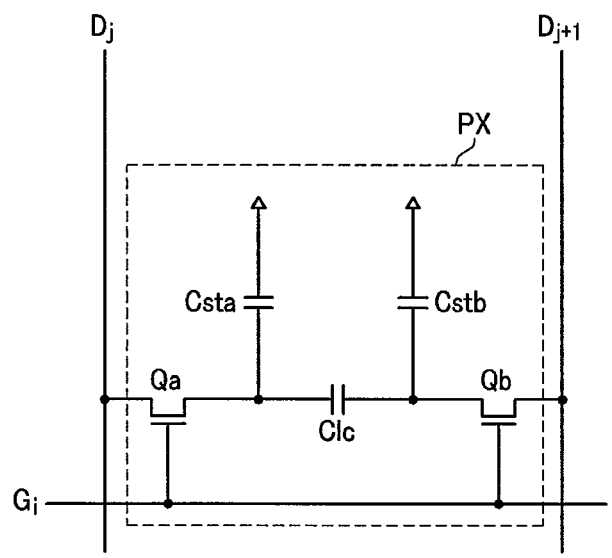
FIG. 3 is an equivalent circuit diagram illustrating one pixel of a liquid crystal display according to an embodiment of the present invention.

FIG. 1 is a block diagram of a liquid crystal display according to an embodiment of the present invention, FIG. 2 is an equivalent circuit diagram illustrating a structure of a liquid crystal display according to an embodiment of the present invention and one pixel, and FIG. 3 is an equivalent circuit diagram illustrating one pixel of a liquid crystal display according to an embodiment of the present invention.

Referring to FIG. 1, a liquid crystal display according to an embodiment of the present invention includes a liquid crystal panel assembly 300, a gate driver 400, a data driver 500, a gray voltage generator 800, and a signal controller 600.

Referring to FIG. 1 and FIG. 3, the liquid crystal panel assembly 300 includes a plurality of signal lines $G_i$, $D_j$, and $D_{j+1}$ and a plurality of pixels PX that are connected thereto and arranged substantially in a matrix in view of an equivalent circuit. In contrast, in view of a structure shown in FIG. 2, the liquid crystal panel assembly 300 includes upper and lower panels 100 and 200 that are opposed to each other, and a liquid crystal layer 3 interposed therebetween.

The signal lines $G_i$, $D_j$, and $D_{j+1}$ include a plurality of gate lines $G_i$ transmitting a gate signal (also referred to as "a scanning signal") and a plurality of pairs of data lines $D_j$ and $D_{j+1}$ transmitting a data voltage. The gate lines Gi extend substantially in a row direction and are substantially parallel to each other. The data lines $D_j$ and $D_{j+1}$ extend substantially in a column direction and are substantially parallel to each other.

Each pixel PX, for example a pixel PX that is connected to the i-th (i=1, 2, . . . , n) gate line $G_i$ and the j-th and (j+1)-th (j=1, 2, . . . , m) data lines $D_j$ and $D_{j+1}$ includes first and second switching devices Qa and Qb connected to the signal lines $G_i$, $D_j$, and $D_{j+1}$, a liquid crystal capacitor Clc connected thereto, and first and second storage capacitors Csta and Cstb. The first and second storage capacitors Csta and Cstb may be omitted as necessary.

The first/second switching device Qa/Qb is a three-terminal device such as a thin-film transistor provided in the lower panel 100. A control terminal thereof is connected to the gate line Gi, an input terminal thereof is connected to the data line $D_j/D_{j+1}$, and an output terminal thereof is connected to the liquid crystal capacitor Clc and the first and second storage capacitors Csta and Cstb.

Referring to FIG. 2 and FIG. 3, the liquid crystal capacitor Clc adopts the first pixel electrode PEa and the second pixel electrode PEb of the lower panel 100 as two terminals, and the liquid crystal layer 3 between the first and second pixel electrodes PEa and PEb and the upper panel 200 serves as a dielectric material.

The first pixel electrode PEa is connected to the first switching element Qa and the second pixel electrode PEb is connected to the second switching element Qb.

Alternatively to FIG. 2, the second pixel electrode PEb may be provided on the upper panel 200. In this case, the second pixel electrode PEb is not connected to a switching element and receives a separate common voltage Vcom.

The liquid crystal layer 3 has dielectric anisotropy, and liquid crystal molecules of the liquid crystal layer 3 have their long axes aligned to be vertical to surfaces of the two panels 100 and 200 without an electric field.

A pixel electrode PE including the first and second pixel electrodes PEa and PEb, and a common electrode CE, may be formed in different layers or in the same layer. The first and second storage capacitors Csta and Cstb serving as assistants of the liquid crystal capacitor Clc may be formed by superimposing separate electrodes (not shown) provided on the lower panel 100 with being interposed between the first and second pixel electrodes PEa and PEb, and insulators.

Meanwhile, in order to implement color display, a desired color is recognized by a spatial or temporal sum of primary colors by allowing pixels PX to uniquely display one of the primary colors (spatial division) or the pixels PX to alternately display the primary colors (temporal division).

The primary colors include three primary colors such as red, green, and blue.

FIG. 2 shows that each pixel PX includes a color filter CF displaying one of the primary colors in an area of the upper panel 200 corresponding to the first and second pixel electrodes PEa and PEb as one example of the spatial division.

Alternatively to FIG. 2, the color filter CF may be disposed above or below the first and second pixel electrodes PEa and PEb of the lower panel 100.

At least one polarizer (not shown) is provided in the liquid crystal panel assembly 300.

Referring back to FIG. 1, the gray voltage generator 800 generates all gray voltages or gray voltages of a limited number (hereinafter referred to as "reference gray voltages") related to transmittance of the pixel PX.

The reference gray voltages may include a gray voltage having a positive value and another gray voltage having a negative value with respect to the common voltage Vcom.

The gate driver 400 is connected to the gate lines of the liquid crystal panel assembly 300, and applies a gate signal configured of a combination of a gate-on voltage Von and a gate-off voltage Voff to the gate lines.

The data driver 500 is connected to the data lines of the liquid crystal panel assembly 300, and selects a gray voltage applied from the gray voltage generator 800 and applies the selected gray voltage as a data voltage to the data line.

However, in a case in which the gray voltage generator 800 provides reference gray voltages of a limited number instead of all the gray voltages, the data driver 500 may generate desired data voltages by dividing the reference gray voltages.

The signal controller 600 controls the gate driver 400 and the data driver 500.

Each of the drivers 400, 500, 600, and 800 is mounted directly on the liquid crystal panel assembly in the form of at least one IC chip, is mounted on a flexible printed circuit film (not shown) to be attached onto the liquid crystal panel assembly 300 in the form of a tape carrier package (TCP), or is mounted on a separate printed circuit board (PCB) (not shown).

Alternatively, the drivers 400, 500, 600, and 800 may be integrated on the liquid crystal panel assembly 300 with signal lines and a thin-film transistor switching element.

Further, the drivers 400, 500, 600, and 800 may be integrated in the form of a single chip. In this case, at least one of them or at least one circuit element constituting them may be positioned outside the single chip.

Hereinafter, referring to FIG. 4 and FIG. 5, and FIG. 1 to FIG. 3, an example of a driving method of a liquid crystal display according to an embodiment of the present invention will be described in detail.

Figure 4:
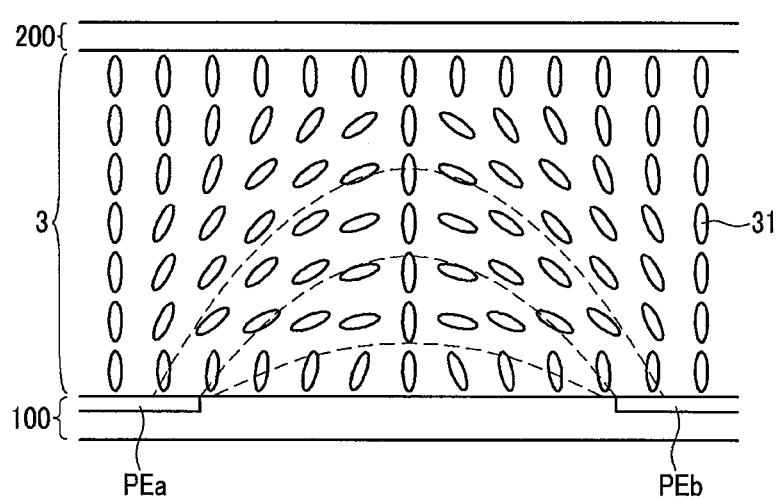
FIG. 4 is a schematic cross-sectional view of a liquid crystal display according to an embodiment of the present invention.
Figure 5:
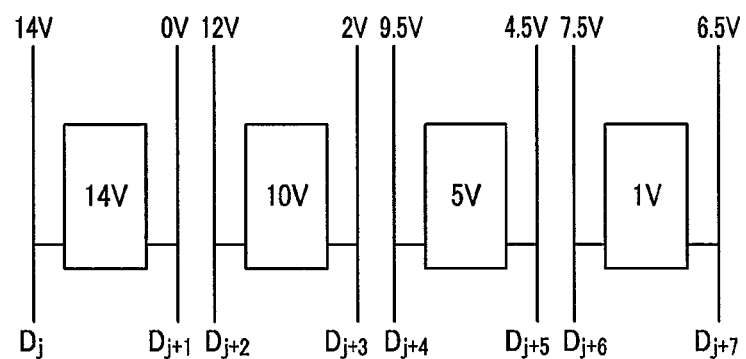
FIG. 5 is a diagram illustrating voltages of data lines and pixels of a liquid crystal display according to an embodiment of the present invention.

FIG. 4 is a schematic cross-sectional view of a liquid crystal display according to an embodiment of the present invention, and FIG. 5 is a diagram illustrating voltages applied to data lines and pixels of a liquid crystal display according to an embodiment of the present invention.

First, referring to FIG. 1, the signal controller 600 receives input image signals R, G, and B and input control signals controlling display of the input image signals R, G, and B from an external graphics controller (not shown).

The input image signals R, G, and B contain luminance information of each pixel, and the luminance has a predetermined number, for example 1024 ($=2^{10}$), 256 ($=2^8$) or 64 ($=2^6$), of grays.

The input control signals may include a vertical synchronization signal (Vsync), a horizontal synchronization signal (Hsync), a main clock signal (MCLK), a data enable signal (DE), and the like.

The signal controller 600 appropriately processes the input image signals R, G, and B according to an operating condition of the liquid crystal panel assembly 300 on the basis of the input image signals R, G, and B and the input control signals. The signal controller 600 generates a gate control signal CONT1 and a data control signal CONT2, and outputs the gate control signal CONT1 to the gate driver 400 and outputs the data control signal CONT2 and processed image signals DAT to the data driver 500.

According to the data control signal from the signal controller 600, the data driver 500 receives digital image signals DAT for a pixel of one row and converts each digital image signal DAT into an analog data voltage by selecting a gray voltage corresponding to each digital image signal DAT, and then applies the analog data voltages to the corresponding data lines.

The gate driver 400 applies the gate-on voltage Von to the gate line $G_i$ according to the gate control signal CONT1 from the signal controller 600 to turn on the first and second switching elements Qa and Qb connected to the gate line Gi.

Then, the data voltages applied to the data lines $D_j$ and $D_{j+1}$ are applied to the corresponding pixels PX through the first and second switching elements Qa and Qb.

That is, the data voltage flowing in the first data line $D_j$ is applied to the first pixel electrode PEa through the first switching element Qa, and the data voltage flowing in the second data line $D_{j+1}$ is applied to the second pixel electrode PEb through the second switching element Qb.

At this time, the data voltages applied to the first and second pixel electrodes PEa and PEb are data voltages corresponding to luminance displayed by the pixels PX, and have polarities opposite to each other with respect to the common voltage Vcom.

A difference between the two data voltages having different polarities, which are applied to the first and second pixel electrodes PEa and PEb, is indicated by a charging voltage of the liquid crystal capacitor Clc, that is, a pixel voltage.

When a potential difference is generated between both terminals of the liquid crystal capacitor Clc, an electric field parallel to the surfaces of the panels 100 and 200 is generated in the liquid crystal layer 3 between the first and second pixel electrodes PEa and PEb, as shown in FIG. 4.

In a case in which liquid crystal molecules 31 have positive dielectric anisotropy, the liquid crystal molecules 31 are inclined so that their long axes are aligned to be vertical to the direction of the electric field and the inclination degree depends on the amplitude of the pixel voltage.

Such a liquid crystal layer 3 is referred to as an electrically-inducted optical compensation (EOC) mode.

The degree of variation of polarization of light passing through the liquid crystal layer 3 depends on the inclination degree of the liquid crystal molecules 31.

The variation of polarization is expressed by variation in transmittance of light through the polarizers, through which the pixel PX displays luminance indicated by the gray of the image signal DAT.

By repeating such a process by one horizontal period (also referred to as "1H", equal to one period of the horizontal synchronization signal (Hsync) and the data enable signal DE), the gate-on signal Von is sequentially applied to all the gate lines and the data voltages are applied to all the pixels PX thereby to display an image of one frame.

After one frame is terminated, the next frame starts. A state of an inversion signal RVS applied to the data driver 500 is controlled so that the polarity of the data voltage applied to each pixel PX is reversed to be opposite to that of the previous frame ("frame inversion").

At this time, the polarity of the data voltage flowing in one data line may be periodically changed during one frame according to characteristics of the inversion signal RVS (for example, row inversion and dot inversion) or the polarities of the data voltages applied to one pixel row may be alternately different from each other (for example, column inversion and the dot inversion).

FIG. 5 is a diagram illustrating voltages applied to each of the data lines when charging voltages of the liquid crystal capacitors of four adjacent pixels are 14V, 10V, 5V, and 1V, respectively, and a minimum voltage and a maximum voltage which the liquid crystal display can use are 0V and 14V, respectively, in the liquid crystal display according to an embodiment of the present invention.

Referring to FIG. 5, each pixel is connected to two data lines $D_j$, $D_{j+1}/D_{j+2}$, $Dj_{+3}/D_{j+4}$, $D_{j+5}/D_{j+6}$, $D_{j+7}$. Different data voltages having different polarities with respect to the common voltage Vcom are applied to the two data lines $D_j, D_{j+1}/D_{j+2}, Dj_{+3}/D_{j+4}, D_{j+5}/D_{j+6}, D_{j+7}$ connected to one pixel. A difference between the two data lines is a pixel voltage in each pixel PX. For example, when the common voltage Vcom is 7V, 14V and 0V may be applied to the first and second data lines $D_j$ and $D_{j+1}$ respectively with a target pixel voltage, 14V, of the first pixel, 12V and 2V may be applied to the third and fourth data lines $D_{j+2}$ and $D_{j+3}$ respectively with a target pixel voltage, 5V, of the second pixel, 9.5V and 4.5V may be applied to the fifth and sixth data lines $D_{j+4}$ and $D_{j+5}$ respectively with a target pixel voltage, 5V, of the third pixel, and 7.5V and 6.5V may be applied to the seventh and eighth data lines $D_{j+6}$ and $D_{j+7}$ respectively with a target pixel voltage, 1V, of the fourth pixel.

As described above, by applying two data voltages having different polarities with respect to the common voltage Vcom to one pixel PX, a driving voltage may be increased, the response speed of the liquid crystal molecules may be improved, and the transmittance of the liquid crystal display may be improved. Further, since the two data voltages applied to the one pixel PX have polarities that are opposite to each other, it is possible to prevent deterioration of image quality due to flickers even in a case where the inversion type in the data driver 500 is the column inversion or the row inversion advantageously like the dot inversion.

In addition, when the first and second switching elements Qa and Qb are turned off in one pixel, the voltages applied to the first and second pixel electrodes PEa and PEb drop simultaneously by respective kickback voltages, whereby there is little variation in the charging voltage of the pixel PX. Accordingly, it is possible to improve display characteristics of the liquid crystal display.

Furthermore, in a case of using liquid crystal molecules 31 aligned vertical to the surfaces of the display panels 100 and 200, it is possible to improve the contrast ratio of a liquid crystal display and implement a good optical viewing angle. Since the liquid crystal molecules 31 having positive dielectric anisotropy have dielectric anisotropy that is larger and rotational viscosity that is lower compared to liquid crystal molecules 31 having negative dielectric anisotropy, it is possible to increase the response speed of the liquid crystal molecules 31. Also, since the tilt directions of the liquid crystal molecules 31 are easily set to the direction of a generated electric field, it is possible to acquire excellent display characteristics even when the alignment of the liquid crystal molecules 31 is scattered due to an external influence.

Next, referring to FIG. 6 to FIG. 10 and FIG. 1 to FIG. 5 described above, another example of the driving method of the liquid crystal display according to an embodiment of the present invention will be described in detail.

Figure 6:
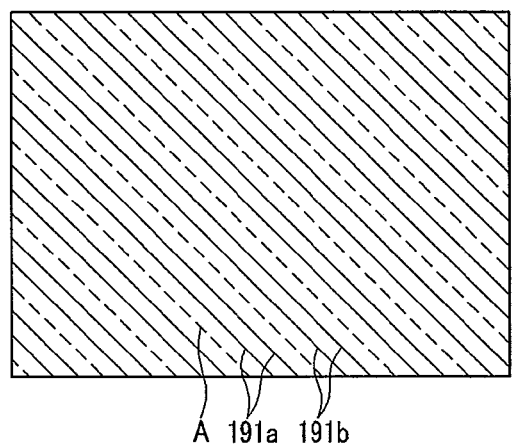
FIG. 6 is a diagram illustrating the pixel electrode and a texture region of a liquid crystal display according to an embodiment of the present invention.
Figure 7:
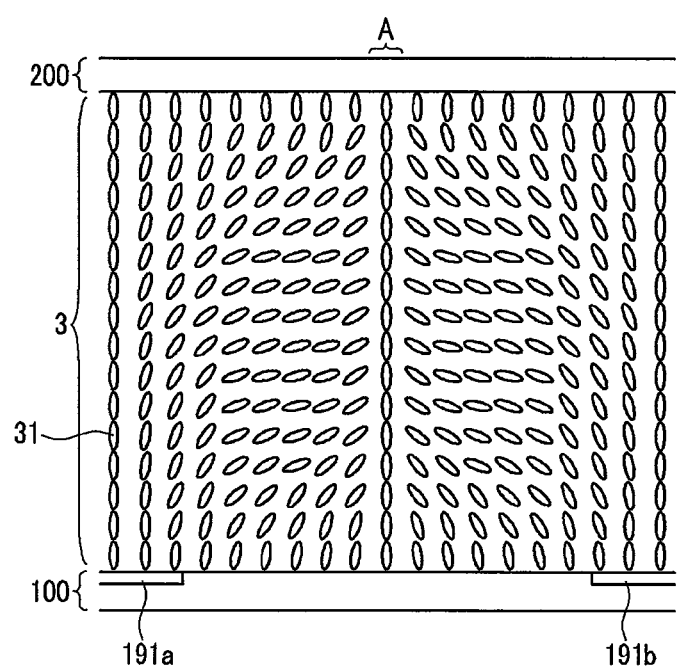
FIG. 7 is a schematic cross-sectional view of a liquid crystal display according to an embodiment of the present invention.
Figure 8:
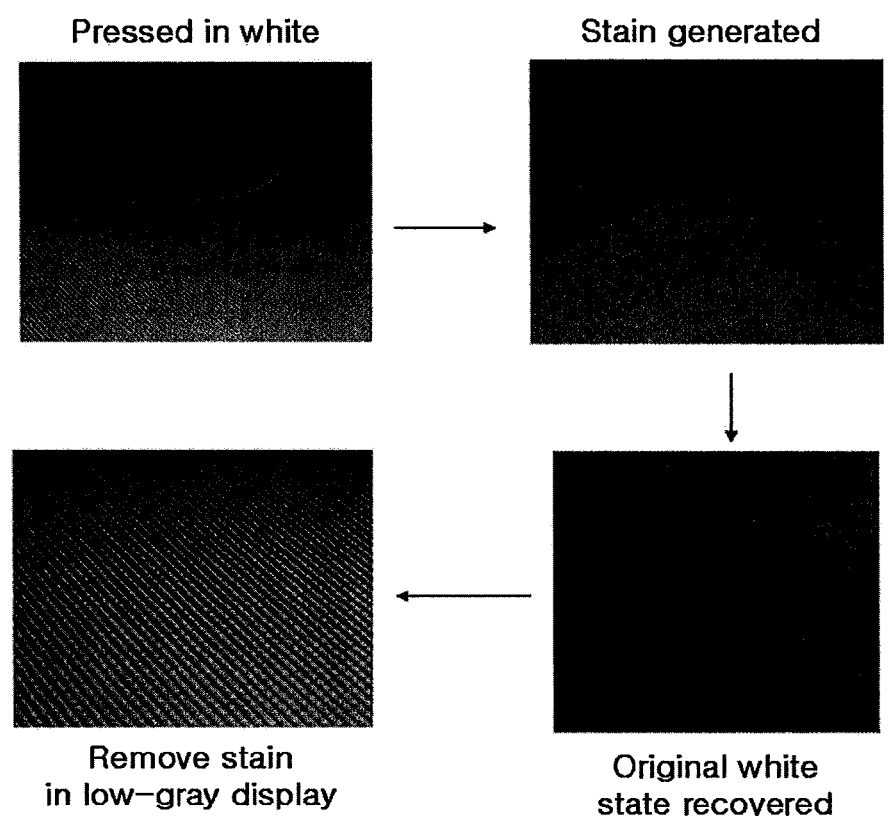
FIG. 8 is a diagram illustrating a sequence of a driving method of a liquid crystal display according to an embodiment of the present invention.
Figure 9:
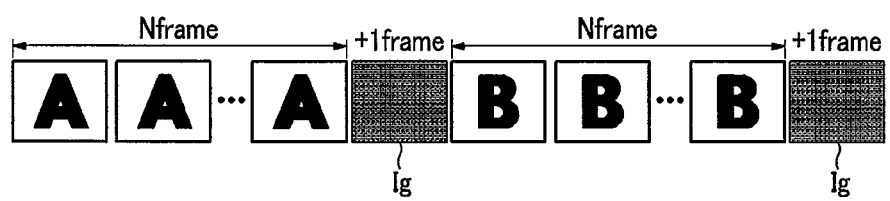
FIG. 9 is a diagram illustrating a driving method according to an embodiment of the present invention.
Figure 10:
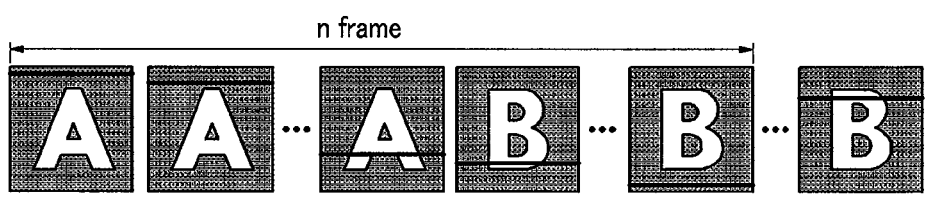
FIG. 10 is a diagram illustrating a driving method according to another embodiment of the present invention.

FIG. 6 is a diagram illustrating the pixel electrode and a texture region of a liquid crystal display according to an embodiment of the present invention. FIG. 7 is a schematic cross-sectional view of a liquid crystal display according to an embodiment of the present invention, FIG. 8 is a diagram illustrating a sequence of a driving method of a liquid crystal display according to an embodiment of the present invention, and FIG. 9 is a diagram illustrating a driving method according to an embodiment of the present invention. FIG. 10 is a diagram illustrating a driving method according to another embodiment of the present invention.

First, referring to FIG. 6 and FIG. 7, a liquid crystal panel assembly according to the embodiment also includes lower and upper panels 100 and 200 opposing each other and a liquid crystal layer 3 interposed therebetween, and first and second pixel electrodes 191a and 191b are provided on the lower panel 100 like the liquid crystal panel assembly shown in FIG. 2.

The liquid crystal molecules 31 of the liquid crystal layer 3 have their long axes aligned to be vertical to the surfaces of the two panels 100 and 200 without the electric field.

When two data voltages having different porosities with respect to the common voltage Vcom are applied to the first and second pixel electrodes 191a and 191b, the liquid crystal molecules 31 of the liquid crystal layer 3 are tilted to be parallel to the panels 100 and 200 as shown in FIG. 7. However, the liquid crystal molecules 31 spaced at the same distance from the first and second pixel electrodes 191a and 191b may not be tilted to any one side and maintain their initial orientation that is vertical to the panes 100 and 200. Then, texture A having lower luminance than the circumference thereof may be generated between the two pixel electrodes 191a and 191b as shown in FIG. 6 and FIG. 7.

Referring to FIG. 9, a driving method of the liquid crystal display according to an embodiment also includes displaying images of N frames to be displayed for a predetermined time in the same manner as the driving method of the liquid crystal display shown in FIG. 1 to FIG. 5 as described above (e.g., images of 60 frames are displayed per second in a 60 Hz driving). After images of N frames are displayed, a low gray image Ig of one frame is additionally displayed as shown in FIG. 9, and then, images of N frames to be displayed are displayed.

In a case where the liquid crystal display displays high-gray luminance such as white, the liquid crystal molecules 31 in the texture region between the two pixel electrodes 191a and 191b may be arranged horizontally to the display panels 100 and 200 when the liquid crystal molecules 31 receive pressure from the outside. The texture region A where the liquid crystal molecules 31 are horizontally arranged may be recognized as yellowish bruising since the horizontally arranged liquid crystal molecules 31 contribute to the transmittance of the liquid crystal display. The horizontally arranged liquid crystal molecules 31 in the texture region A maintain the state by the strong electric field in the liquid crystal layer 3 even though the pressure from the outside is removed, whereby such bruising may not be removed even when time passes by.

When an image Ig for a frame having a low-gray is displayed after displaying images for a predetermined number of frames as in the embodiment, the liquid crystal molecules 31 that were maintained to be arranged horizontally to the panels 100 and 200 by the strong electric field recover their original inclination state to be vertical to the panels 100 and 200 when the influence form the outside is removed. Accordingly, the bruising is removed and a white image may be displayed. At this time, the gray of the low-gray image Ig may be equal or less than a gray with which the bruising appearing in the high-gray image may be removed after the influence such as an external pressure is removed. Alternatively, the gray may be a gray corresponding to a data voltage equal to or less than ⅔ of the data voltage for a high gray.

Alternatively to the above embodiment, the number of added frames of low-gray images Ig may be one or more.

Next, referring to FIG. 10, a driving method of a liquid crystal display according to another embodiment of the present invention will be described.

Referring to FIG. 10, one row or a plurality of rows of pixels display a low gray in respective frames and the one row or the plurality of rows of pixels having a low gray may scroll the display screen from one end to the other end of the screen while the liquid crystal display displays images during n frames. At this time, the gray of the one or the plurality of rows of pixels having a low gray may be equal to or less than a gray with which the bruising can be removed in the high-gray image after the influence such as an external pressure is removed, or may be a gray corresponding to a data voltage equal to or less than ⅔ of the data voltage corresponding to the high gray in one example.

Unlike FIG. 10, the low-gray row may be scrolled bottom to top, left to right, or right to left.

In this way, one row or a plurality of rows of a low gray, which are difficult to be recognized, are added to each frame and are scrolled in the same manner as the above embodiment, then it is possible to release the liquid crystal molecules 31 that are laid due to the influence such as an external pressure from the strong electric field and return back the liquid crystal molecules 31 to their initial orientation after the external pressure is removed. Accordingly, it is possible to remove display defects such as a yellowish bruising, etc.

As described above, by adding an image or at least one row of a low gray when displaying a high-gray image in the liquid crystal display including vertically aligned liquid crystal molecules 31, it is possible to recover the liquid crystal molecules 31, which are laid horizontally to the panels 100 and 200 due to the influence such as the external force and trapped by the strong electric field even though the external influence is removed, back to initial orientation.

Hereinafter, referring to FIG. 11 and FIG. 12, an example of the liquid crystal panel assembly described above will be described in detail.

Figure 11:
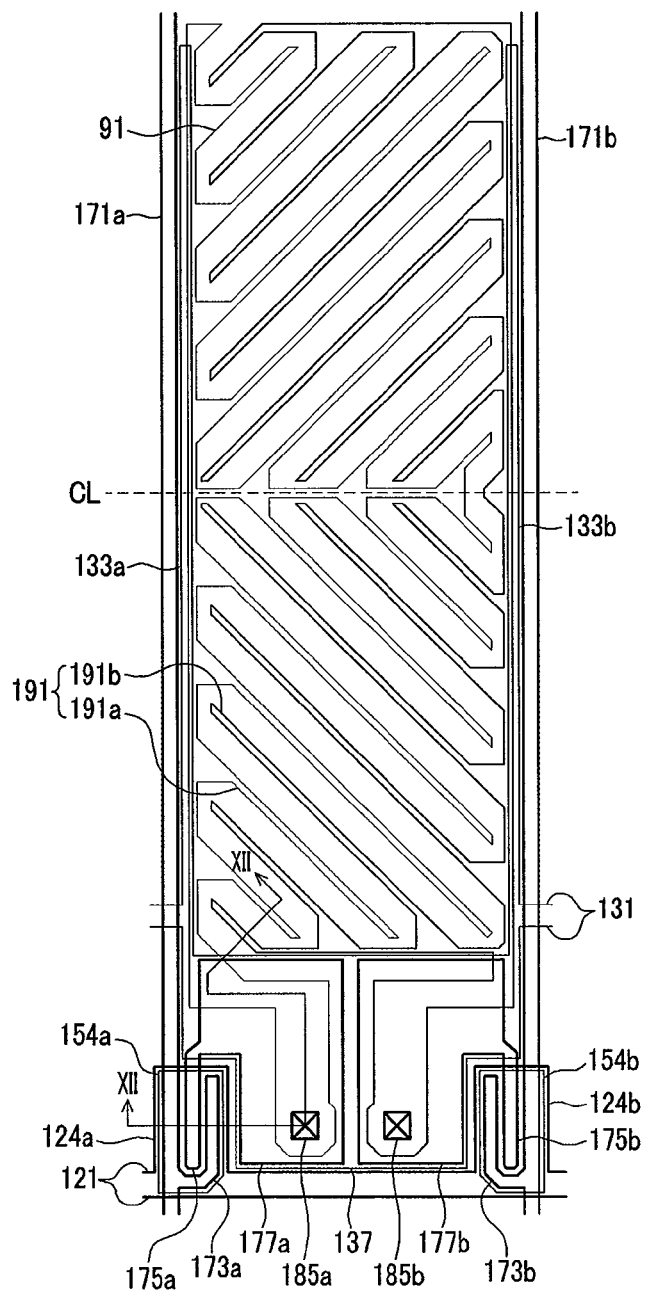
FIG. 11 is a layout view of a liquid crystal panel assembly according to an embodiment of the present invention.
Figure 12:
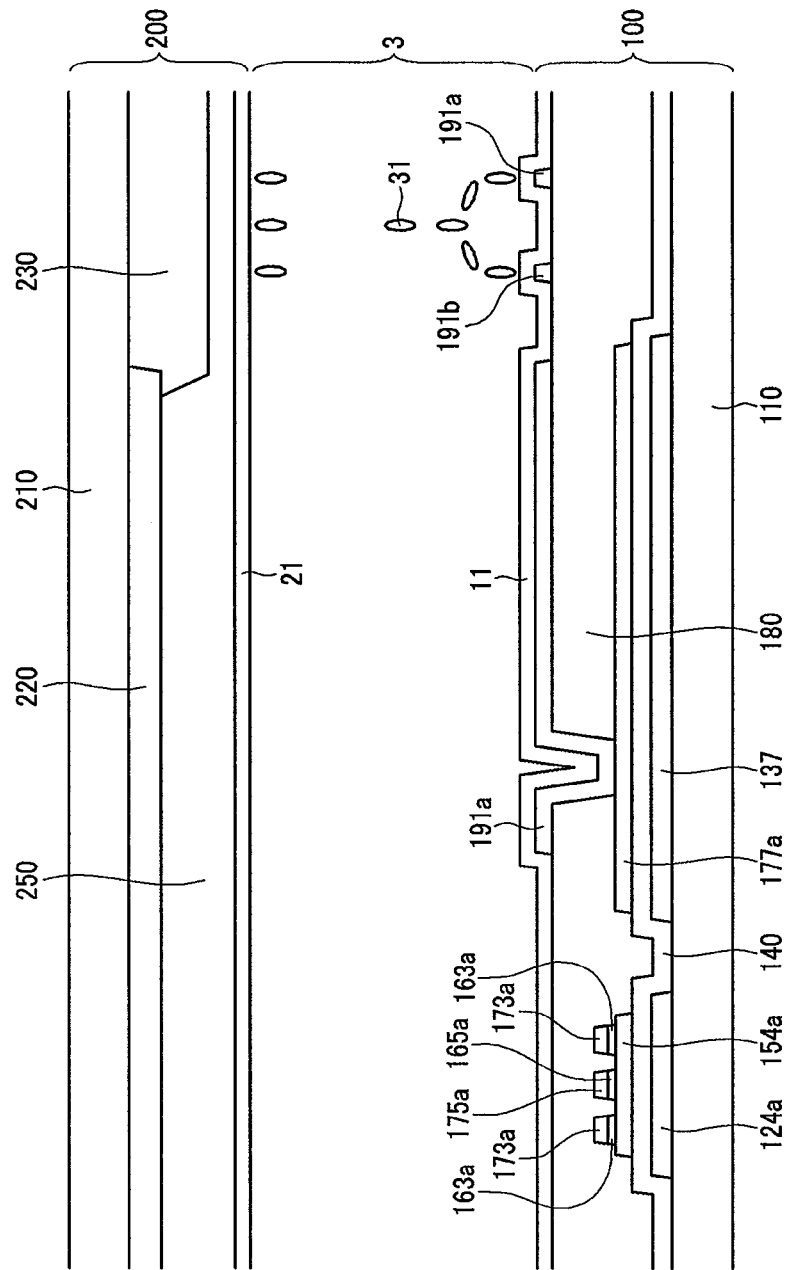
FIG. 12 is a cross-sectional view of the liquid crystal panel assembly taken along line XII-XII of FIG. 11.

FIG. 11 is a layout view of a liquid crystal panel assembly according to an embodiment of the present invention, and FIG. 12 is a cross-sectional view of the liquid crystal panel assembly taken along line XII-XII of FIG. 11.

Referring to FIG. 11 and FIG. 12, the liquid crystal panel assembly according to an embodiment of the present invention includes a lower panel 100 and an upper panel 200, and a liquid crystal layer 3 interposed therebetween.

First, the lower panel 100 will be described.

A plurality of gate conductors including a plurality of gate lines 121 and a plurality of storage electrode lines 131 are formed on an insulation substrate 110.

The gate lines 121 transmit gate signals and extend mainly in a horizontal direction. Each of the gate lines 121 includes plural pairs of first and second gate electrodes 124a and 124b projecting upward.

Each of the storage electrode lines 131 receives a predetermined voltage such as the common voltage Vcom, and extends mainly in the horizontal direction. Each of the storage electrode lines 131 is positioned between two neighboring gate lines 121 and is closer to the gate line 121 positioned below the storage electrode line 131. Each storage electrode line 131 includes plural pairs of first and second storage electrodes 133a and 133b elongated vertically, and a storage extension part 137 having a wide area. The first and second storage electrodes 133a and 133b are formed in a rod shape from the vicinity of the first and second gate electrodes 124a and 124b of the lower gate line 121 to the vicinity of the upper gate line 121. The storage extension part 137 has a substantially quadrangle shape in which two corners formed in a lower part of the storage extension part 137 are cut, and connects lower ends of the first and second storage electrodes 133a and 133b to each other. However, the shape and arrangement of the storage electrode line 131 including the storage electrodes 133a and 133b and the storage extension part 137 may be changed in various forms.

The gate conductors 121 and 131 may have a single layered structure or a multilayered structure.

A gate insulating layer 140 made of silicon nitride (SiNx), silicon oxide (SiOx), or the like is formed on the gate conductors 121 and 131.

Plural pairs of first and second island-type semiconductors 154a and 154b made of hydrogenated amorphous silicon, polysilicon, or the like are formed on the gate insulating layer 140. The first and second semiconductors 154a and 154b are positioned above the first and second gate electrodes 124a and 124b, respectively.

A pair of island-type ohmic contacts 163a and 165a are formed on each of the first semiconductors 154a, and a pair of island-type ohmic contacts (not shown) are formed on each of the second semiconductors 154b. The ohmic contacts 163a and 165a may be made of a material such as n+ hydrogenated amorphous silicon doped with n-type impurities at a high concentration, etc., or of silicide.

A data conductor including plural pairs of first and second data lines 171a and 171b and plural pairs of first and second drain electrodes 175a and 175b is formed on the ohmic contacts 163a and 165a and the gate insulating layer 140.

The first and second data lines 171a and 171b transmit the data signals and intersect the gate lines 121 and the storage electrode lines 131 while extending mainly in a vertical direction. The first and second data lines 171a and 171b include plural pairs of first and second source electrodes 173a and 173b bent in a U shape toward the first and second gate electrodes 124a and 124b.

The first and second drain electrodes 175a and 175b include first and second extension parts 177a and 177b of which ends have a rod shape and a large area. The ends of the first and second drain electrodes 175a and 175b are partially surrounded by the first and second source electrodes 173a and 173b that are bent while facing each other around the first and second gate electrodes 124a and 124b. Outer contours of the first and second extension parts 177a and 177b are substantially similar to those of the storage extension part 137 positioned below the first and second extension parts 177a and 177b. The first extension part 177a overlaps the left half of the storage extension part 137, and the second extension part 177b overlaps the right half of the storage extension part 137.

The first/second gate electrode 124a/124b, the first/second source electrode 173a/173b, and the first/second drain electrodes 175a/175b respectively constitute the first/second thin film transistors Qa/Qb together with the first/second semiconductor 154a/154b. Channels of the first/second thin film transistor Qa/Qb is respectively formed in the first/second semiconductor 154a/154b between the first/second source electrode 173a/173b and the first/second drain electrode 175a 175b.

The data conductors 171a, 171b, 175a, and 175b may have a single layered structure or a multilayered structure.

The ohmic contacts 163a and 165a are formed only between the semiconductors 154a and 154b below the ohmic contacts 163a and 165a and the data conductors 171a, 171b, 175a, and 175b above the ohmic contacts 163a and 165a. The ohmic contacts 163a and 165a lower contact resistance between the semiconductors 154a and 154b and the data conductors 171a, 171b, 175a, and 175b. The semiconductors 154a and 154b are exposed between the source electrodes 173a and 173b and the drain electrodes 175a and 175b. In addition, the semiconductors 154a and 154b are exposed to the data conductors 171a, 171b, 175a, and 175b.

A passivation layer 180 that is may be made of an inorganic insulator, an organic insulator, or the like is formed on the data conductors 171a, 171b, 175a, and 175b and the exposed parts of the semiconductors 154a and 154b.

A plurality of contact holes 185a and 185b for exposing the first and second extension parts 177a and 177b are formed on the passivation layer 180.

A plurality of pixel electrodes 191 including plural pairs of first and second pixel electrodes 191a and 191b that are may be made of a transparent material such as indium tin oxide (ITO), indium zinc oxide (IZO), or the like, or a reflective metal such as aluminum, silver, chromium, or an alloy thereof, are formed on the passivation layer 180.

As shown in FIG. 11, the overall contour of the one pixel electrode 191 has a quadrangular shape. The first and second pixel electrodes 191a and 191b engage with each other with a gap 91 therebetween. The first and second pixel electrodes 191a and 191b are generally vertically symmetrical with respect to a virtual horizontal center line CL and are divided into upper and lower regions.

The first pixel electrode 191a includes a lower projection portion, a left longitudinal stem portion, a horizontal stem portion extending to the right from a center of the longitudinal stem portion, and a plurality of branch portions. A branch portion positioned above the horizontal center line CL extends obliquely in an upper right direction from the longitudinal stem portion or the horizontal stem portion. The other branch portion positioned below the horizontal center line CL extends obliquely in a lower right direction from the longitudinal stem portion or the horizontal stem portion. An angle between the branch portions and the gate line 121 or the horizontal center line CL may be approximately 45 degrees.

The second pixel electrode 191b includes a lower projection portion, a right longitudinal stem portion, upper and lower horizontal stem portions, and a plurality of branch portions. The upper and lower horizontal stem portions extend horizontally to the left from a lower end and an upper end of the longitudinal stem portion, respectively. A branch portion positioned above the horizontal center line CL extends obliquely in a lower left direction from the longitudinal stem portion or the upper horizontal stem portion. The other branch portion positioned below the horizontal center line CL extends obliquely in an upper left direction from the longitudinal stem portion or the lower horizontal stem portion. An angle between the branch portions of the second pixel electrode 191b and the gate line 121 or the horizontal center line CL may also be approximately 45 degrees. The upper and lower branch portions may be at right angles to each other around the horizontal center line CL.

The branch portions of the first and second pixel electrodes 191a and 191b engage with each other with a predetermined gap and are alternately disposed, thereby forming a pectinated pattern.

The first and second pixel electrodes 191a and 191b are physically and electrically connected to the first and second drain electrodes 175a and 175b through the contact holes 185a and 185b, respectively. The first and second pixel electrodes 191a and 191b receive data voltages from the first and second drain electrodes 175a and 175b. The first and second pixel electrodes 191a and 191b constitute the liquid crystal capacitor Clc together with the liquid crystal layer 3. The first and second pixel electrodes 191a and 191b maintain the applied voltage even after the first and second thin film transistors Qa and Qb are turned off.

The first and second extension parts 177a and 177b of the first and second drain electrode 175a and 175b connected to the first and second pixel electrodes 191a and 191b overlap the storage extension part 137 with the gate insulating layer 140 interposed therebetween, thereby constituting the first and second storage capacitors Csta and Cstb. The first and second storage capacitors Csta and Cstb strengthen voltage storage capacitance of the liquid crystal capacitor Clc.

Next, the upper panel 200 will be described.

A light blocking member 220 is formed on an insulation substrate 210 made of transparent glass, plastic, or the like. The light blocking member 220 prevents light from being leaked between the pixel electrodes 191 and defines an opening region facing the pixel electrodes 191.

A plurality of colors filter 230 are formed on the insulation substrate 210 and the light blocking member 220. Most of the color filters 230 exist within a region surrounded by the light blocking member 220. The color filters 230 may be elongated on a row of the pixel electrodes 191. Each of the color filters 230 may display one of primary colors including three primary colors such as red, green, and blue.

An overcoat 250 is formed on the color filters 230 and the light blocking member 220. The overcoat 250 may be made of the (organic) insulator. The overcoat 250 prevents the color filters 230 from being exposed and provides a flat surface. The overcoat 250 may be omitted.

Alignment layers 11 and 21 are applied on inner surfaces of the panels 100 and 200. The alignment layers 11 and 21 may be vertical alignment layers.

A polarizer (not shown) may be provided on outer surfaces of the panels 100 and 200.

The liquid crystal layer 3 interposed between the lower panel 100 and the upper panel 200 has positive dielectric anisotropy. The liquid crystal molecules 31 may have their long axes aligned to be vertical to the surfaces of two panels 100 and 200 without the electric field.

When data voltages having different polarities are applied to the first and second pixel electrodes 191a and 191b, an electric field substantially parallel to the surfaces of the panels 100 and 200 is generated. The liquid crystal molecules of the liquid crystal layer 3, which are initially aligned to be vertical to the surfaces of the panels 100 and 200, respond to the electric field and the long axes of the liquid crystal molecules are aligned to be parallel to the electric field. A variation degree of polarization of light incident in the liquid crystal layer 3 is changed depending on the inclination degree of the liquid crystal molecules. The variation of the polarization is represented by variation of transmittance by the polarizers, whereby the liquid crystal display displays an image.

In this way, it is possible to increase the contrast ratio of the liquid crystal display and implement a wide viewing angle by using liquid crystal molecules 31 that are aligned vertically to the surfaces of the panels 100 and 200. Also, it is possible to increase the driving voltage and improve response speed by applying two data voltages having different polarities with respect to the common voltage Vcom to one pixel PX. Further, as described above, influences by the kickback voltage may be removed, thereby preventing flickering and the like.

Next, referring to FIG. 13, a liquid crystal panel assembly according to another embodiment of the present invention will be described.

Figure 13:
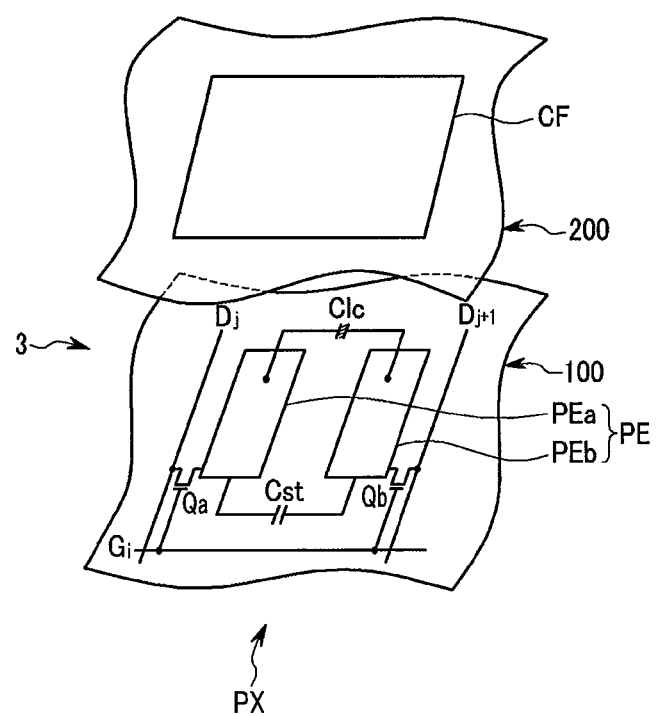
FIG. 13 and FIG. 14 are equivalent circuit diagrams each illustrating one pixel and a structure of a liquid crystal display panel according to another embodiment of the present invention.

FIG. 13 is an equivalent circuit diagram illustrating one pixel and a structure of a liquid crystal display panel according to another embodiment of the present invention.

Referring to FIG. 13, the liquid crystal panel assembly according to the present embodiment also includes a signal line including a plurality of gate lines $G_i$ and plural pairs of data lines $D_j$ and $D_{j+1}$, and a plurality of pixels PX connected thereto. With regard to a structure of the liquid crystal display, the liquid crystal display includes lower and upper panels 100 and 200 opposed to each other, and a liquid crystal layer 3 interposed therebetween. Each pixel PX includes first and second switching elements Qa and Qb that are connected to the signal line $G_i$, $D_j$, and $D_{j+1}$, a liquid crystal capacitor Clc, and a storage capacitor Cst.

Unlike the embodiment shown in FIG. 2 and FIG. 3, in the present embodiment, first and second pixel electrodes PEa and PEb are superimposed on each other with an insulator interposed therebetween to form a storage capacitor Cst. In this way, by forming a storage capacitor Cst in each pixel PX, additional wiring for transmitting a common voltage Vcom is not required, thereby increasing the aperture ratio.

Description of the operation and effect of a liquid crystal display including the first and second switching elements Qa and Qb, the liquid crystal capacitor Clc, a color filter CF, a polarizer (not shown), and the liquid crystal panel assembly refers to the description of the same components shown in FIG. 1 to FIG. 5. Therefore, a detailed description thereof will be omitted.

Next, referring to FIG. 14, a liquid crystal panel assembly according to another embodiment of the present invention will be described.

Figure 14:
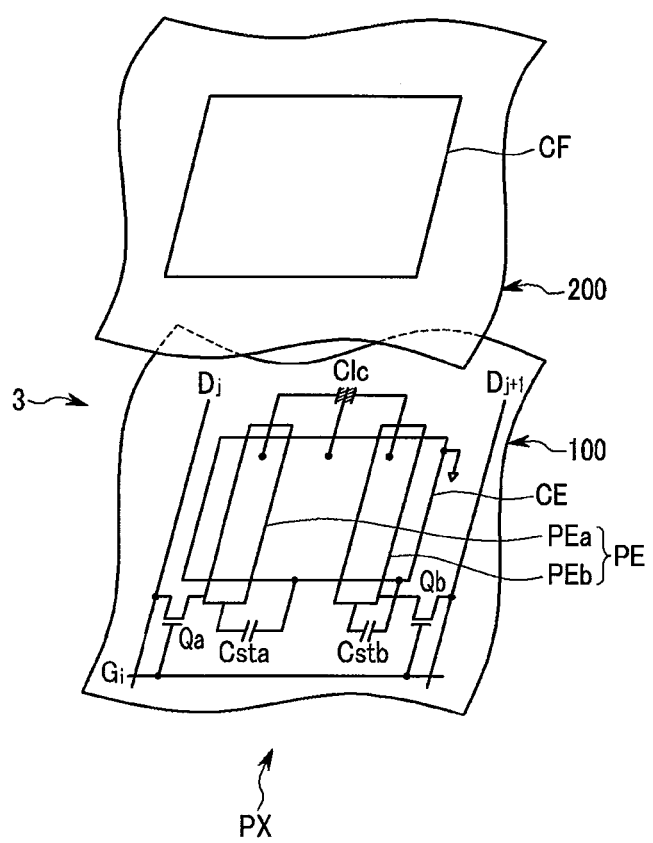

FIG. 14 is an equivalent circuit diagram illustrating one pixel as well as a structure of a liquid crystal display panel according to another embodiment of the present invention.

Referring to FIG. 14, the liquid crystal panel assembly according to the present embodiment also includes a signal line including a plurality of gate lines $G_i$ and plural pairs of data lines $D_j$ and $D_{j+1}$, and a plurality of pixels PX connected thereto. With regard to a structure of the liquid crystal display, the liquid crystal display includes lower and upper panels 100 and 200 opposed to each other, and a liquid crystal layer 3 interposed therebetween.

Each pixel PX includes first and second switching elements Qa and Qb that are connected to the signal line $G_i$, $D_j$, and $D_{j+1}$, a liquid crystal capacitor Clc, and first and second storage capacitors Csta and Cstb.

The first and second switching elements Qa and Qb are three-terminal elements such as a thin film transistor provided in the lower panel 100. A control terminal thereof is connected to the gate lines $G_i$, an input terminal thereof is connected to the data lines $D_j$ and $D_{j+1}$, and an output terminal thereof is connected to the liquid crystal capacitor Clc and the first and second storage capacitors Csta and Cstb.

The liquid crystal capacitor Clc may adopt first and second pixel electrodes PEa and PEb of the lower panel 100 as two terminals, or may adopt the first pixel electrode PEa or the second pixel electrode PEb and a common electrode CE as the two terminals. The first and second pixel electrodes PEa and PEb are connected to the first and second switching elements Qa and Qb. The common electrode CE is formed on a front surface within a region of one pixel PX of the lower panel 100, and is formed on a layer different from a layer where a pixel electrode PE including the first and second pixel electrodes PEa and PEb is formed. A predetermined voltage such as a common voltage Vcom or the like is applied to the common electrode CE. Data voltages having different polarities with respect to the common voltage Vcom are applied to the first and second pixel electrodes PEa and PEb, respectively. Meanwhile, the liquid crystal layer 3 has positive dielectric anisotropy. Liquid crystal molecules of the liquid crystal layer 3 have their long axes aligned to be vertical to horizontal surfaces of the panels 100 and 200 without an electric field.

The first and second storage capacitors Csta and Cstb are formed by superimposing the first and second pixel electrodes PEa and PEb on each other with the common electrode CE and an insulator interposed therebetween. However, the first or second storage capacitor Csta or Cstb may be formed by superimposing the first or second pixel electrode PEa or PEb and a front gate line (not shown) or an additional signal line (not shown) on each other with the insulator interposed therebetween.

A color filter 230 displaying one of primary colors is provided in a region of the upper panel 200 corresponding to the pixel electrode PE. Unlike FIG. 14, a color filter CF may be positioned above or below the pixel electrode PE of the lower panel 100.

At least one polarizer (not shown) is provided in the liquid crystal panel assembly.

The description of the operation and effect of the liquid crystal display including the liquid crystal panel assembly refers to the description of the same components shown in FIGS. 1 to 5. Therefore, a detailed description thereof will be omitted.

Figure 15:
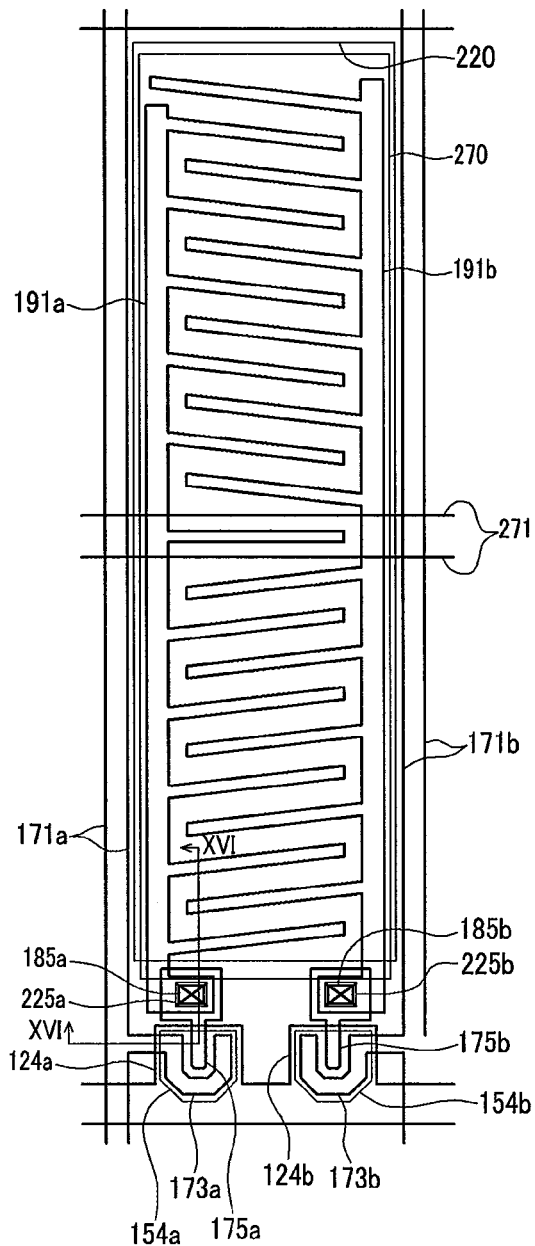
FIG. 15 is a layout view of a liquid crystal panel assembly according to an embodiment of the present invention.
Figure 16:
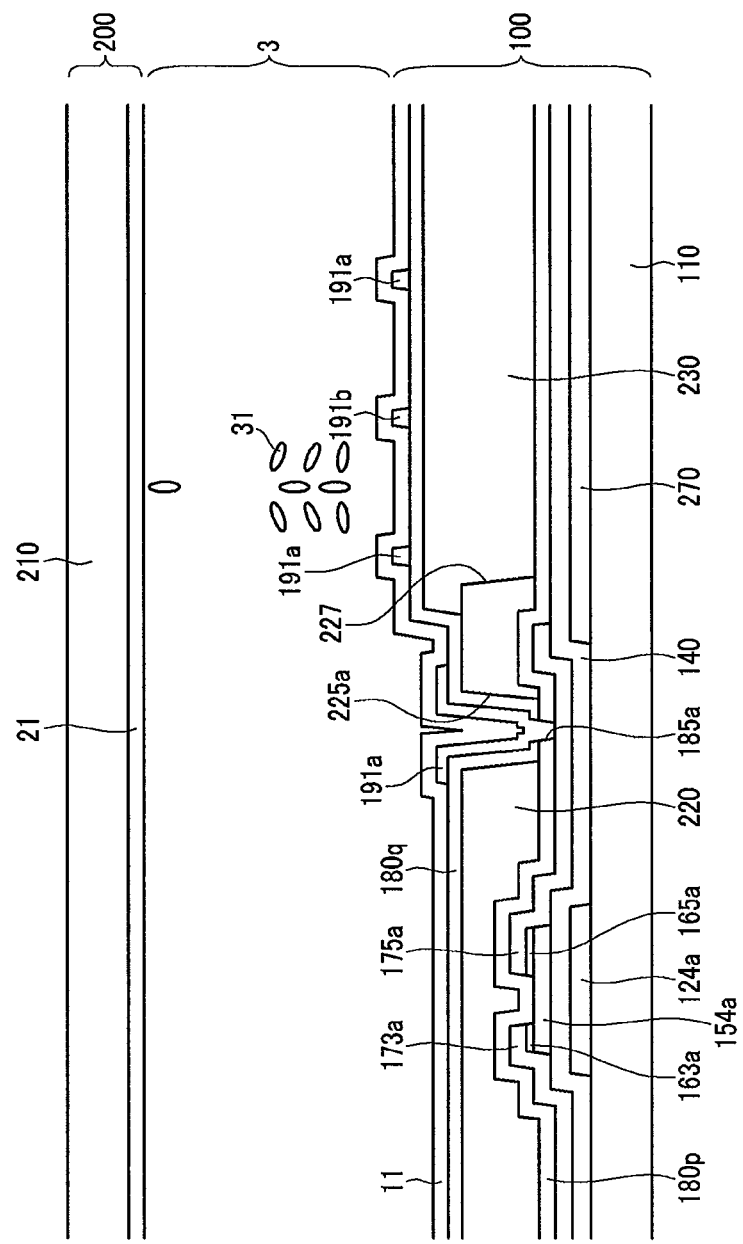
FIG. 16 is a cross-sectional view of the liquid crystal panel assembly taken along line XVI-XVI of FIG. 15.

Hereinafter, referring to FIGS. 15 and 16, an example of the liquid crystal panel assembly shown in FIG. 14 will be described FIG. 15 is a layout view of a liquid crystal panel assembly according to an embodiment of the present invention, and FIG. 16 is a cross-sectional view of the liquid crystal panel assembly taken along line XVI-XVI of FIG. 15.

A layered structured of the liquid crystal panel assembly according to the present embodiment is substantially the same as that of the liquid crystal panel assembly shown in FIGS. 11 and 12.

First, a lower panel 100 will be described.

A plurality of gate lines 121 and a plurality of common voltage lines 271 including plural pairs of first and second gate electrodes 124a and 124b are formed on an insulation substrate 110.

The common voltage lines 271 transmit a common voltage Vcom and extend in a horizontal direction substantially parallel to the gate lines 121. The common voltage lines 271 are positioned between two adjacent gate lines 121 and are spaced from the two gate lines 121 by substantially the same distance.

A plurality of common electrodes 270 are formed on the insulation substrate 110 and the common voltage lines 271. The common electrodes 270 have a quadrangle shape. The common electrodes 270 are arranged in a matrix and almost occupy a space between the gate lines 121. The common electrodes 270 are connected to the common voltage lines 271 to be applied with the common voltage Vcom. The common electrodes 270 may be made of a transparent conductive material such as ITO, IZO, or the like.

A gate insulating layer 140 is formed on the gate lines 121, the common voltage lines 271, and the common electrodes 270. The gate insulating layer 140 prevents the gate lines 121 and the common electrodes 270 from being short-circuited to each other and allows the gate lines 121 and the common electrodes 270 to be electrically insulated from other conductive thin films formed thereon.

Plural pairs of first and second island-type semiconductors 154a and 154b, plural pairs of first and second island-type ohmic contacts 163a and 165a, plural pairs of first and second data lines 171a and 171b, and plural pairs of first and second drain electrodes 175a and 175b are sequentially formed on the gate insulating layer 140.

A lower passivation layer 180p made of silicon nitride or silicon oxide is formed on the first and second data lines 171a and 171b, the first and second drain electrodes 175a and 175b, and exposed portions of the first and second semiconductors 154a and 154b.

A light blocking member 220 that is separated by a predetermined interval and has a plurality of openings 227 is formed on the lower passivation layer 180p. The light blocking member 220 may include a vertically elongated linear part and a quadrangle part corresponding to a thin film transistor. The light blocking member 220 prevents light leakage. A plurality of through-holes 225a and 225b positioned above the first and second drain electrodes 175a and 175b are formed on the light blocking member 220.

A plurality of color filters 230 are formed on the passivation layer 180p and the light blocking member 220. Most of the color filters 230 are disposed within a region surrounded by the light blocking member 220.

Herein, the lower passivation layer 180p may prevent pigments of the color filters 230 from being introduced into the exposed portions of the semiconductors 154a and 154b.

An upper passivation layer 180q is formed on the light blocking member 220 and the color filters 230. The upper passivation layer 180q may be made of an inorganic insulating material such as silicon nitride, silicon oxide, or the like. The upper passivation layer 180q prevents the color filters 230 from being delaminated and prevents an error such as an afterimage that may occur upon driving a screen by suppressing contamination of a liquid crystal layer 3, which is caused due to an organic material such as a solvent introduced from the color filter 230.

However, at least one of the light blocking member 220 and the color filters 230 may be positioned on the upper panel 200. In this case, one of the lower passivation layer 180p and the upper passivation layer 180q of the lower panel 100 may be omitted.

A plurality of contact holes 185a and 185b for exposing the first and second drain electrodes 175a and 175b are formed on the upper passivation layer 180q and the lower passivation layer 180p.

Plural pairs of first and second pixel electrodes 191a and 191b are formed on the upper passivation layer 180q. The first and second pixel electrodes 191a and 191b include a plurality of branch electrodes and a vertical connection portion connecting the branch electrodes. The first and second pixel electrodes 191a and 191b are superimposed with the common electrodes 270 below the first and second pixel electrodes 191a and 191b.

A vertical connection portion of the first pixel electrode 191a elongates vertically on the left side of the common electrode 270. A branch electrode positioned above the common voltage line 271 extends obliquely right-downward from the branch electrode, and a branch electrode positioned below the common voltage line 271 extends obliquely right-upward from the connection portion.

A vertical connection portion of the second pixel electrode 191b elongates vertically on the right side of the common electrode 270. A branch electrode positioned above the common voltage line 271 extends obliquely left-upward from the connection portion and another branch electrode positioned below the common voltage line 271 extends obliquely left-downward from the connection portion.

The branch electrodes of the first and second pixel electrodes 191a and 191b engage with each other by a predetermined interval and are alternately disposed, thereby forming a pectinated pattern.

The liquid crystal layer 3 interposed between the lower panel 100 and the upper panel 200 has positive dielectric anisotropy and includes liquid crystal molecules 31. The liquid crystal molecules 31 have their long axes aligned to be vertical to surfaces of the panels 100 and 200 without an electric field.

The first and second pixel electrodes 191a and 191b that are applied with data voltages from the first and second drain electrodes 175a and 175b constitute a liquid crystal capacitor Clc together with the liquid crystal layer 3 interposed therebetween. Even after first and second thin film transistors Qa and Qb are turned off, the applied voltages are stored.

The first and second pixel electrodes 191a and 191b and the common electrode 270 are also made of a dielectric material, in addition to the gate insulating layer 140 and the upper and lower passivation layers 180p and 180q to constitute first and second storage capacitors Csta and Cstb, thereby improving the voltage storage performance of the liquid crystal capacitor Clc. Some of the color filters 230 positioned between the first and second pixel electrodes 191a and 191b and the common electrodes 270 are removed, resulting in increasing the storage capacitance of the first and second storage capacitors Csta and Cstb.

First and second extension parts 177a and 177b of the first and second drain electrodes 175a and 175b connected to the first and second pixel electrodes 191a and 191b are superimposed with a storage extension part 137 with the gate insulating layer 140 therebetween, thereby forming the first and second storage capacitors Csta and Cstb. The first and second storage capacitors Csta and Cstb strengthen the voltage storage performance of the liquid crystal capacitor Clc.

Alignment layers 11 and 21 are formed on inner surfaces of the lower and upper panels 100 and 200. The two alignment layers 11 and 21 may be horizontal alignment layers.

When the common voltage Vcom is applied to the common electrode 270 and two data voltages having different polarities with respect to the common voltage Vcom are applied to the first and second pixel electrodes 191a and 191b, an electric field substantially parallel to the horizontal surfaces of the panels 100 and 200 is generated in the liquid crystal layer 3. Therefore, the liquid crystal molecules 31 of the liquid crystal layer 3 have their long axes aligned to be horizontal to the electric field. The polarization degree of incident light is varied depending on an inclination degree. Unlike the previous embodiment, in the present embodiment, it is possible to increase the response speed of the liquid crystal molecules 31 and further improve the transmittance of a liquid crystal display by the electric field generated in the liquid crystal layer 3 between the first and second pixel electrodes 191a and 191b, and by the electric field generated in the liquid crystal layer 3 between the common electrodes 270 and the first and second pixel electrodes 191a and 191b. Meanwhile, a horizontal component of the electric field is substantially vertical to the branch electrodes of the first and second pixel electrodes 191a and 191b. As shown in FIG. 15, since alignment directions of the branch electrodes are different from each other on the basis of the common voltage line 271, it is possible to acquire a wide viewing angle by varying alignment directions of the liquid crystal molecules 31.

Next, referring to FIG. 17, a liquid crystal panel assembly according to another embodiment of the present invention will be described.

Figure 17:
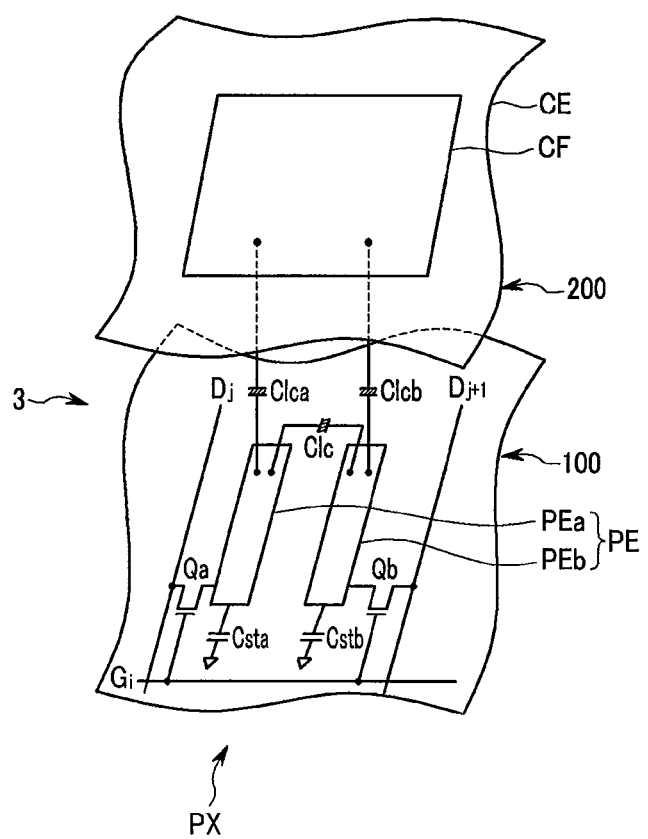
FIG. 17 is an equivalent circuit diagram illustrating a structure of a liquid crystal panel assembly and one pixel according to an embodiment of the present invention.

FIG. 17 is an equivalent circuit diagram illustrating a structure of a liquid crystal panel assembly and one pixel according to an embodiment of the present invention.

Referring to FIG. 17, the liquid crystal panel assembly according to the present embodiment also includes a signal line including a plurality of gate lines $G_i$ and plural pairs of data lines $D_j$ and $D_{j+1}$, and a plurality of pixels PX connected thereto as shown in FIG. 14.

Each pixel PX includes first and second switching elements Qa and Qb that are connected to the signal line $G_i$, $D_j$, and $D_{j+1}$, a liquid crystal capacitor Clc, first and second liquid crystal capacitors Clca and Clcb, and first and second storage capacitors Csta and Cstb.

However, unlike the embodiment shown in FIG. 14, in the present embodiment, a common electrode CE is formed overall on the upper panel 200. The first/second liquid crystal capacitor Clca/Clcb adopts the first/second pixel electrode PEa/PEb of a lower panel 100 and the common electrode CE of the upper panel 200 as its two terminals. The liquid crystal capacitor Clc adopts the first and second pixel electrodes PEa and PEb of the lower panel 100 as the two terminals.

The first and second storage capacitors Csta and Cstb are configured by superimposing a pixel electrode PE including the first and second pixel electrodes PEa and PEb and a signal line (not shown) or a previous gate line (not shown) just above the corresponding gate line with an insulator interposed therebetween.

In the present embodiment, an electric field horizontal to the panels 100 and 200 is generated in a liquid crystal layer 3 by the first and second pixel electrodes PEa and PEb that are applied with data voltages having different polarities. At the same time, additional electric fields are generated in the liquid crystal layer 3 by the first and second pixel electrodes PEa and PEb of the lower panel 100 and the common electrode CE of the upper panel 200. Edges of the first and second pixel electrodes PEa and PEb distort the electric field together with the common electrode CE, thereby creating a horizontal component vertical to the edges of the pixel electrode PEa and PEb. Therefore, liquid crystal molecules of the liquid crystal layer 3 having positive dielectric anisotropy are aligned to be parallel to the electric field, and a variation degree of polarization of light incident in the liquid crystal layer 3 is varied depending on an inclination degree of the liquid crystal molecules.

Unlike the present embodiment, the first and second pixel electrodes PEa and PEb may be superimposed on each other, thereby forming a storage capacitor (not shown).

Hereinafter, referring to FIG. 18 and FIG. 19, an example of the liquid crystal panel assembly shown in FIG. 17 will be described.

Figure 18:
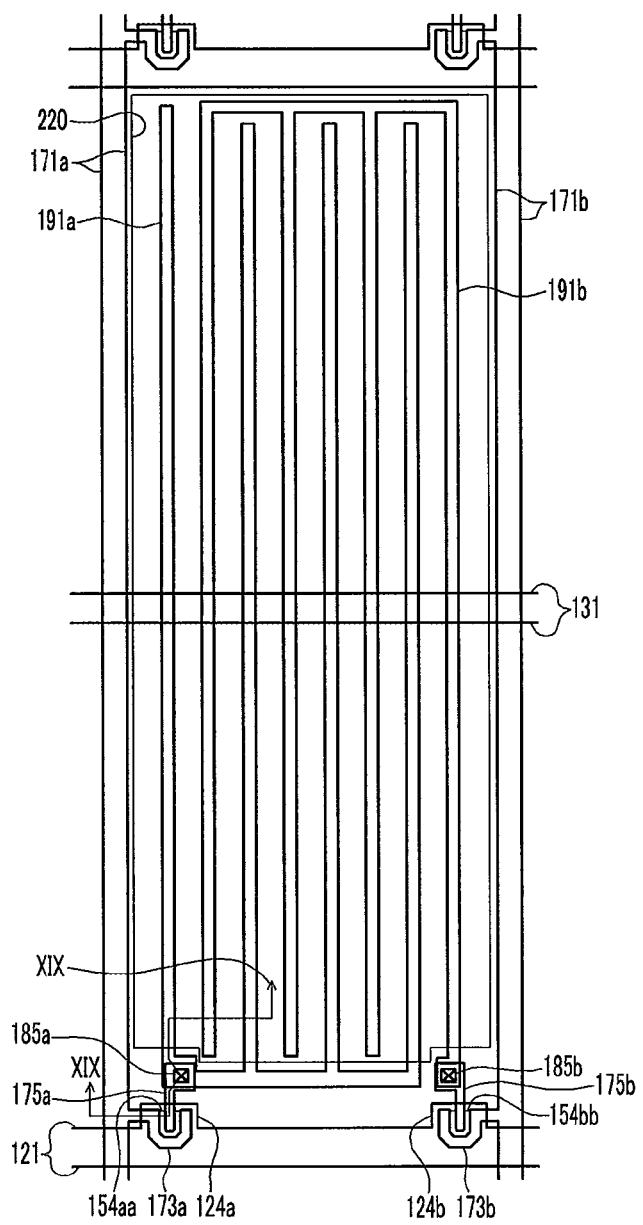
FIG. 18 is a layout view of a liquid crystal panel assembly according to an embodiment of the present invention.
Figure 19:
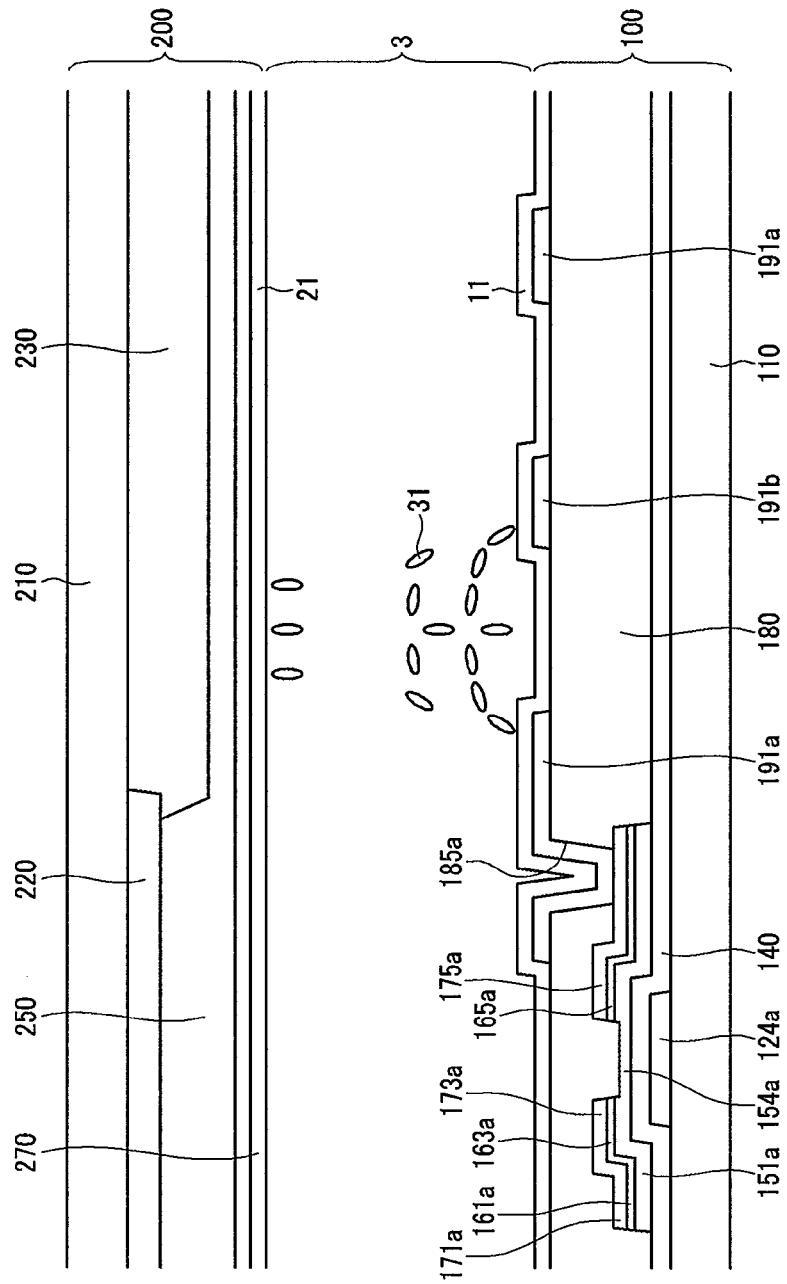
FIG. 19 is a cross-sectional view of the liquid crystal panel assembly taken along line XIX-XIX in FIG. 18.

FIG. 18 is a layout view of a liquid crystal panel assembly according to an embodiment of the present invention, and FIG. 19 is a cross-sectional view of the liquid crystal panel assembly taken along line XIX-XIX in FIG. 18.

A layered structure of the liquid crystal panel assembly according to the present embodiment is substantially the same as that of the liquid crystal panel assembly shown in FIG. 11 and FIG. 12.

First, a lower panel 100 will be described. A plurality of gate lines 121 including plural pairs of first and second gate electrodes 124a and 124b, and a plurality of storage electrode lines 131 are formed on an insulation substrate 110. A gate insulating layer 140 is formed thereon. Plural pairs of first and second linear semiconductors 151a, plural pairs of first linear ohmic contacts 161a and second linear ohmic contacts (not shown), plural pairs of first island-type ohmic contacts 165a and second island-type ohmic contacts (not shown), plural pairs of first and second data lines 171a and 171b, and plural pairs of first and second drain electrodes 175a and 175b are sequentially formed on the gate insulating layer 140. A passivation layer 180, first and second pixel electrodes 191a and 191b, and an alignment layer 11 are sequentially formed thereon.

Next, an upper panel 200 will be described. A light blocking member 220, a color filter 230, an overcoat 250, a common electrode 270, and an alignment layer 21 are sequentially formed on an insulation substrate 210.

Unlike the liquid crystal panel assembly shown in FIG. 11 and FIG. 12, in the present embodiment, the first linear semiconductor 151a and the second linear semiconductor (not shown) are linear and include first and second protrusions 154aa and 154bb protruding along source electrodes 173a and 173b and drain electrodes 175a and 175b, respectively. Further, the linear ohmic contacts 161a also linearly extend along the data lines 171a and include protrusions 163a protruding along the source electrodes 173a. Also, other linear ohmic contacts (not shown) linearly extend along the data lines 171b and include protrusions (not shown) protruding along the source electrodes 173b. The linear semiconductors 151a have substantially the same planar shape as the data lines 171a, the drain electrodes 175a, and the ohmic contacts 161a, 163a, and 165a below the data lines 171a and the drain electrodes 175a. Also, the second linear semiconductors (not shown) have substantially the same planar shape as the data lines 171b, the drain electrodes 175b, and the ohmic contacts (not shown) below the data lines 171b and the drain electrodes 175b In a method of manufacturing the lower panel 100 according to an embodiment of the present invention, the data lines 171a and 171b, the drain electrodes 175a and 175b, the semiconductors 151a, and the ohmic contacts 161a, 163a, and 165a are formed by one photolithography process.

The storage electrode lines 131 are positioned between two adjacent gate lines 121 and are spaced from the two gate lines 121 substantially at the same distance. The first and second pixel electrodes 191a and 191b are superimposed on the storage electrode lines 131 with the gate line insulating layer 140 and the passivation layer 180 interposed therebetween, thereby forming first and second storage capacitors Csta and Cstb. At this time, the passivation layer 180 in a portion where the first and second pixel electrodes 191a and 191b and the storage electrode lines 131 are superimposed over each other may be removed.

Each of the first and second pixel electrodes 191a and 191b has a horizontal part and a plurality of vertical parts. The horizontal part of the first pixel electrode 191a is positioned at a lower end and the plurality of vertical parts of the first pixel electrode 191a extend upward from the horizontal part. The horizontal part of the second pixel electrode 191b is positioned at an upper end and the plurality of vertical parts of the second pixel electrode 191b extend downward from the horizontal part. The horizontal parts and the vertical parts of the first and second pixel electrodes 191a and 191b are substantially perpendicular to each other. The vertical parts of the first and second pixel electrodes 191a and 191b are alternately disposed.

In addition, various characteristics of the liquid crystal panel assembly and the liquid crystal display including the same shown in FIG, FIG. 1, FIG. 5, FIG. 6, and FIG. 7 may also be applied to the liquid crystal panel assembly shown in FIG. 18 and FIG. 19.

Next, referring to FIG. 20, a liquid crystal panel assembly according to another embodiment of the present invention will be described.

Figure 20:
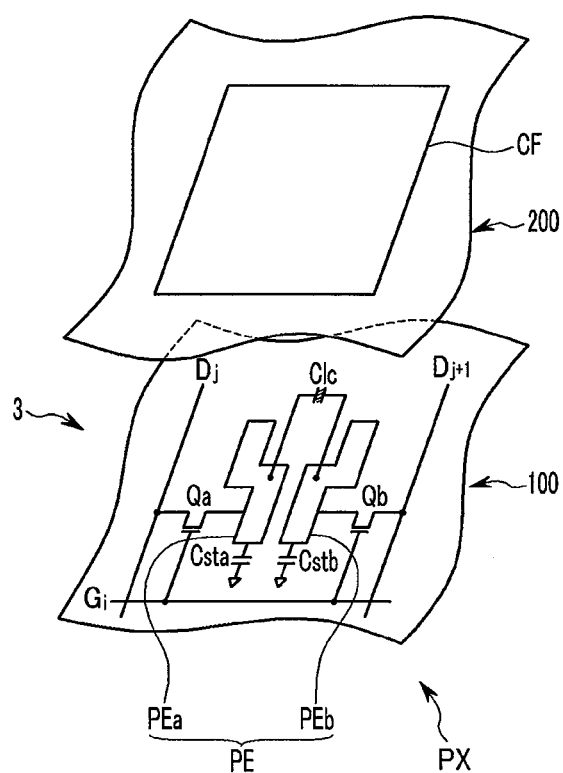
FIG. 20 is an equivalent circuit diagram illustrating a structure of a liquid crystal panel assembly and one pixel according to an embodiment of the present invention.

FIG. 20 is an equivalent circuit diagram illustrating a structure of a liquid crystal panel assembly and one pixel according to an embodiment of the present invention.

Referring to FIG. 20, the liquid crystal panel assembly according to the present embodiment also includes signal lines including a plurality of gate lines $G_i$ and plural pairs of data lines $D_j$ and $D_{j+1}$, and a plurality of pixels PX connected thereto, like in the embodiment shown in FIG. 8.

In the present embodiment, each pixel PX includes first and second switching elements Qa and Qb that are connected to the signal lines $G_i$, $D_j$, and $D_{j+1}$, a liquid crystal capacitor Clc, a liquid crystal capacitor Clc, and first and second storage capacitors Csta and Cstb.

A control terminal of each of the first/second switching elements Qa and Qb is connected to the gate line $G_i$, an input terminal thereof is connected to the data lines $D_j/D_{j+1}$, and output terminal thereof is connected to first/second pixel electrodes PEa/PEb.

The liquid crystal capacitor Clc adopts the first and second pixel electrodes PEa and PEb of a lower panel 100 as two terminals. The liquid crystal capacitor Clc adopts the first and second pixel electrodes PEa and PEb, and includes a liquid crystal layer 3 as a dielectric material. A distance between the first and second pixel electrodes PEa and PEb depends on positions of the first and second pixel electrodes PEa and PEb. Data voltages having different polarities with respect to a common voltage Vcom are applied to the first and second pixel electrodes PEa and PEb. Meanwhile, the liquid crystal layer 3 has positive dielectric anisotropy. Liquid crystal molecules of the liquid crystal layer 3 have their long axes aligned to be vertical to surfaces of the panels without an electric field.

The first and second storage capacitors Csta and Cstb are formed by superimposing the first and second pixel electrodes PEa or PEb on an additional signal line (not shown) or a front gate line (not shown) just above the corresponding gate line with an insulator interposed therebetween.

Unlike the present embodiment, the first and second pixel electrodes PEa and PEb may be superimposed with each other with the insulator interposed therebetween, thereby forming one storage capacitor (not shown).

An electric field substantially horizontal to the panels 100 and 200 is generated in the liquid crystal layer 3 by the first and second pixel electrodes PEa and PEb that are applied with the data voltages having the different polarities with respect to the common voltage Vcom. The Electric field becomes stronger when the first and second pixel electrodes PEa and PEb are closer to each other in comparison with a case when the first and second pixel electrodes PEa and PEb are farther from each other. Therefore, the inclination degree of the liquid crystal molecules positioned where the first and second pixel electrodes PEa and PEb are closer to each other is relatively large so as to be more parallel to the electric field, and consequently, the transmittance of light increases. In this way, since two regions having different light transmittances exist in one pixel PX, the side gamma curve may approach the front gamma curve maximumly by properly adjusting the distance between the first and second pixel electrodes PEa and PEb, thereby improving the side visibility. Further, it is possible to improve the transmittance of the liquid crystal display by mixing portions where the first and second pixel electrodes PEa and PEb are farther from each other and portions where the first and second pixel electrodes PEa and PEb are closer to each other alternately.

In addition, the description of the operation and effect of the liquid crystal display including a color filter CF, a polarizer (not shown), and the liquid crystal panel assembly according to the present embodiment refers to the description of the same components shown in FIG. 1 to FIG. 5. Therefore, the detailed description thereof will be omitted.

Hereinafter, referring to FIG. 21 and FIG. 22, an example of the liquid crystal panel assembly shown in FIG. 20 will be described.

Figure 21:
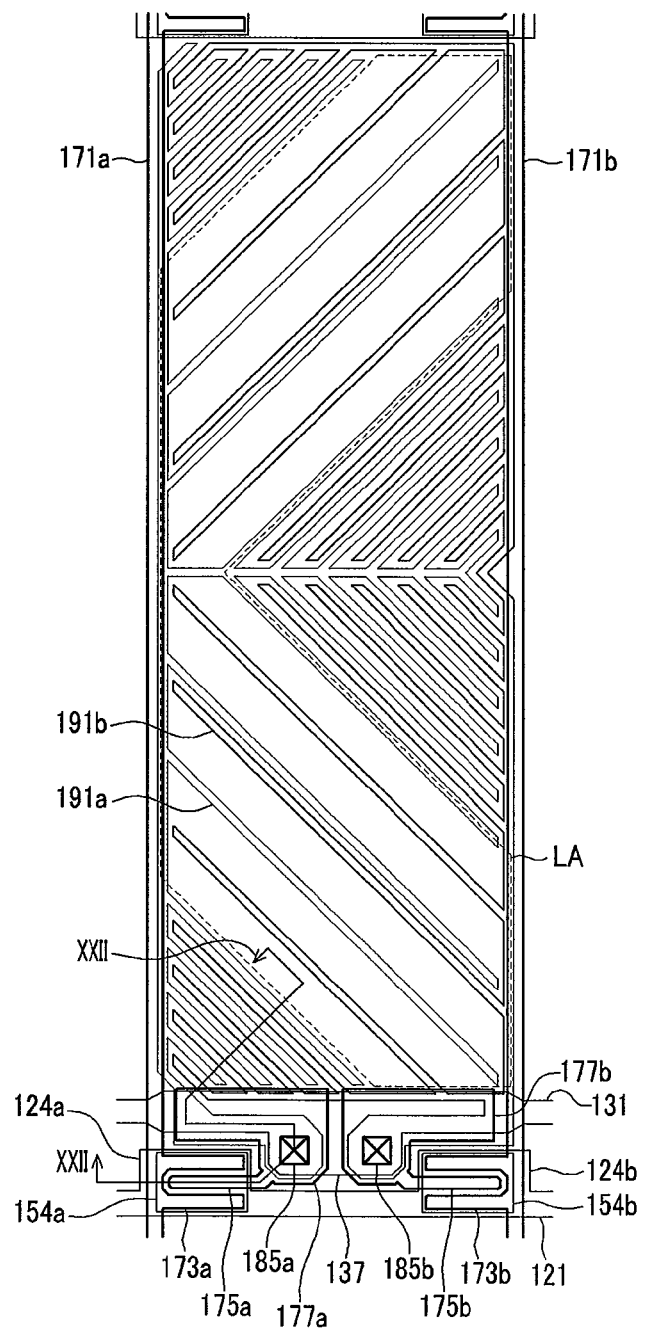
FIG. 21 is a layout view of a liquid crystal panel assembly according to an embodiment of the present invention.
Figure 22:
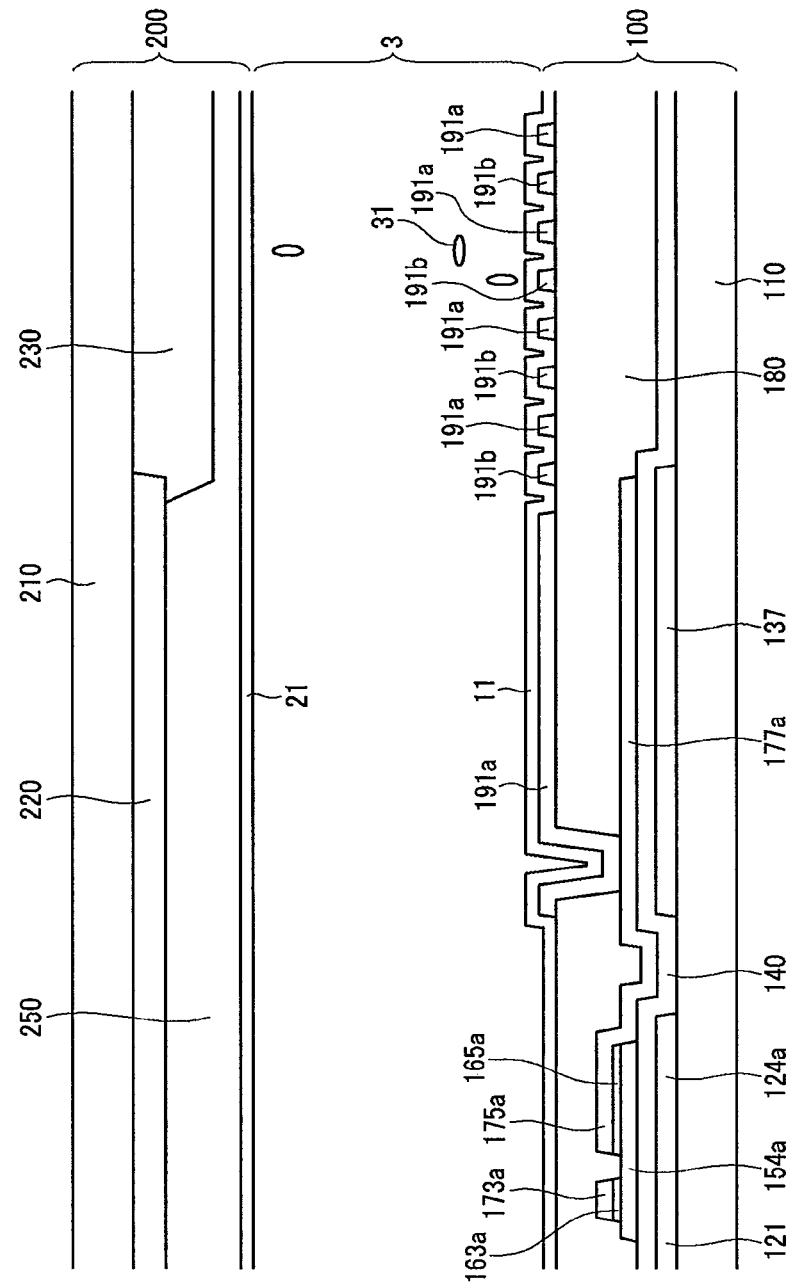
FIG. 22 is a cross-sectional view of the liquid crystal panel assembly take along line XXII-XXII in FIG. 21.

FIG. 21 is a layout view of a liquid crystal panel assembly according to an embodiment of the present invention, and FIG. 22 is a cross-sectional view of the liquid crystal panel assembly take along line XXII-XXII in FIG. 21.

The layered structured of the liquid crystal panel assembly according to the present embodiment is substantially the same as that of the liquid crystal panel assembly shown in FIG. 11 and FIG. 12.

First, a lower panel 100 will be described. A plurality of gate lines 121 including plural pairs of first and second gate electrodes 124a and 124b and a plurality of storage electrode lines 131 are formed on an insulation substrate 110. A gate insulating layer 140 is formed thereon. Plural pairs of first and second island-type semiconductors 154a and 154b, plural pairs of first and second island-type ohmic contacts 163a and 165a, plural pairs of first and second data lines 171a and 171b, and plural pairs of first and second drain electrodes 175a and 175b are sequentially formed on the gate insulating layer 140. A passivation layer 180, first and second pixel electrodes 191a and 191b having a plurality of branch portions, and an alignment layer 11 are sequentially formed thereon. The branch portions of the first and second pixel electrodes 191a and 191b extend obliquely while being inclined at an angle of approximately 45 degrees with respect to the gate line 121 or the storage electrode line 131.

Next, an upper panel 200 will be described. A light blocking member 220, a color filter 230, an overcoat 250, a common electrode 270, and an alignment layer 21 are sequentially formed on an insulation substrate 210.

Unlike the embodiment shown in FIG. 11 and FIG. 12, in the present embodiment, there exists a low-gray region LA where the branch portions of the first and second pixel electrodes 191a and 191b are farther from each other and a high-gray region where the branch portions of the pixel electrodes 191a and 191b are closer to each other, that is, a region except for the low-gray region LA. The high-gray region is divided into three parts such as an upper part, a lower part, and a middle part. The low-gray region LA is positioned between the upper part or the lower part and the middle part of the high-gray region, and has a "<" shape. The gap between the branch portions of the first and second pixel electrodes 191a and 191b in the low-gray region LA may be in the range of 6 µm to 20 µm. The gap between the branch portions of the first and second pixel electrodes 191a and 191b in the high-gray region may be in the range of 2 µm to 5 µm. However, In the low-gray region LA and the high-gray region, the gap between the branch portions and a width of the branch portions of the first and second pixel electrodes 191a and 191b may be varied.

It is possible to vary the inclination angle of the liquid crystal molecules and display different luminances with respect to one set of image information by varying the gap between the first and second pixel electrodes 191a and 191b in one pixel. Further, it is possible to make an image viewed from a side closer to an image viewed from the front maximumly by properly adjusting the gap between the branch portions of the first and second pixel electrodes 191a and 191b. Therefore, it is possible to improve the side visibility and enhance transmittance.

In addition, the storage electrode line 131 includes a plurality of storage electrodes 137 protruding downward. Each of the first and second drain electrodes 175a and 175b is superimposed with the storage electrode 137, thereby forming first and second storage capacitors Csta and Cstb.

Further, the first and second data lines 171a and 171b include plural pairs of first and second source electrodes 173a and 173b bent in a C shape or in a transversely turned C shape toward the first and second gate electrodes 124a and 124b.

In addition, various characteristics of the liquid crystal panel assembly and the liquid crystal display including the same shown in FIG. 1, FIG. 5, FIG. 6, and FIG. 7 may be also applied to the liquid crystal panel assembly shown in FIG. 21 and FIG. 22.

Next, referring to FIG. 23 to FIG. 25, another example of the liquid crystal panel assembly shown in FIG. 20 will be described.

Figure 23:
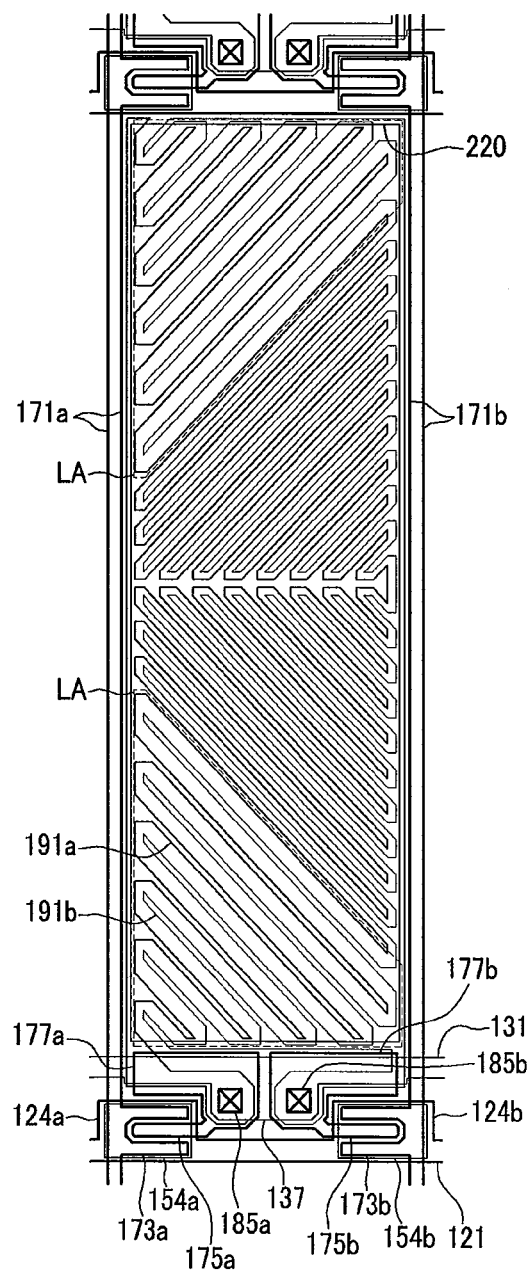
FIG. 23 to FIG. 25 are layout views of a liquid crystal panel assembly according to an embodiment of the present invention.
Figure 24:
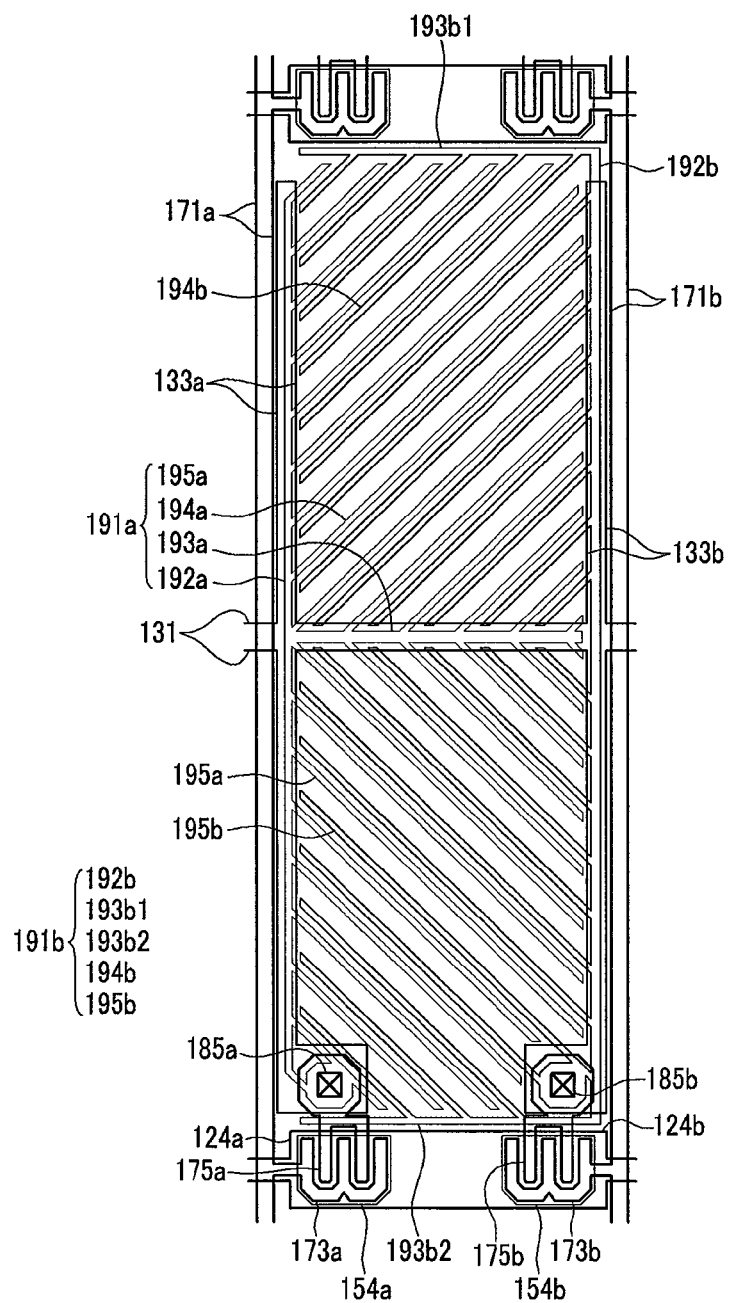
Figure 25:
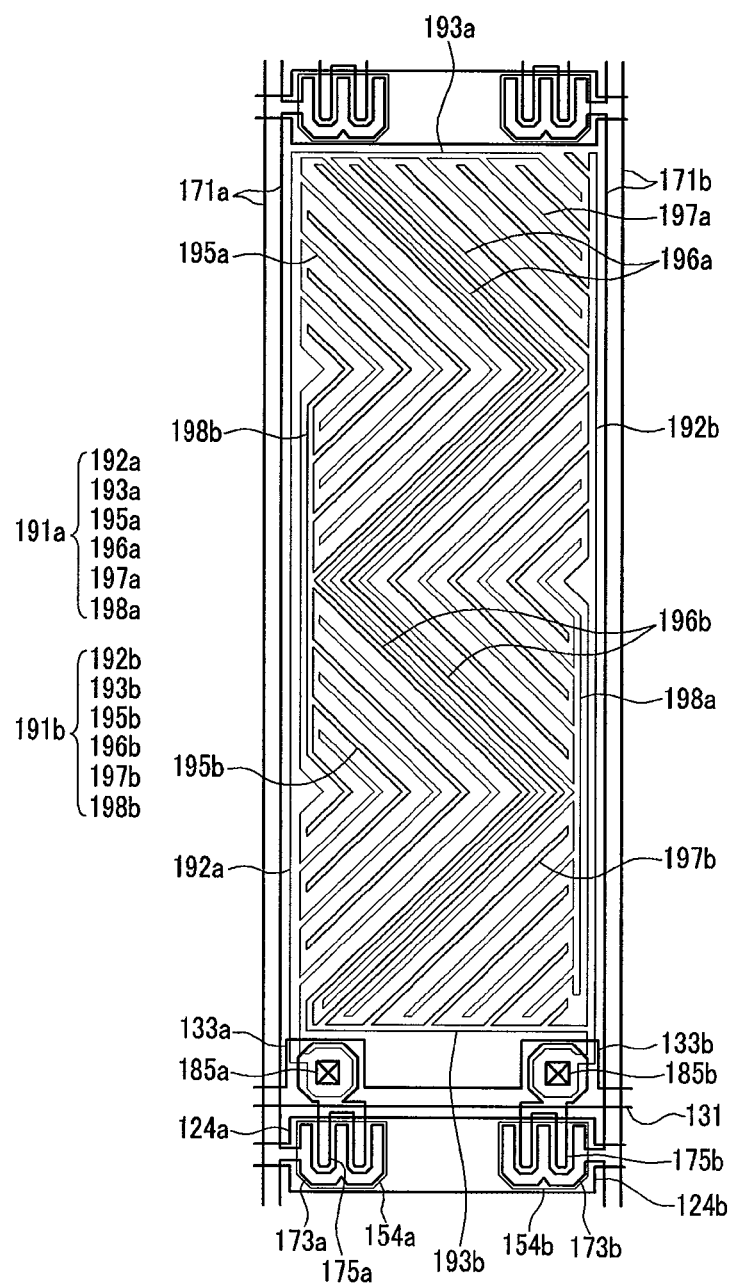

FIG. 23 to FIG. 25 are layout views of a liquid crystal panel assembly according to an embodiment of the present invention.

First, a liquid crystal panel assembly shown in FIG. 23 will be described.

The liquid crystal panel assembly according to the present embodiment is substantially the same as the liquid crystal panel assembly shown in FIG. 21 and FIG. 22.

However, the liquid crystal panel assembly further includes a light blocking member 220 in addition to a lower panel 100 or an upper panel 200. The light blocking member 220 prevents light leakage between pixel electrodes 191 and defines opening regions facing the pixel electrodes.

Further, the low-gray region LA where first and second pixel electrodes 191a and 191b are farther from each other is dividedly positioned in the upper part and the lower part with respect to the high-gray region where the first and second electrodes 191a and 191b are closer to each other, that is, the region except for the low-gray region LA. The gap between the first and second pixel electrodes 191a and 191b may be different from that in FIG. 21. The gap between the branch portions of the first and second pixel electrodes 191a and 191b in the low-gray region LA may be in the range of 6 µm to 20 µm. The gap between the branch portions of the first and second pixel electrodes 191a and 191b in the high-gray region may be in the range of 2 µm to 5 µm.

Next, a liquid crystal panel assembly shown in FIG. 24 will be described.

A layered structured of the liquid crystal panel assembly according to the present embodiment is substantially the same as that of the liquid crystal panel assembly shown in FIG. 21 and FIG. 22. Hereinafter, points that are different from the embodiment shown in FIG. 21 and FIG. 22 will be mainly described.

First, a lower panel (not shown) will be described. A plurality of gate lines 121 including plural pairs of first and second gate electrodes 124a and 124b and a plurality of gate conductors including a plurality of storage electrode lines 131 are formed on an insulation substrate (not shown).

The storage electrode lines 131 include plural pairs of first and second storage electrodes 133a and 133b. The first and second storage electrodes 133a and 133b are spaced from each other by a predetermined distance. Each of the first and second storage electrodes 133a and 133b elongates vertically and includes an extension part in a lower end thereof. The storage electrode lines 131 including the storage electrodes 133a and 133b are superimposed by the first and second pixel electrodes 191a and 191b above the storage electrode lines 131, thereby forming first and second storage capacitors Csta and Cstb.

A gate insulating layer (not shown), plural pairs of first and second island-type semiconductors 154a and 154b, plural pairs of first and second island-type ohmic contacts (not shown), plural pairs of first and second data lines 171a and 171b, and plural pairs of first and second drain electrodes 175a and 175b are sequentially formed on the gate conductors 121 and 131.

The first and second data lines 171a and 171b include plural pairs of first and second source electrodes 173a and 173b bent in a W shape while extending traversely toward the first and second gate electrodes 124a and 124b. The first and second drain electrodes 175a and 175b include a pair of rod-type end portions and the other end portions having a large dimension.

A passivation layer 180 is formed on the first and second data lines 171a and 171b, the first and second drain electrodes 175a and 175b, and exposed parts of the semiconductors 154a and 154b. The first and second pixel electrodes 191a and 191b are formed thereon.

The first pixel electrode 191a includes a vertical part 192a, a horizontal part 193a, an upper branch part 194a, and a lower branch part 195a. The horizontal part 193a substantially vertically halves the vertical part 192a and extends to the right side. The upper branch part 194a is positioned above the horizontal part 193a and extends obliquely right-upward from the vertical part 192a or the horizontal part 193a. The lower branch part 195a is positioned below the horizontal part 193a and extends obliquely right-downward from the vertical part 192a or the horizontal part 193a.

The second pixel electrode 191b includes a vertical part 192b, an upper horizontal part 193b1, a lower horizontal part 193b2, an upper branch part 194b, and a lower branch part 195b. The vertical part 192b is opposed to the vertical part 192a via the horizontal part 193a of the first pixel electrode 191a. The upper and lower horizontal parts 193b1 and 193b2 extend to a left side at an upper end and a lower end of the vertical part 192b, respectively, and are inclined substantially at a right angle with respect to the vertical part 192b. The upper branch part 194b is positioned above the horizontal part 193a of the first pixel electrode 191a and extends obliquely left-downward from the vertical part 192b or the upper horizontal part 193b1 of the second pixel electrode 191b. The lower branch part 195b is positioned below the horizontal part 193a of the first pixel electrode 191a and extends obliquely left-upward from the vertical part 192a or the lower horizontal part 193b2 of the second pixel electrode 191b.

The branch parts 194a, 194b, 195a, and 195b of the first and second pixel electrodes 191a and 191b may be inclined at an angle of approximately 45 degrees with respect to the gate lines 121 or the storage electrode lines 131.

The upper and lower branch parts 194a, 194b, 195a, and 195b of the first and second pixel electrodes 191a and 191b are alternately disposed. A region where the adjacent first and second pixel electrodes 191a and 191b are farther from each other and a region where the adjacent first and second pixel electrodes 191a and 191b are closer to each other are alternately positioned. That is, the upper/lower branch part 194b/195b of the second pixel electrode 191b is closer to the upper/lower branch part 194a/195b of the first pixel electrode 191a that is disposed above/below the upper/lower branch part 194b/195b than the upper/lower branch part 194a/195a that is disposed below/above the upper/lower branch part 194b/195b. Alternatively, the upper/lower branch part 194b and 195b of the second pixel electrode 191b may be closer to the upper/lower branch part 194a/195a of the first pixel electrode 191a that is positioned below/above the upper/lower branch part 194b/195b.

In this way, it is possible to vary the intensity of an electric field generated in a liquid crystal layer 3 and to vary the inclination angle of liquid crystal molecules 31 by alternately disposing regions where the first and second pixel electrodes 191a and 191b are farther from each other and regions where the first and second pixel electrodes 191a and 191b are closer to each other. Also, it is possible to improve the side visibility and transmittance of a liquid crystal display.

Unlike the present embodiment, several regions where the first and second pixel electrodes 191a and 191b are farther from each other may be positioned next to the region where the first and second pixel electrodes 191a and 191b are closer to each other. Further, several regions where the first and second pixel electrodes 191a and 191b are closer to each other may be positioned next to the region where the first and second pixel electrodes 191a and 191b are farther from each other. In addition, it is possible to maximize the transmittance and improve the side visibility by adjusting a distance between the first and second pixel electrodes 191a and 191b or adjusting the arrangement of the region where the first and second pixel electrodes 191a and 191b are farther from each other and the region where the first and second pixel electrodes 191a and 191b are closer to each other.

Next, an alignment layer (not shown) is formed on a passivation layer (not shown) and the pixel electrodes 191a and 191b.

Hereinafter, an upper panel (not shown) will be described. A light blocking member (not shown), a color filter (not shown), an overcoat (not shown), and the alignment layer (not shown) are sequentially formed on an insulation substrate (not shown).

In addition, various characteristics of the liquid crystal panel assembly shown in FIG. 21 and FIG. 22 may also be applied to the liquid crystal panel assembly shown in FIG. 24.

Next, a liquid crystal panel assembly shown in FIG. 25 will be described.

The liquid crystal panel assembly according to the present embodiment is substantially the same as the liquid crystal panel assembly shown in FIG. 24. Hereinafter, points that are different from the embodiment shown in FIG. 24 will be mainly described.

Unlike the liquid crystal panel assembly shown in FIG. 24, in the present embodiment, the storage electrode lines 131 are closer to a lower gate line 121 between two gate lines 121, are superimposed with the first and second drain electrodes 175a and 175b in an upper layer, respectively, and include the first and second storage electrodes 133a and 133b protruding upward. The first and second storage electrodes 133a and 133b are superimposed with large area of parts of the first and second drain electrodes 175a and 175b, respectively, with an insulator 140 interposed therebetween, thereby forming first and second storage capacitors Csta and Cstb.

Further, the liquid crystal panel assembly according to the present embodiment includes the first and second pixel electrodes 191a and 191b formed on the passivation layer 180. The overall outline of the first and second pixel electrodes 191a and 191b has a rectangular shape.

The first pixel electrode 191a includes a left vertical part 192a extending lengthily in a vertical direction, a right vertical part 198a extending shortly in the vertical direction, an upper horizontal part 193a, a plurality of curved branch parts 195a and a plurality of linear branch parts 197a that extend from the parts 192a, 193a, and 198a, and a pair of central curve parts 196a bent three times while extending lengthily in the vertical direction. The second pixel electrode 191b includes a right vertical part 198b extending shortly in the vertical direction, a right vertical part 192b extending lengthily in the vertical direction, a lower horizontal part 193b, a plurality of curved branch parts 195b and a plurality of linear branch parts 197b that extend from the parts 192b, 193b, and 198b, and a pair of central curve parts 196b bent three times while extending lengthily in the vertical direction.

The curved branch parts 195a, the linear branch parts 197a, and the central curve parts 196a of the first pixel electrode 191a and the curved branch parts 195b, the linear branch parts 197b, and the central curve parts 196b of the second pixel electrode are alternately disposed, respectively. A distance between the adjacent curved branch parts 195a and 195b or a distance between the adjacent linear branch parts 197a and 197b is longer than a distance between the adjacent central curved parts 196a and 196b. Accordingly, the intensity of an electric field generated between the central curve parts 196a and 196b is stronger than the intensity of an electric field generated between the curved branch parts 195a and 195b or between the linear branch parts 197a and 197b. The inclination angle of liquid crystal molecules of the liquid crystal layer (not shown) in the central curve parts 196a and 196b are larger than that in the curved branch parts 195a and 195b or in the linear branch parts 197a and 197b. It is possible to vary luminance in one pixel by varying the inclination angle of the liquid crystal molecules in the one pixel and to improve side visibility of the liquid crystal display by adjusting a gap between the pixel electrodes 191a and 191b.

Next, referring to FIG. 26, a liquid crystal panel assembly according to another embodiment of the present invention will be described.

Figure 26:
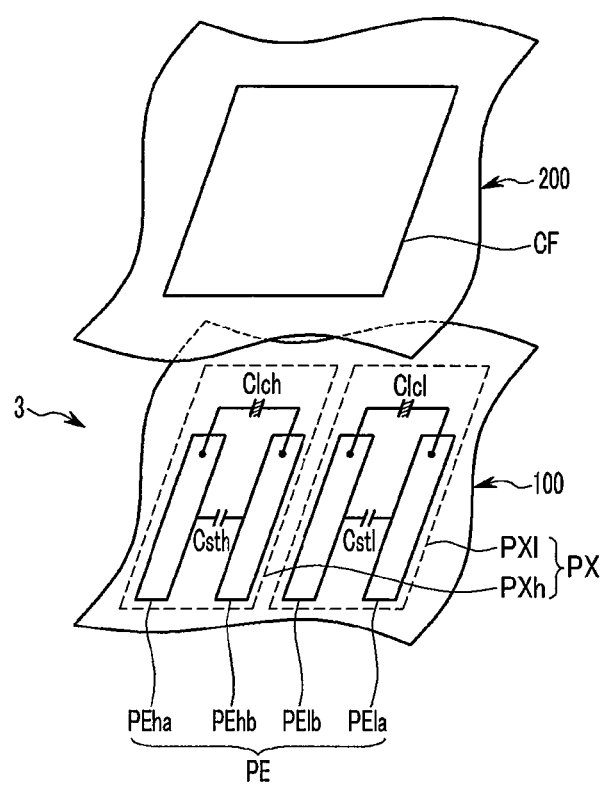
FIG. 26 is an equivalent circuit diagram illustrating a structure of a liquid crystal panel assembly and one pixel according to an embodiment of the present invention.

FIG. 26 is an equivalent circuit diagram illustrating a structure of a liquid crystal panel assembly and one pixel according to an embodiment of the present invention.

Referring to FIG. 26, each pixel PX includes a pair of first and second subpixels PXh and PXl. The first and second subpixels PXh and PXl include liquid crystal capacitors Clch and Clcl and storage capacitors Csth and Cstl. At least one of the first and second subpixels PXh and PXl includes two switching elements (not shown) connected to a gate line, a data line, and the liquid crystal capacitor Clch and Clcl.

The liquid crystal capacitors Clch and Clcl adopt first subpixel electrodes PEha and PEla and second subpixel electrodes PEhb and PElb of a lower panel 100 as two terminals. A liquid crystal layer 3 between the first subpixel electrodes PEha and PEla and the second subpixel electrodes PEhb and PElb serves as a dielectric material. The second subpixel electrodes PEhb and PElb are connected to separate switching elements (not shown), respectively. At least one of the first subpixel electrodes PEha and PEla is also connected to a separate switching element (not shown). However, contrary to this, the second subpixel electrodes PEhb and PElb may be provided in an upper panel 200. At this time, the second subpixel electrodes PEhb and PElb may be applied with an additional common voltage Vcom without being connected to the switching element. Meanwhile, liquid crystal molecules of the liquid crystal layer 3 have positive dielectric anisotropy and are aligned to be vertical to the panels 100 and 200.

The storage capacitor Csth/Cstl performing an auxiliary role of the liquid crystal capacitor Clch/Clcl are formed of the first subpixel electrode PEha/PEla and the second subpixel electrode PEhb/PElb of the lower panel 100 with an insulator interposed therebetween.

In addition, the description of a color filter CF and a polarizer (not shown) is the same as that in the previous embodiment and thus is omitted.

Hereinafter, referring to FIG. 27, an example of the liquid crystal panel assembly shown in FIG. 26 will be described in detail.

Figure 27:
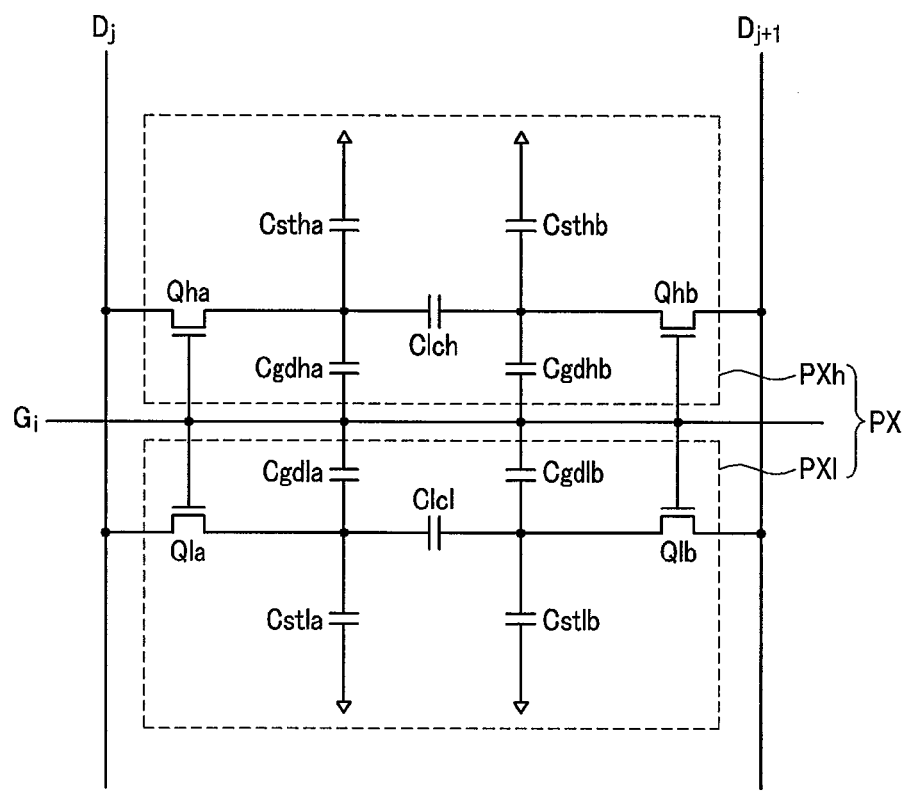
FIG. 27 is an equivalent circuit diagram illustrating two subpixels of a liquid crystal panel assembly according to another embodiment of the present invention.

FIG. 27 is an equivalent circuit diagram illustrating two subpixels of a liquid crystal panel assembly according to another embodiment of the present invention.

Referring to FIG. 27, the liquid crystal panel assembly according to the present embodiment includes a signal line including gate lines $G_i$, and first and second data lines $D_j$ and $D_{j+1}$ adjacent to each other, and pixels PX connected thereto.

The pixel PX includes a pair of first and second subpixels PXh and PXl. Each of the first and second subpixels PXh and PXl includes first and second switching elements Qha and Qhb and Qla and Qlb connected to the gate lines $G_i$ and the data lines $D_j$ and $D_{j+1}$, liquid crystal capacitors Clch and Clcl connected thereto, and first and second storage capacitors Cstha and Csthb and Cstla and Cstlb.

Data voltages having polarities opposite to each other with respect to a common voltage Vcom are applied to the first and second data lines $D_j$ and $D_{j+1}$.

A control terminal and an input terminal of each of the first switching element Qha/Qla of the first/second subpixel PXh/PXl are connected to the gate line $G_i$ and the first data line $D_j$, respectively. A control terminal and an input terminal of each of the second switching element Qhb/Qlb of the first/second subpixel PXh/PXl are connected to the gate line $G_i$ and the second data line $D_{j+1}$, respectively. Further, an output terminal of each of the first switching element Qha/Qla is connected to the liquid crystal capacitor Clch/Clcl and the first storage capacitor Cstha/Cstla. An output terminal of each of the second switching element Qhb/Qlb is connected to the liquid crystal capacitor Clch/Clcl and the second storage capacitor Csthb/Cstlb.

Drain electrodes and gate electrodes of the first and second switching elements Qha and Qhb/Qla and Qlb of the first/second subpixel PXh/PXl constitute first and second parasitic capacitors Cgdha and Cgdhb/Cgdla and Cgdlb.

In the present embodiment, it is possible to vary the magnitude of kickback voltages at both terminals of each of the liquid crystal capacitors Clch and Clcl by adjusting capacities of the first and second parasitic capacitors Cgdha, Cgdhb, Cgdla, and Cgdlb, resulting in varying the charging voltage of each of the subpixels PXh or PXl.

For example, a case in which 7V and −7V are applied to the first and second data lines $D_j$, the magnitude of the kickback voltages in the second parasitic capacitor Cgdhb of the first subpixel PXh and the first parasitic capacitor Cgdla of the second subpixel PXh is 0.5V, and the magnitude of the kickback voltages in the first parasitic capacitor Cgdha of the first subpixel PXh and the second parasitic capacitor Cgdlb of the second subpixel PXh is 1V, respectively, will be described. Then, when a gate-off voltage Voff is applied to the gate line $G_i$, each of voltages of the two terminals of the liquid crystal capacitors Clch and Clcl are lowered by the kickback voltages. As a result, 6V and −7.5V are applied to both terminals of the liquid crystal capacitor Clch, the charging voltage becomes 13.5V. Also, 6.5V and −8V are applied to both terminals of the liquid crystal capacitor Clcl, and the charging voltage becomes 14.5V. Accordingly, pixel voltages of the first and second subpixels PXh and PXl become 13.5V and 14.5V, respectively, thereby making the inclination angles of the liquid crystal molecules different from each other and varying the transmittance of light in the first and second subpixels PXh and PXl. As described above, it is possible to improve the visibility of the liquid crystal display and enhance the transmittance of the liquid crystal display without reducing data voltages, by adjusting capacities of the first and second parasitic capacitors Cgdha, Cgdhb, Cgdla, and Cgdlb.

The description of the liquid crystal capacitors Clch and Clcl and the first and second storage capacitors Cstha, Csthb, Cstla, and Cstlb is the same as that in the previous embodiment. Therefore, the detailed description thereof is omitted.

Hereinafter, referring to FIG. 28A and FIG. 28B, an example of the liquid crystal panel assembly shown in FIG. 27 will be described.

Figure 28A:
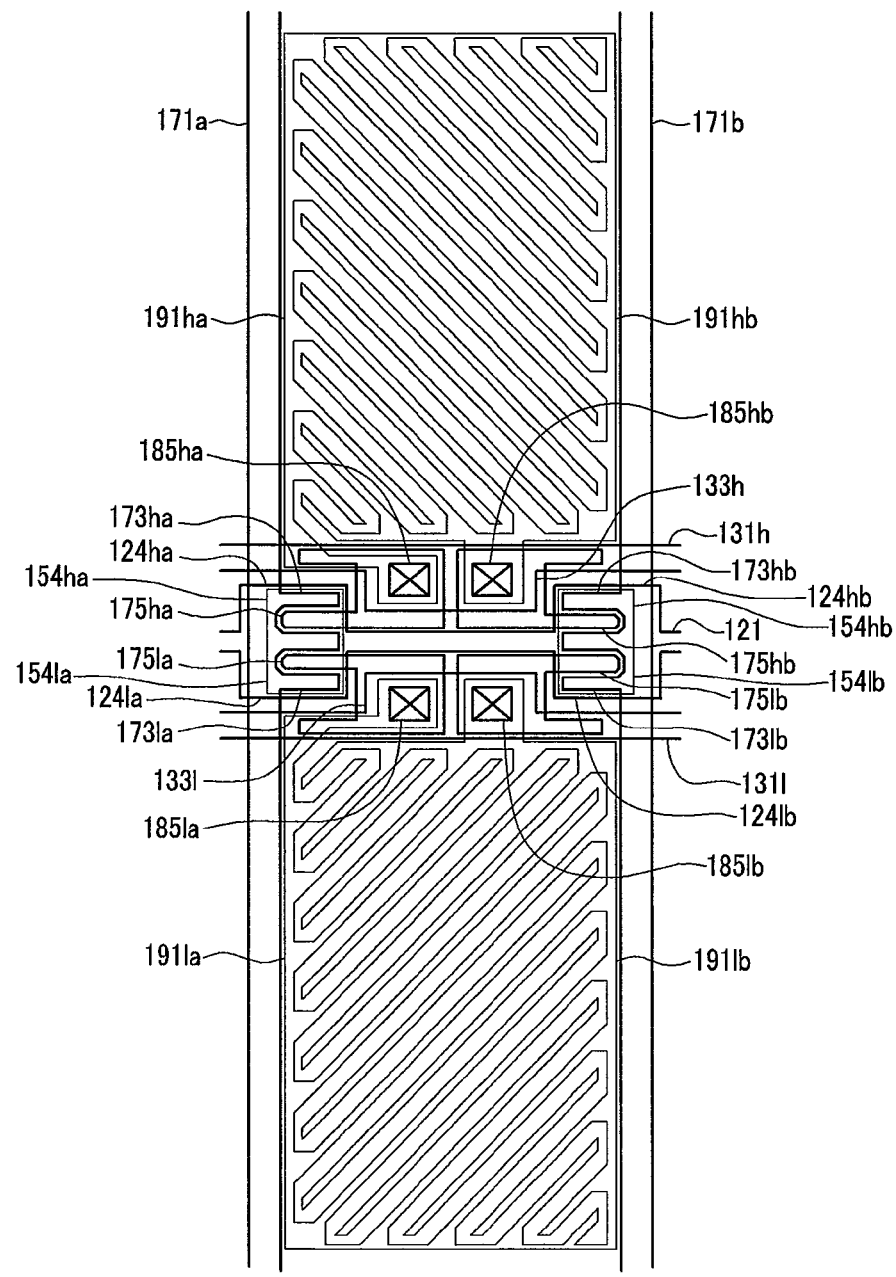
FIG. 28A is a layout view of a liquid crystal panel assembly according to an embodiment of the present invention.
Figure 28B:
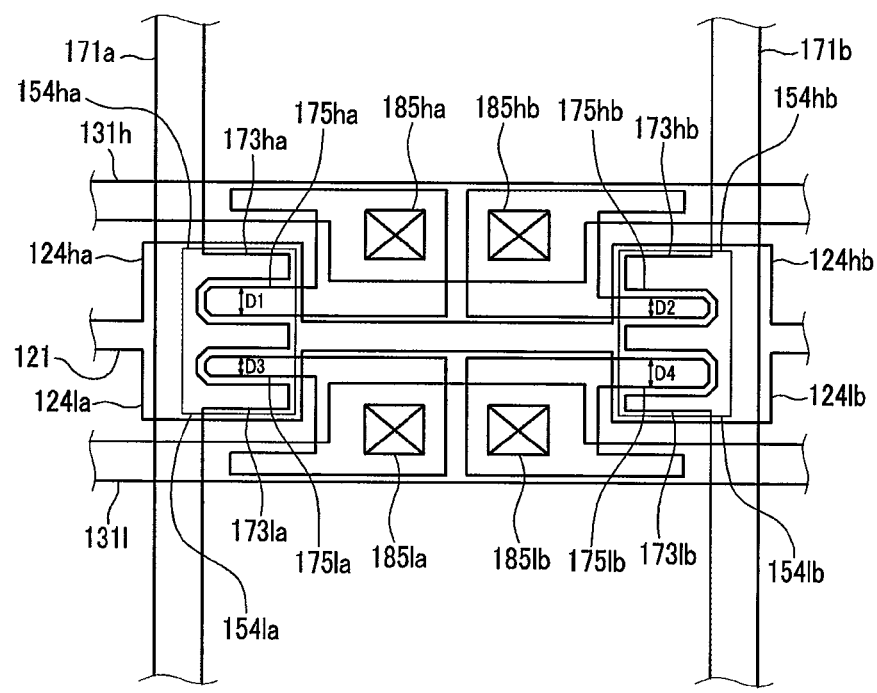
FIG. 28B is an enlarged layout view of switching elements of the liquid crystal panel assembly shown in FIG. 28A.

FIG. 28A is a layout view of a liquid crystal panel assembly according to an embodiment of the present invention, and FIG. 28B is an enlarged layout view of switching elements of the liquid crystal panel assembly shown in FIG. 28A.

A layered structured of the liquid crystal panel assembly according to the present embodiment is substantially the same as that of the liquid crystal panel assembly shown in FIG. 21 and FIG. 22.

First, a lower panel (not shown) will be described. A plurality of gate lines 121 including plural pairs of first gate electrodes 124ha and 124la and second gate electrodes 124hb and 124lb, and plural pairs of upper and lower storage electrode lines 131h and 131l including a plurality of storage electrodes 133h and 133l are formed on an insulation substrate (not shown). A gate insulating layer (not shown), plural pairs of first semiconductors 154ha and 154la and second semiconductors 154hb and 154lb, plural pairs of first island-type ohmic contacts (not shown) and second island-type ohmic contacts (not shown), plural pairs of first and second data lines 171a and 171b including first source electrodes 173ha and 173la and second source electrodes 173hb and 173lb, plural pairs of first drain electrodes 175ha and 175la and second drain electrodes 175hb and 175lb, a passivation layer (not shown) including a plurality of contact holes (185ha, 185la, 185hb, 185lb), and plural pairs of first subpixel electrodes 191ha and 191la and second subpixel electrodes 191hb and 191lb are sequentially formed thereon.

Next, an upper panel (not shown) will be described. A light blocking member (not shown), a color filter (not shown), an overcoat (not shown), and an alignment layer (not shown) are sequentially formed on the insulation substrate (not shown).

The gate lines 121 and the storage electrode lines 131h and 131l extend while crossing the center of a pixel PX. The gate lines 121 are positioned between the storage electrode lines 131h and 131l.

The first and second subpixel electrodes 191ha and 191hb of a first subpixel PXh are positioned above the gate lines 121. The first and second subpixel electrodes 191la and 191lb of a second subpixel PXl are positioned below the gate lines 121. In the first and second subpixels PXh and PXl, the first and second subpixel electrodes 191ha and 191hb and 191la and 191lb include a plurality of branch parts extending obliquely to the gate lines 121, and the branch parts of the first and second subpixel electrodes 191ha and 191hb and 191la and 191lb are alternately disposed.

In the present embodiment, as shown in FIG. 28B, a superimposition area between the second gate electrode 124hb and the second drain electrode 175hb constituting a second switching element Qhb of the first subpixel PXh may be smaller than that between the first gate electrode 124ha and the first drain electrode 175ha constituting a first switching element Qha of the first subpixel PXh. For example, a ratio of the superimposition area between the second gate electrode 124hb and the second drain electrode 175hb constituting the second switching element Qhb to the superimposition area between the first gate electrode 124ha and the first drain electrode 175ha constituting the first switching element Qha may be 1:1.1 to 1:10 or 1:2 to 1:6. Furthermore, in a case where the drain electrodes 175ha and 175hb superimposed with the gate electrodes 124ha and 124hb are linear, the ratio of the superimposition areas is equal to a ratio of widths between the drain electrodes 175ha and 175hb. That is, a ratio of a width D2 of the second drain electrode 175hb to a width D1 of the first drain electrode 175ha may be about 1:1.1 to about 1:10 or about 1:2 to about 1:6.

The superimposition area between the first gate electrode 124la and the first drain electrode 175la constituting a first switching element Qla of the second subpixel PXl may be smaller than that between the second gate electrode 124lb and the second drain electrode 175lb constituting a second switching element Qlb of the first subpixel PXl.

For example, a ratio between the superimposition area between the first gate electrode 124la and the first drain electrode 175la constituting the first switching element Qla and the superimposition area between the second gate electrode 124lb and the second drain electrode 175lb constituting the second switching element Qlb may be about 1:1.1 to about 1:10 or about 1:2 to about 1:6. Furthermore, in a case where the drain electrodes 175la and 175lb superimposed with the gate electrodes 124la and 124lb are linear, the ratio between the superimposition areas is equal to a ratio of widths between the drain electrodes 175la and 175lb. That is, a ratio between a width D3 of the first drain electrode 175la and a width D4 of the second drain electrode 175lb may be about 1:1.1 to about 1:10 or about 1:2 to about 1:6.

As described above, it is possible to adjust the capacities of parasitic capacitors Cgdha and Cgdhb and Cgdla and Cgdlb by adjusting the ratios between the superimposition areas between the first and second gate electrodes 124ha, 124hb, 124la, and 124lb and the first and second drain electrodes 175ha, 175hb, 175la, and 175lb.

In this way, it is possible to make the capacity of the first parasitic capacitor Cgdha of the first subpixel PXh 1.1 to 10 times larger than the capacity of the second parasitic capacitor Cgdhb and to make the capacity of the second parasitic capacitor Cgdlb of the second subpixel PXl 1.1 to 10 times larger than the capacity of the first parasitic capacitor Cgdla.

Further, the capacity of the first parasitic capacitor Cgdha of the first subpixel PXh may be substantially equal to the capacity of the second parasitic capacitor Cgdlb of the second subpixel PXl. Further, the capacity of the second parasitic capacitor Cgdhb of the first subpixel PXh may be substantially equal to the capacity of the first parasitic capacitor Cgdla of the second subpixel PXl.

Therefore, it is possible to make charging voltages of the first and second subpixels PXh and PXl, that is, pixel voltages, different from each other, and to improve side visibility.

Since data voltages applied to the first and second data lines 171a and 171b have polarities opposite to each other, it is possible to increase the response speed of the liquid crystal molecules and improve the transmittance of the liquid crystal display by increasing the driving voltage.

In addition, various characteristics in the embodiment shown in FIG. 21 and FIG. 22 may be applied to the present embodiment.

Hereinafter, referring to FIG. 29, another example of the liquid crystal panel assembly shown in FIG. 26 will be described.

Figure 29:
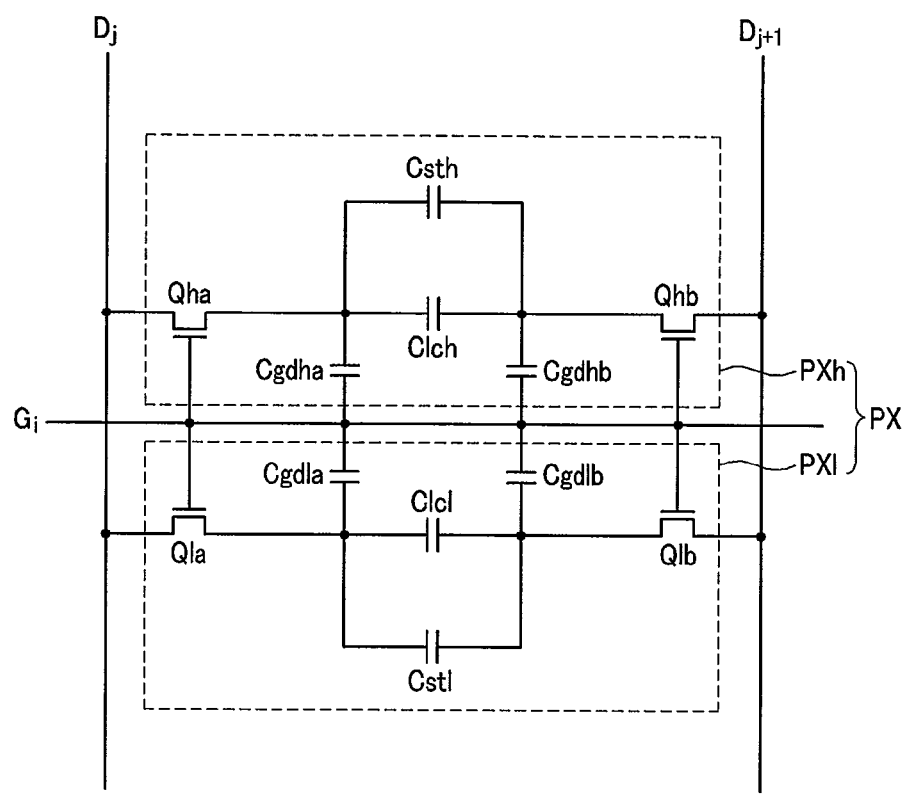
FIG. 29 to FIG. 34 are equivalent circuit diagrams of two subpixels of a liquid crystal panel assembly according to another embodiment of the present invention.

FIG. 29 is an equivalent circuit diagram of two subpixels of a liquid crystal panel assembly according to another embodiment of the present invention.

Unlike the liquid crystal panel assembly shown in FIG. 27, in the liquid crystal panel assembly according to the present embodiment, a first or second subpixel PXh or PXl includes one storage capacitor Csth or Cstl. Therefore, when the one storage capacitor Csth or Cstl is formed on each subpixel PXh or PXl, an additional wiring for transmitting a common voltage Vcom needs not to be formed, thereby increasing the aperture ratio.

Next, referring to FIG. 1 described above in addition to FIG. 30 to FIG. 33, another example of the liquid crystal panel assembly shown in FIG. 26 will be described.

FIG. 30 to FIG. 33 are equivalent circuit diagrams of two pixels of a liquid crystal panel assembly according to another embodiment of the present invention.

Figure 30:
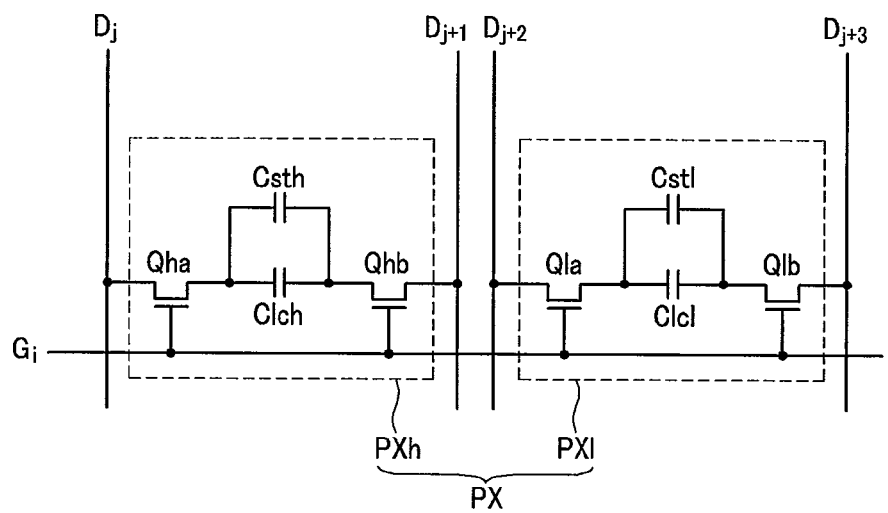

Referring to FIG. 30, the liquid crystal panel assembly according to the present embodiment includes a signal line including a gate line $G_i$, and first to fourth data lines $D_j$, $D_{j+2}$, and $D_{j+3}$ adjacent to each other, and pixels PX connected thereto.

The pixels PX include a pair of first and second subpixels PXh and PXl. Each of the first and second subpixels PXh/PXl includes first and second switching elements Qha and Qhb/Qla and Qlb connected to the gate line $G_i$ and the data lines $D_j$ and $D_{j+1}/D_{j+2}$ and $D_{j+3}$, a liquid crystal capacitor Clch/Clcl connected thereto, and a storage capacitor Csth/Cstl.

In a liquid crystal display including the liquid crystal panel assembly, a signal controller 600 receives input image signals R, G, and B for one pixel PX and converts the input image signals R, G, and B into an output image signal DAT for the two subpixels PXh and PXl to be transmitted to a data driver 500. Alternatively, gray voltages for the two subpixels PXh and PXl are independently generated in a gray voltage generator 800, and are alternately supplied to the data driver 500 or are alternately selected in the data driver, thereby applying different voltages to the two subpixels PXh and PXl. However, at this time, the image signals may be corrected or gray voltage sets may be generated so that a composed gamma curve of the two subpixels PXh and PXl is closer to a reference gamma curve at the front. For example, the composed gamma curve at the front may be conformed to the reference gamma curve at the front that is determined to be the most suitable for the liquid crystal assembly, and the composed gamma curve at the side may be the closest to the reference gamma curve at the front. Accordingly, it is possible to improve the side visibility of the liquid crystal display.

Further, by applying data voltages having polarities opposite to each other to the data lines $D_j$ and $D_{j+1}/D_{j+2}$ and $D_{j+3}$ connected to the first/second subpixel PXh/PXl, it is possible to increase a driving voltage and improve transmittance and response speed.

Figure 31:
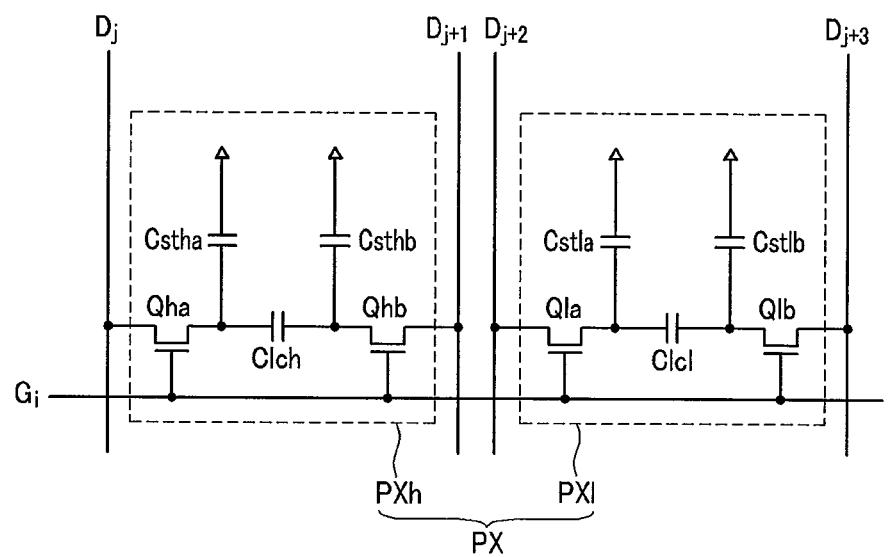

Next, unlike the liquid crystal panel assembly shown in FIG. 30, referring to FIG. 31, in the liquid crystal panel assembly according to the present embodiment, each of the first or second subpixels PXh or PXl includes one storage capacitor Csth or Cstl. In addition, the description of the embodiment shown in FIG. 13 or FIG. 30 may be applied to the present embodiment.

Figure 32:
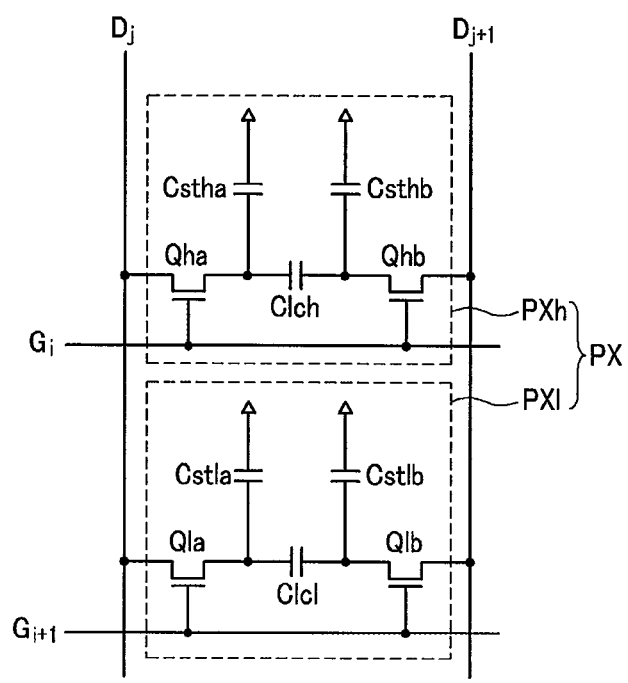

Next, referring to FIG. 32, the liquid crystal panel assembly according to the present embodiment includes a signal line including first and second gate lines $G_i$, and $G_{i+1}$ and data lines $D_j$, and $D_{j+1}$ adjacent to each other, and pixels PX connected thereto.

The pixels PX include the pair of first and second subpixel PXh and PXl. The first/second subpixel PXh/PXl includes first and second switching elements Qha and Qhb/Qla and Qlb, a liquid crystal capacitor Clch/Clcl connected thereto, and first and second storage capacitors Cstha and Csthb/Cstla and Cstlb.

Unlike the liquid crystal panel assembly shown in FIG. 31, in the liquid crystal panel assembly according to the present embodiment, the first and second subpixels PXh and PXl constituting one pixel PX are adjacent to each other in a column direction and are connected to different gate lines $G_i$ and $G_{i+1}$. The first and second subpixels PXh and PXl are applied with the different data voltages at the same time in the embodiment shown in FIG. 26, while the first and second subpixels PXh and PXl are applied with the different data voltages with a time disparity in the present embodiment. As described above, it is possible to improve visibility by varying the pixel voltages of the two subpixels PXh and PXl. Further, like the previous embodiments, the voltages applied to both terminals of the liquid crystal capacitors Clch and Clcl of the first and second subpixels PXh and PXl have different polarities with respect to a common voltage Vcom, thereby acquiring the same effects.

Figure 33:
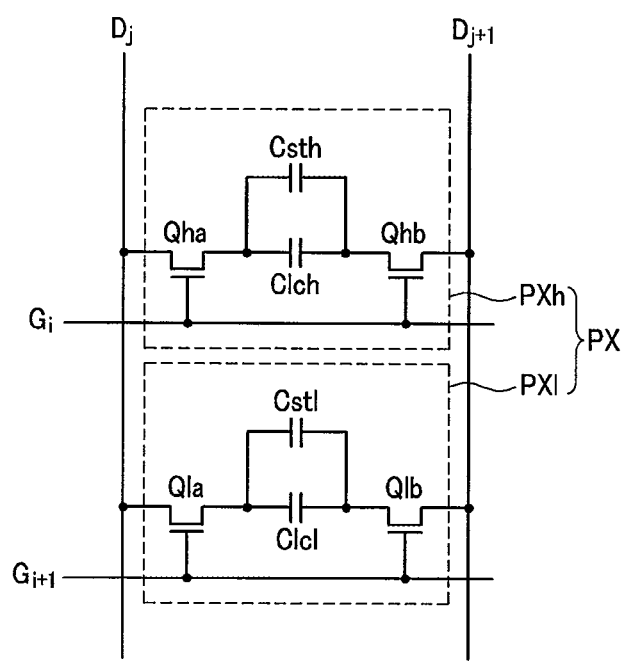

Meanwhile, unlike the liquid crystal panel assembly shown in FIG. 32, in the liquid crystal panel assembly shown in FIG. 33, each of the first and second subpixels PXh and PXl includes one storage capacitor Csth or Cstl.

Next, referring to FIG. 34, another example of the liquid crystal panel assembly shown in FIG. 26 will be described.

Figure 34:
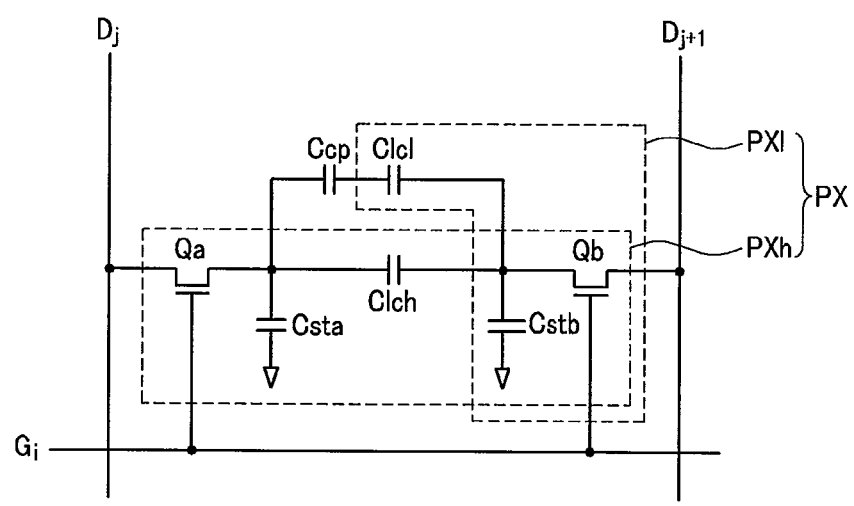

FIG. 34 is an equivalent circuit diagram of two subpixels of a liquid crystal panel assembly according to another embodiment of the present invention.

Referring to FIG. 34, the liquid crystal panel assembly according to the present embodiment includes a signal line including a gate line Gi and first and second data lines $D_j$ and $D_{j+1}$ adjacent to each other, and pixels PX connected thereto. Hereinafter, points that are different from the previous embodiments shown in FIG. 24 will be mainly described.

The pixels PX include a pair of first and second subpixels PXh and PXl, and a coupling capacitor Ccp connected to the two subpixels PXh and PXl. The first subpixel PXh includes first and second switching elements Qa and Qb, a liquid crystal capacitor Clch connected thereto, and first and second storage capacitors Csta and Cstb. The second subpixel PXl includes the second switching element Qb connected to the capacitor Ccp, a liquid crystal capacitor Clcl connected thereto, and a second storage capacitor Cstb.

The first switching element Qa applies a data voltage from the data line $D_j$ to the liquid crystal capacitor Clch and the coupling capacitor Ccp according to a gate signal from the gate line $G_i$, and the second switching element Qb receives a data voltage opposite to the data voltage of the data line $D_j$ from the data line $D_{j+1}$ to apply the data voltage to the two liquid crystal capacitors Clch and Clcl. Therefore, since a voltage applied to both terminals of the liquid crystal capacitor Clcl of the second subpixel PXl is smaller than a voltage applied to both terminals of the liquid crystal capacitor Clch of the second subpixel PXl by a voltage applied to the coupling capacitor Ccp, a voltage charged in the liquid crystal capacitor Clcl is always smaller than a voltage charged in the liquid crystal capacitor Clch.

An appropriate ratio of the charging voltages of the liquid crystal capacitors Clch and Clcl can be acquired by adjusting the capacitance of the coupling capacitor Ccp. Therefore, it is possible to improve the side visibility of a liquid crystal display.

Various characteristics in the previous embodiment may also be applied to the liquid crystal panel assembly according to the present embodiment.

Next, referring to FIG. 35, an example of the liquid crystal panel assembly shown in FIG. 34 will be described.

Figure 35:
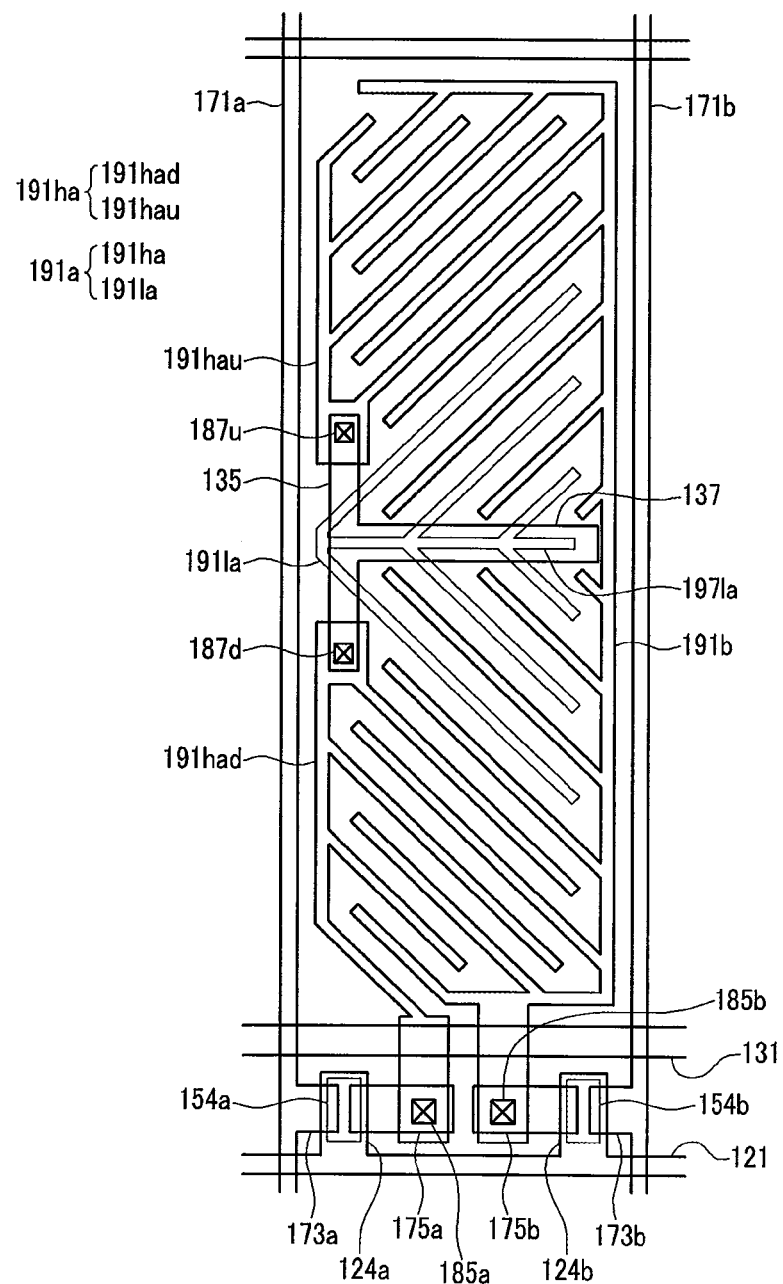
FIG. 35 is a layout view of a liquid crystal panel assembly according to an embodiment of the present invention.

FIG. 35 is a layout view of a liquid crystal panel assembly according to an embodiment of the present invention.

A layered structured of the liquid crystal panel assembly according to the present embodiment is substantially the same as that of the liquid crystal panel assembly shown in FIG. 21 and FIG. 22.

First, a lower panel (not shown) will be described. A plurality of gate lines 121 including plural pairs of first and second gate electrodes 124a and 124b, a plurality of storage electrode lines 131, and a plurality of connection electrodes 135 including a horizontal electrode 137 are formed. A gate insulating layer (not shown), plural pairs of first and second semiconductors 154a and 154b, plural pairs of first and second island-type ohmic contacts (not shown), plural pairs of first and second data lines 171a and 171b, plural pairs of first and second drain electrodes 175a and 175b, a passivation layer (not shown), and a first pixel electrode 191a and a second pixel electrode 191b including plural pairs of first and second subpixel electrodes 191ha and 191la are sequentially formed thereon.

The first subpixel electrode 191ha includes upper and lower subpixel electrodes 191hau and 191had, and the second subpixel electrode 191la is positioned between the upper and lower subpixel electrodes 191hau and 191had. The upper and lower subpixel electrodes 191hau and 191 had are connected to the connection electrodes 135 below the upper and low subpixel electrodes 191hau and 191had through contact holes 187d and 187u to be applied with the same voltage.

The upper and lower subpixel electrodes 191hau and 191had of the first subpixel electrode 191ha have a vertical part and a plurality of branch parts, respectively. The second subpixel electrode 191la includes a horizontal part 197la and the branch part. The second pixel electrode 191b includes a vertical part elongated in a vertical direction, the horizontal part, and the plurality of branch parts. The branch parts of the first pixel electrode 191a and the branch parts of the second pixel electrode 191b are alternately disposed. The branch parts of the first and second pixel electrodes 191a and 191b adjacent to each other and a liquid crystal layer 3 therebetween constitute liquid crystal capacitors Clch and Clcl. The horizontal part 197la of the second subpixel electrode 191la is superimposed with the horizontal electrode 137 of the connection electrode 135 that is applied with the same voltage as the first subpixel electrode 191ha, thereby constituting the coupling capacitor Ccp. The storage electrode lines 131 and the first and second pixel electrodes 191a and 191b are superimposed with each other, thereby constituting first and second storage capacitors Csta and Cstb.

In addition, various characteristics of the liquid crystal panel assembly shown in FIG. 34 and the previous embodiments may also be applied to the present embodiment.

Next, referring to FIG. 36, another example of the liquid crystal panel assembly shown in FIG. 26 will be described in detail.

Figure 36:
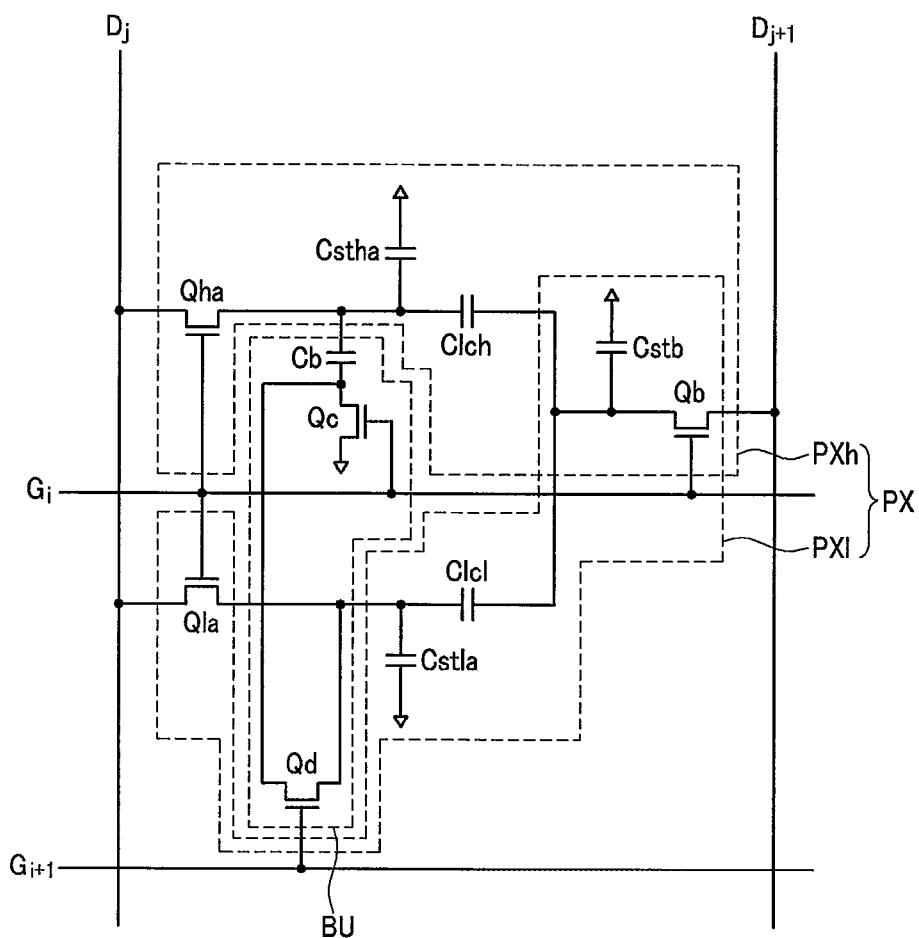
FIG. 36 is an equivalent circuit diagram of two subpixels of a liquid crystal panel assembly according to another embodiment of the present invention.

FIG. 36 is an equivalent circuit diagram of two subpixels of a liquid crystal panel assembly according to another embodiment of the present invention.

Referring to FIG. 36, the liquid crystal panel assembly according to the present embodiment includes a signal line including two gate lines $G_i$ and $G_{i+1}$ adjacent to each other, first and second data lines $D_j$ and $D_{j+1}$, and a common voltage line (not shown), and a plurality of pixels PX connected thereto.

Each of the pixels PX includes first and second subpixels PXh and PXl, and a boost-up unit BU. The first/second subpixel PXh/PXl includes a first switching element Qha/Qla, a second switching element Qb, a liquid crystal capacitor Clch/Clcl, a first storage capacitor Cstha/Cstla, and a second storage capacitor Cstb. The boost-up unit BU includes a third switching element Qc, a fourth switching element Qd, and a boost-up capacitor Cb.

The control terminal of the first switching element Qha/Qla of the first/second subpixel PXh/PXl are connected to the gate line $G_i$, the input terminal thereof is connected to the first data line $D_j$, and the output terminal thereof is connected to the liquid crystal capacitor Clch/Clcl and the first storage capacitor Cstha/Cstla. A control terminal of the second switching element Qb is connected to the gate line $G_i$, an input terminal of the second switching element Qb is connected to the second data line $D_{j+1}$, and an output terminal of the second switching element Qb is connected to the liquid crystal capacitors Clch and Clcl and the second storage capacitor Cstb.

A control terminal of the third switching element Qc is connected to the gate line $G_i$, an input terminal of the third switching element Qc is connected to a common voltage line (not shown), and an output terminal of the third switching element Qc is connected to the fourth switching element Qd and the boost-up capacitor Cb.

A control terminal of the fourth switching element Qd is connected to a next gate line $G_{i+1}$, an input terminal of the fourth switching element Qd is connected to the output terminal of the first switching element Ql, the liquid crystal capacitor Clcl, and the first storage capacitor Cstla, and an output terminal of the fourth switching element Qd is connected to the output terminal of the third switching element Qc and the boost-up capacitor Cb.

Hereinafter, the operation of a liquid crystal display including the liquid crystal assembly according to the present embodiment will be described.

First, a case where a data voltage having a positive polarity with respect to a common voltage Vcom is applied to a data line $D_j$ and a data voltage having a negative polarity with respect to the common voltage Vcom is applied to a data line $D_{j+1}$ is exemplified.

When a gate-on voltage Von is applied to the gate line $G_i$, first to third switching elements Qha, Qla, Qb, and Qc connected thereto are turned on.

Therefore, the positive data voltage of the data line $D_j$ is applied to one terminal of each of the liquid crystal capacitors Clch and Clcl through the turned-on first switching elements Qha and Qla and the negative data voltage of the data line $D_{j+1}$ is applied to the other terminal of each of the liquid crystal capacitors Clch and Clcl through the second switching element Qb.

Meanwhile, the common voltage Vcom is applied to one terminal of the boost-up capacitor Cb through the third switching element Qc, and the boost-up capacitor Cb is charged by a difference between a voltage at the output terminal of the first switching element Qha and the common voltage Vcom.

Then, when a gate-off voltage Voff is applied to the gate line $G_i$ and the gate-on voltage Von is applied to the next gate line $G_{i+1}$, the first to third switching elements Qha and Qla, Qb, and Qc are turned off and the fourth switching element Qd is turned on.

Then, positive charges collected at the output terminal of the first switching element Qla and negative charges collected in the output terminal of the third switching element Qc are mixed, whereby the voltage of the output terminal of the first switching element Qla decreases and the voltage of the output terminal of the third switching element Qc increases. When the voltage of the output terminal of the third switching element Qc serving as one terminal of the boost-up capacitor Cb increases, the voltage of the output terminal of the isolated first switching element Qha also increases therewith, thereby increasing a difference of the voltages of both terminals of the liquid crystal capacitor Clch. On the contrary, the voltage of the output terminal of the first switching element Qla decreases, thereby decreasing voltages of both terminals of the liquid crystal capacitor Clcl.

Alternatively, in a case where the data voltage having the negative polarity on the common voltage Vcom is applied to the first data line $D_j$, the charges collected at both terminals of each of the capacitors Clch, Clcl, Cstha, Cstla, Cb, and Cstb may be reversed to those in the previous description.

In the present embodiment, the charging voltage of the liquid crystal capacitor Clch of the first subpixel PXh may always be higher than the charging voltage of the liquid crystal capacitor Clcl of the second subpixel PXl irrespective of the polarity of the applied data voltage. Accordingly, it is possible to vary the luminance of the two subpixels PXh and PXl by varying the charging voltages of the liquid crystal capacitors Clch and Clcl without an overall reduction of luminance and transmittance.

Whenever the gate-on voltage is applied to the gate line $G_i$, the voltage of the boost-up capacitor Cb is refreshed to the common voltage Vcom by the third switching element Qc, thereby removing an afterimage caused by a previous frame.

Simultaneously, data voltages having different polarities are applied to the first and second data lines $D_j$ and $D_{j+1}$, whereby the transmittance and response speed of the liquid crystal display can be improved, and various effects in the previous embodiment can be applied to the present embodiment.

In an alternative embodiment, instead of the first storage capacitor Cstha/Cstla and the second storage capacitor Cstb, each of the first second subpixel PXh/PXl may include one storage capacitor (not shown).

Next, referring to FIG. 37, another example of the liquid crystal panel assembly shown in FIG. 2 will be described.

Figure 37:
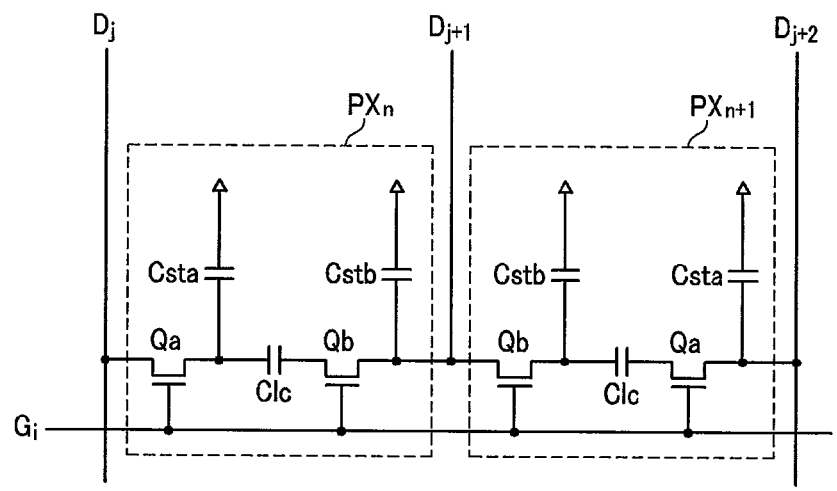
FIG. 37 is an equivalent circuit diagram of two pixels of a liquid crystal panel assembly according to an embodiment of the present invention.

FIG. 37 is an equivalent circuit diagram of two pixels of a liquid crystal panel assembly according to an embodiment of the present invention.

First, referring to FIG. 2 and FIG. 37, the liquid crystal panel assembly according to the present embodiment also includes lower and upper panels 100 and 200 opposed to each other, and a liquid crystal layer 3 interposed therebetween.

The liquid crystal panel assembly according to the present embodiment includes a signal line including a gate line $G_i$ and first to third data lines $D_j$, $D_{j+1}$, and $D_{j+2}$, and first and second pixels $PX_n$ and $PX_{n+1}$.

The gate line $G_i$, the data lines $D_j$, $D_{j+1}$, and $D_{j+2}$, and a first pixel electrode PEa and a second pixel electrode PEb are formed by patterning a metal layer. The gate line $G_i$ and the data lines $D_j$, $D_{j+1}$, and $D_{j+2}$ are formed in different layers, and an insulator may be interposed therebetween. The first and second pixel electrodes PEa and PEb may be formed in different layers or in the same layer.

The first to third data lines $D_j$, $D_{j+1}$, and $D_{j+2}$ of the liquid crystal panel assembly shown in FIG. 37 are formed in the same layer.

Each of the pixels $PX_n$ and $PX_{n+1}$ includes first and second switching elements Qa and Qb, a liquid crystal capacitor Clc, and first and second storage capacitors Csta and Cstb.

The first switching element Qa of the first pixel $PX_n$ is connected to the gate line $G_i$ and the first data line $D_j$. The second switching element Qb of the first pixel $PX_n$ is connected to the gate line $G_i$ and the second data line $D_{j+1}$. The first switching element Qa of the second pixel $PX_{n+1}$ is connected to the gate line $G_i$ and the third data line $D_{j+2}$. The second switching element Qb of the second pixel $PX_{n+1}$ is connected to the gate line $G_i$ and the second data line $D_{j+1}$. That is, the second switching element of the first pixel $PX_n$ and the second switching element Qb of the second pixel $PX_{n+1}$ that are adjacent to each other are connected to the same data line data line $D_{j+1}$ (hereinafter, referred to as "a shared data line").

Each of the first and second switching elements Qa and Qb is a three-terminal element such as a thin film transistor provided in the lower panel 100. Control terminals of the first and second switching elements Qa and Qb are connected to the gate line $G_i$, input terminals thereof are connected to the data lines $D_j$, $D_{j+1}$, and $D_{j+2}$, and output terminals thereof are connected to the liquid crystal capacitor Clc and the first and second storage capacitors Csta and Cstb, respectively.

Referring back to FIG. 2, the liquid crystal layer 3 has dielectric anisotropy, and liquid crystal molecules of the liquid crystal layer 3 may have their long axes aligned to be vertical (or perpendicular) to horizontal surfaces of the panels 100 and 200 without an electric field. Contrary to this, the liquid crystal molecules may have their long axes aligned to be horizontal (or parallel) to the horizontal surfaces of the panels 100 and 200 without the electric field.

In addition, the liquid crystal capacitor Clc and the storage capacitors Csta and Cstb have been described in the previous embodiment, so the detailed description thereof will be omitted.

Hereinafter, referring to FIG. 38 and FIG. 39, the operation of a liquid crystal display according to an embodiment of the present invention will be described.

Figure 38:
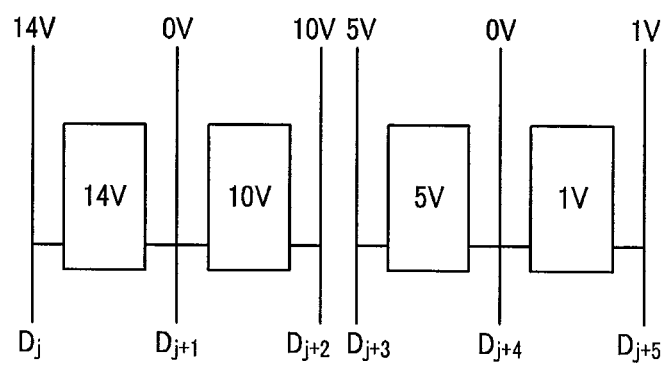
FIG. 38 and FIG. 39 are diagrams illustrating charging voltages of liquid crystal capacitors of four adjacent pixels in two successive frames and voltages applied to data lines in a case where the highest voltage and the lowest voltage that are usable by a liquid crystal display are 0V and 7V, and a common voltage Vcom is 7V according to an embodiment of the present invention.
Figure 39:
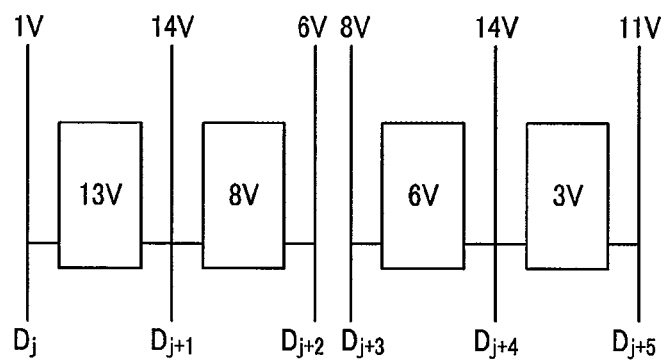

FIG. 38 and FIG. 39 are diagrams showing charging voltages of liquid crystal capacitors of four adjacent pixels and voltages applied to data lines in two successive frames in a case where the lowest voltage used by a liquid crystal display according to an embodiment of the present invention is 0V, the highest voltage is 14V, and a common voltage Vcom is 7V.

Referring to FIG. 38 and FIG. 39, one data line exists between two pixels PX, and the two pixels PX are commonly connected to the shared data line $D_{j+1}$ and $D_{j+4}$. The highest driving voltage (e.g., 14V) and the lowest driving voltage (e.g., 0V) are alternately applied to the shared data line $D_{j+1}$ and $D_{j+4}$ for each frame. That is, when 0V is applied to the shared data line $D_{j+1}$ and $D_{j+4}$ in one frame as shown in FIG. 38, 14V is applied to the shared $D_{j+1}$ and $D_{j+4}$ in the next frame as shown in FIG. 39.

First, referring to FIG. 38, 0V is applied to the shared data line $D_{j+1}$ and $D_{j+4}$., a data voltage of 14V is applied to a first data line $D_j$ with a target charging voltage of the first pixel, 14V. 10V is applied to the second data line $D_{j+2}$ with a target charging voltage of the second pixel, 10V. 5V is applied to the third data line $D_{j+3}$ with a target charging voltage of the third pixel, 5V. 1V is applied to the fourth data line $D_{j+5}$ with a target charging voltage of the fourth pixel, 1V. At this time, a voltage having an opposite polarity with respect to a voltage applied to the left pixel is applied to the adjacent pixel on the right side, resulting in enabling an inversion driving operation. Also, it is possible to improve display characteristics.

The highest driving voltage of 14V is applied to the shared data line $D_{j+1}$ and $D_{j+4}$ in the next frame as shown in FIG. 39. Since the target charging voltage of the first pixel is 13V, a data voltage of 1V is applied to the first data line $D_j$. Since the target charging voltage of the second pixel is 8V, 6V is applied to the second data line $D_{j+2}$. Since the target charging voltage of the third pixel is 6V, 8V is applied to the third data line $D_{j+3}$. Since the target charging voltage of the fourth pixel is 3V, 11V is applied to the fourth data line $D_{j+5}$. Accordingly, a voltage having a polarity opposite to that of the voltage in the previous frame is applied to each pixel, and adjacent pixels are also applied with voltages of opposite polarities to each other.

In the present embodiment, since a shared data line is disposed between adjacent pixels, it is possible to increase the aperture ratio of the liquid crystal panel assembly by decreasing the number of data lines and to decrease the manufacturing cost of the liquid crystal display by decreasing the number of data drivers.

Hereinafter, referring to FIG. 40, a liquid crystal panel assembly according to another embodiment of the present invention will be described in detail.

Figure 40:
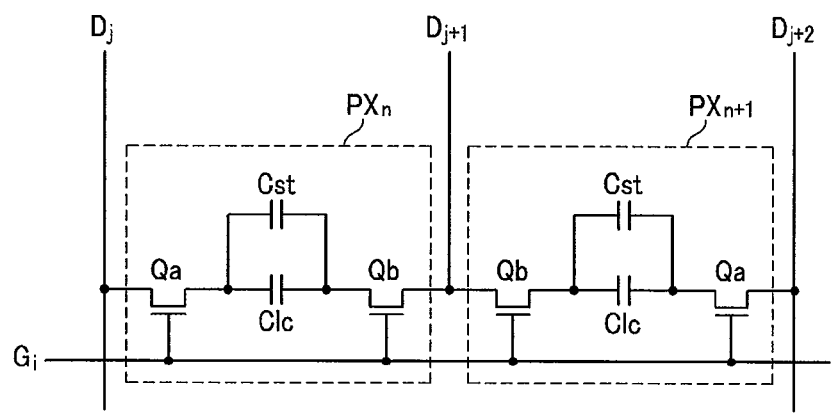
FIG. 40 to FIG. 43 are equivalent circuit diagrams of two pixels of a liquid crystal panel assembly according to another embodiment of the present invention.

FIG. 40 is an equivalent circuit diagram of two pixels of a liquid crystal panel assembly according to another embodiment of the present invention.

Referring to FIG. 40, the liquid crystal panel assembly according to the present embodiment also includes a signal line including a gate line $G_i$ and first to third data lines $D_j$, $D_{j+1}$, and $D_{j+2}$ adjacent to each other, and first and second pixels $PX_n$ and $PX_{n+1}$ connected thereto, and each of the pixels $PX_n$ and $PX_{n+1}$ includes first and second switching elements Qa and Qb and a liquid crystal capacitor Clc.

However, unlike the liquid crystal panel assembly shown in FIG. 37, in the liquid crystal panel assembly shown in FIG. 40, each of the pixels $PX_n$ and $PX_{n+1}$ includes one storage capacitor Cst and thus additional separate wiring for a common voltage Vcom need not be formed, thereby improving an aperture ratio. The storage capacitor Cst may be formed by superimposing output terminals of the first and second switching elements Qa and Qb with each other with an insulator interposed therebetween.

Hereinafter, referring to FIG. 41 and FIG. 42, and FIG. 1 described above, a liquid crystal panel assembly according to another embodiment of the present invention will be described.

Figure 41:
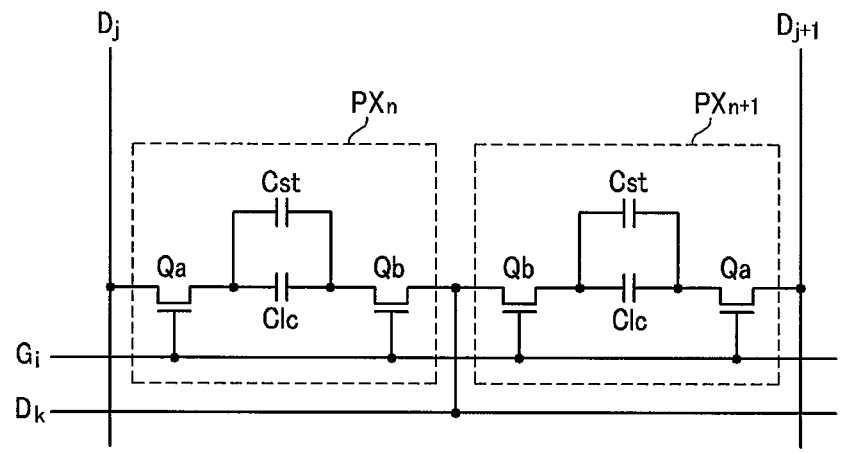
Figure 42:
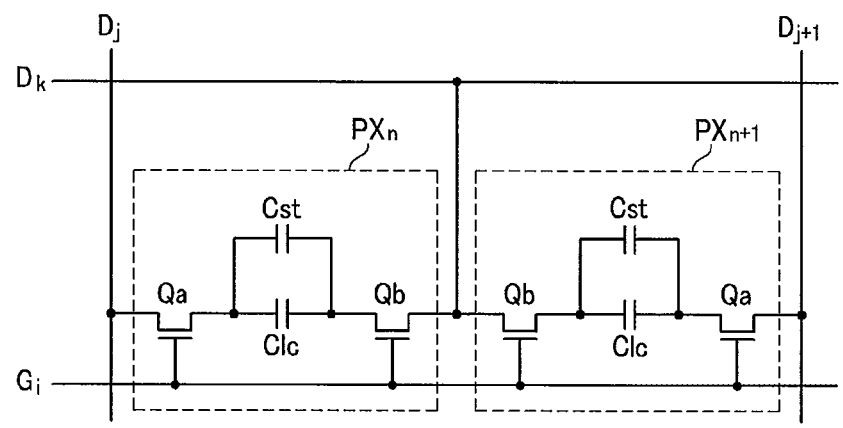

FIG. 41 and FIG. 42 are equivalent circuit diagrams of two pixels of a liquid crystal assembly according to various other embodiments of the present invention.

Referring to FIG. 41 and FIG. 42, the liquid crystal panel assembly according to the present embodiments includes a signal line including a gate line $G_i$ and first and second data lines $D_j$ and $D_{j+1}$, and first and second pixels $PX_n$ and connected thereto, and each of pixels $PX_n$ and $PX_{n+1}$ includes first and second switching elements Qa and Qb and a liquid crystal capacitor Clc.

In the liquid crystal panel assembly shown in FIG. 41 and FIG. 42, each of the pixels $PX_n$ and $PX_{n+1}$ includes a storage capacitor Cst. However, each of the pixels $PX_n$ and may include the first and second switching elements Qa and Qb, and first and second storage capacitors (not shown) connected to the first and second switching elements Qa and Qb, respectively.

However, unlike the liquid crystal panel assembly shown in FIG. 37 or FIG. 40 but in the liquid crystal panel assembly shown in FIG. 41 and FIG. 42, a data line is not formed between pixels. The liquid crystal panel assembly includes a shared data line $D_k$ formed horizontal to the gate line G. The shared data line $D_k$ is not formed in the same layer as other data lines $D_j$ and $D_{j+1}$ and is formed in the same layer as the gate line $G_i$. The shared data line $D_k$ is not connected to a data driver 500, unlike the other data lines $D_j$ and $D_{j+1}$. Accordingly, a voltage is not applied from the data driver 500, but the highest voltage and the lowest voltage varying for each frame unit may be separately applied from the outside.

However, in the liquid crystal panel assembly shown in FIG. 41, the shared data line $D_k$ is disposed at the same side as the gate line $G_i$ with respect to the corresponding pixel $PX_n$, and in the liquid crystal panel assembly shown in FIG. 42, the shared data line $D_k$ is disposed at a side opposite to the gate line $G_i$ with respect to the corresponding pixel $PX_n$.

The liquid crystal panel assembly shown in FIG. 41 and FIG. 42 is capable of decreasing the number of data lines and the number of data drivers 500 in comparison with the liquid crystal panel assembly shown in FIG. 37 or FIG. 40, thereby improving the aperture ratio of the liquid crystal panel assembly and decreasing manufacturing cost.

Hereinafter, referring to FIG. 2 and FIG. 42, a liquid crystal panel assembly according to another embodiment of the present invention will be described in detail.

Figure 43:
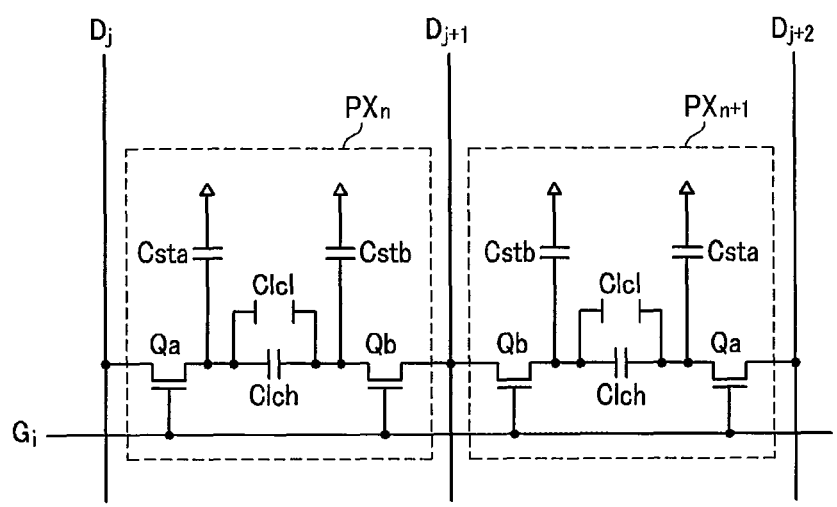

FIG. 43 is an equivalent circuit diagram of two pixels of a liquid crystal panel assembly according to an embodiment of the present invention.

Referring to FIG. 2 and FIG. 43, the liquid crystal panel assembly according to the present embodiment is substantially the same as the liquid crystal panel assembly shown in FIG. 37.

However, pixels $PX_n$ and $PX_{n+1}$ each include first and second liquid crystal capacitors Clch and Clcl having different capacitances. As shown in FIG. 43, the first liquid crystal capacitor Clch has a distance between both terminals thereof that is longer than that of the second liquid crystal capacitor Clcl. Accordingly, even though the same voltage is applied to both terminals of each of the first and second liquid crystal capacitors Clch and Clcl, the intensity of an electric field generated in a liquid crystal layer 3 serving as a dielectric material is different, and molecules of the two liquid crystal capacitors Clch and Clcl have different inclination degrees. Accordingly, it is possible to maximize visibility of an image viewed from the side of a liquid crystal display so as to approach an image viewed from the front by adjusting the distance between the terminals of the liquid crystal capacitors Clch and Clcl, thereby improving side visibility.

In addition, the description of a gate line $G_i$, data lines $D_j$, $D_{j+1}$, and $D_{j+2}$, first and second switching elements Qa and Qb, and storage capacitors Csta and Cstb is the same as the description of the embodiment shown in FIG. 37, whereby the description thereof will be omitted.

Hereinafter, referring to FIG. 44 to FIG. 47, an example of the liquid crystal panel assembly shown in FIG. 43 will be described in detail.

FIG. 44 to FIG. 47 are layout views of two pixels $PX_n$ and $PX_{n+1}$ of a liquid crystal panel assembly according to an embodiment of the present invention.

Figure 44:
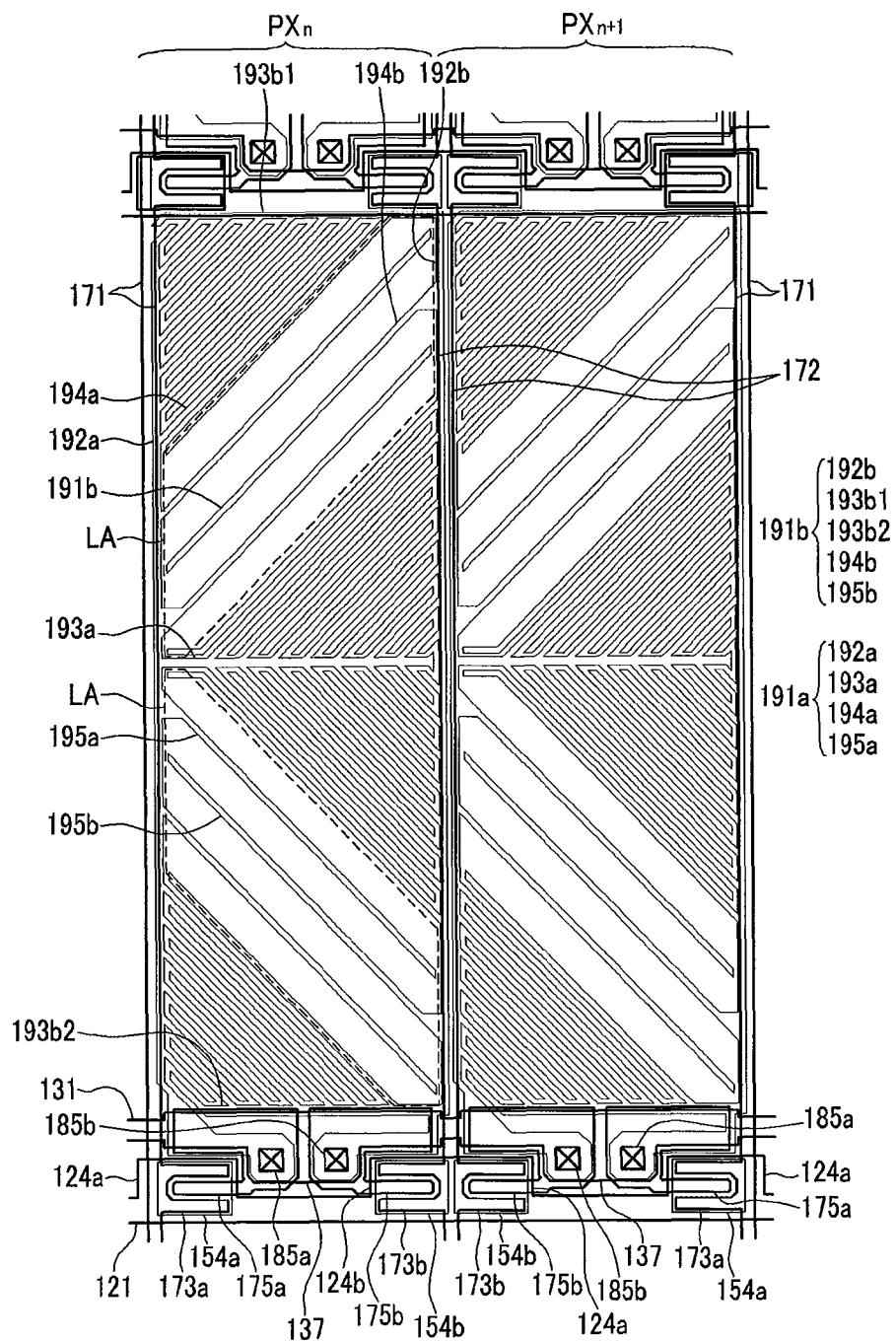
FIG. 44 to FIG. 47 are layout views of two pixels $PX_n$ and $PX_{n+1}$ of a liquid crystal panel assembly according to an embodiment of the present invention.

Referring to FIG. 44, a planar structure and a layered structure of the liquid crystal panel assembly according to the present embodiment are substantially the same as those of the liquid crystal panel assembly shown in FIG. 21 and FIG. 22. Hereinafter, points that are different from the embodiment shown in FIG. 21 and FIG. 22 will be mainly described.

Unlike the liquid crystal panel assembly shown in FIG. 21 and FIG. 22, the liquid crystal panel assembly according to the present embodiment includes a plurality of data lines 171 and a plurality of shared data lines 172 positioned between adjacent pixels $PX_n$ and $PX_{n+1}$.

Next, first and second pixel electrodes 191*a* and 191*b* included in each of the pixels $PX_n$ and $PX_{n+1}$ will be described in detail.

The first pixel electrode 191*a* includes a left vertical part 192*a* extending lengthily in a vertical direction, a central horizontal part 193*a* extending to a right side from a center of the left vertical part 192*a*, and a plurality of upper and lower branch parts 194*a* and 195*a*. The upper branch part 194*a* is positioned above the central horizontal part 193*a*, and extends obliquely right-upward from the left vertical part 192*a* and the central horizontal part 193*a*. The lower branch part 195*a* is positioned below the central horizontal part 193*a*, and extends right-downward from the left vertical part 192*a* and the central horizontal part 193*a*. The gap between the upper and lower branch parts 194*a* and 195*a* is smaller in the upper and lower parts and a center part of each pixel $PX_n$ or $PX_{n+1}$, and is larger in the low-gray region LA other than the parts.

The second pixel electrode 191*b* includes a right vertical part 192*b* extending lengthily in the vertical direction, upper and lower horizontal parts 193*b*1 and 193*b*2 extending to a left side from upper and lower ends of the right vertical part 192*b*, and a plurality of upper and lower branch parts 194*b* and 195*b*. The upper branch part 194*b* is positioned above the central horizontal part 193*a*, and extends obliquely left-downward from the right vertical part 192*b* and the upper horizontal part 193*b*1. The lower branch part 195*b* is positioned below the central horizontal part 193*a*, and extends obliquely left-upward from the right vertical part 192*b* and the lower horizontal part 193*b*2. The gap between the upper and lower branch parts 194*b* and 195*b* is also smaller in the upper and lower parts and the center part of each pixel $PX_n$ or $PX_{n+1}$, and is larger in the low-gray region LA other than the parts.

The branch parts 194*a*, 194*b*, 195*a*, and 195*b* of the first and second pixel electrodes 191*a* and 191*b* are alternately disposed. Gaps between the branch parts 194*a*, 194*b*, 195*a*, and 195*b* are larger in the low-gray in comparison with those in the other parts. The resultant effects are the same as those in the other embodiments including the embodiment shown in FIG. 21 and FIG. 22, whereby the description thereof will be omitted.

Further, in each pixel $PX_n$ or $PX_{n+1}$, the first/second gate electrode 124*a*/124*b*, the first/second source electrode 173*a*.173*b*, and the first/second drain electrode 175*a*/175*b* constitute the first/second thin film transistor Qa/Qb together with the first/second semiconductor 154*a*/154*b*. Channels of the first and second thin film transistors Qa and Qb are formed in the first and second semiconductors 154*a* and 154*b* between the first and second source electrodes 173a and 173b and the first and second drain electrodes 175a and 175b.

The two adjacent two pixels $PX_n$ and $PX_{n+1}$ are connected to the shared data line 172 at right and left sides, respectively. The first pixel electrode 191a of the left pixels $PX_n$ is applied with data voltages from the data line 171 through the first thin film transistor Qa, and the second pixel electrode 191b is applied with the highest driving voltage or the lowest driving voltage from the shared data line 172 through the second thin film transistor Qb. Further, the first pixel electrode 191a of the right pixel $PX_{n+1}$ is applied with the highest driving voltage or the lowest driving voltage from the shared data line 172 through the second thin film transistor Qb and the second pixel electrode 191b is applied with the voltage from the data line 171 through the first thin film transistor Qa.

Figure 45:
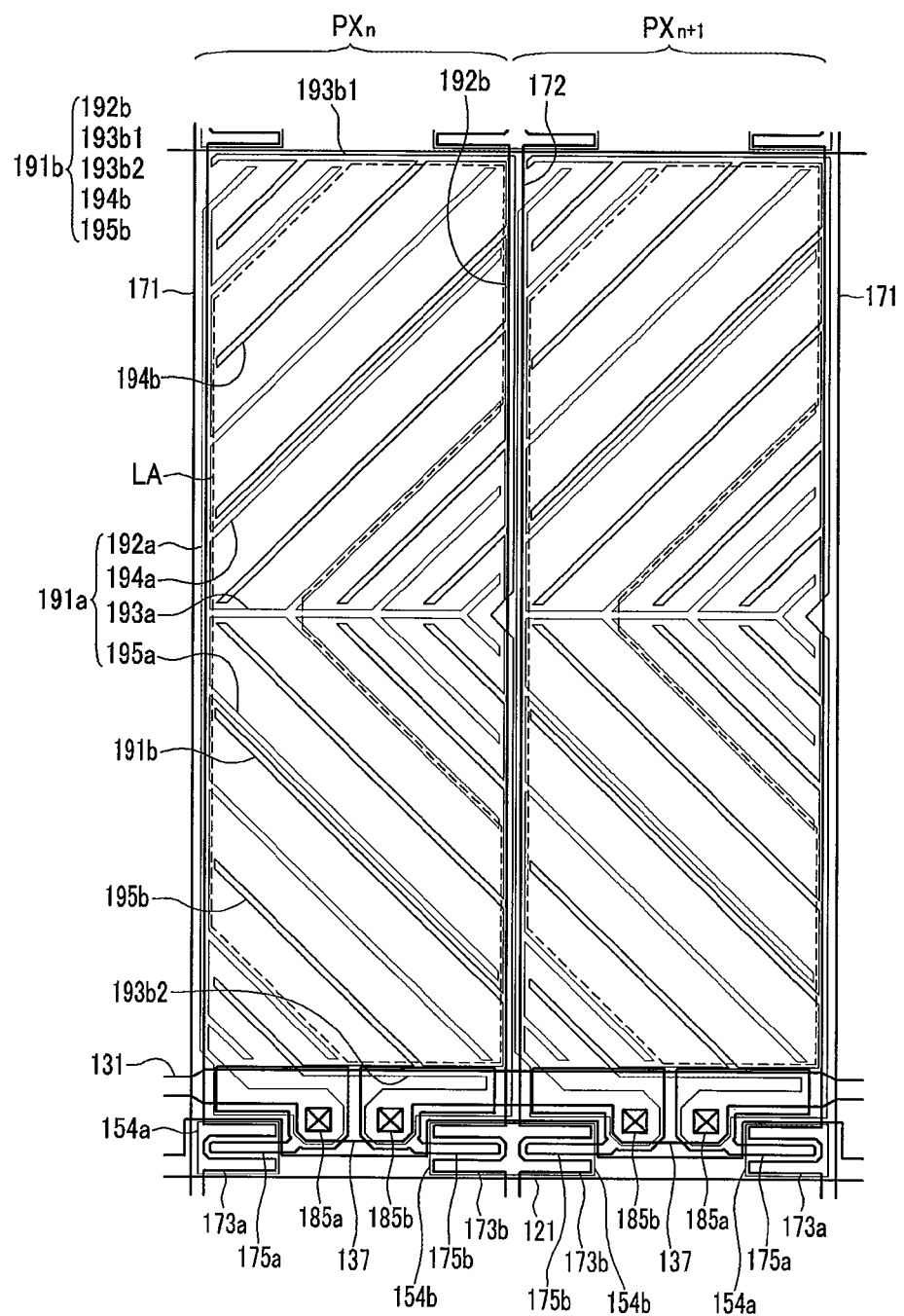

Next, referring to FIG. 45, the liquid crystal panel assembly according to the present embodiment is substantially the same as the above-described liquid crystal panel assembly shown in FIG. 44, but a gap between the branch parts of the first and second pixel electrodes 191a and 191b is larger and the gap between the branch parts of the first and second pixel electrodes 191a and 191b is small in a low-gray region LA.

Figure 46:
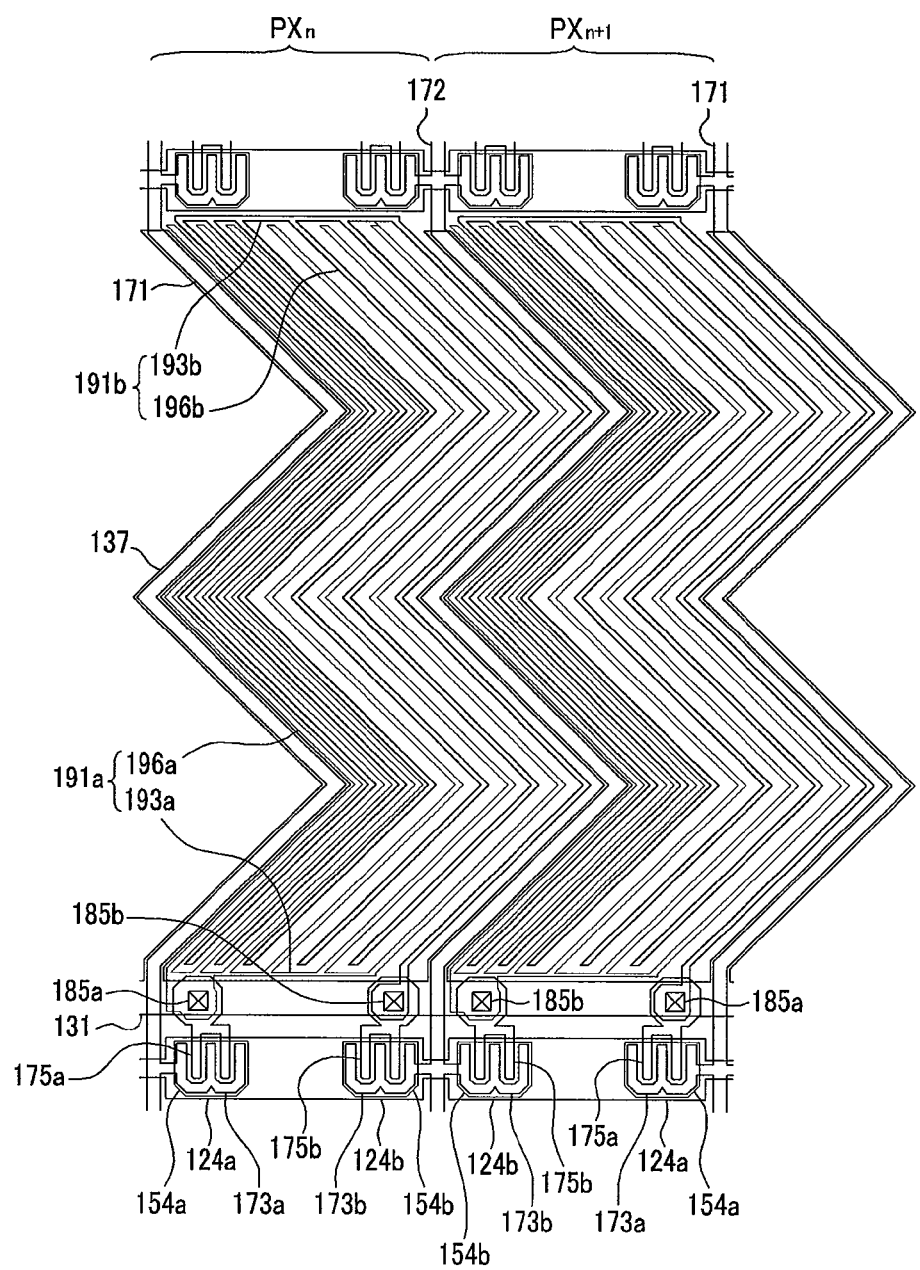

Next, referring to FIG. 46, a layer structure of the liquid crystal panel assembly according to the present embodiment is also the same as that of the liquid crystal panel assembly shown in FIG. 24. Hereinafter, points that are different from the embodiment shown in FIG. 24 will be mainly described.

The liquid crystal panel assembly according to the present embodiment includes a plurality of data lines 171 and a shared data line 172 positioned between adjacent pixels $PX_n$ and $PX_{n+1}$.

The first and second pixel electrodes 191a and 191b included in each of the pixels $PX_n$ and $PX_{n+1}$ will be described in more detail.

The first pixel electrode 191a includes a horizontal part 193a positioned at the bottom of each of the pixels $PX_n$ and $PX_{n+1}$ and a plurality of curved branch parts 196a which extends obliquely upward from the horizontal part 193a and bends three times to form two sign shapes of ">" connected vertically. The second pixel electrode 191b also includes a horizontal part 193b disposed at the top of the pixels $PX_n$ and $PX_{n+1}$, and a plurality of curved branch parts 196b which extends obliquely downward from the horizontal part 193b and bends three times to form two sign shapes ">" connected vertically. The curved branch parts 196a and 196b of the first and second pixel electrodes 191a and 191b are alternately disposed. In a left region of each of the pixels $PX_n$ and $PX_{n+1}$, a gap between the curved branch parts 196a and 196b is small, and in a right region, a gap between the curved branch parts 196a and 196b is large. The description of the resulting effects are same as that in the other embodiments including the embodiment shown in FIG. 21 and FIG. 22, whereby the description thereof will be omitted.

In addition, the description of the data line 171, the shared data line 172, and the first and second pixel electrodes 191a and 191b is the same as that in the previous embodiment, whereby the description thereof will be omitted.

Figure 47:
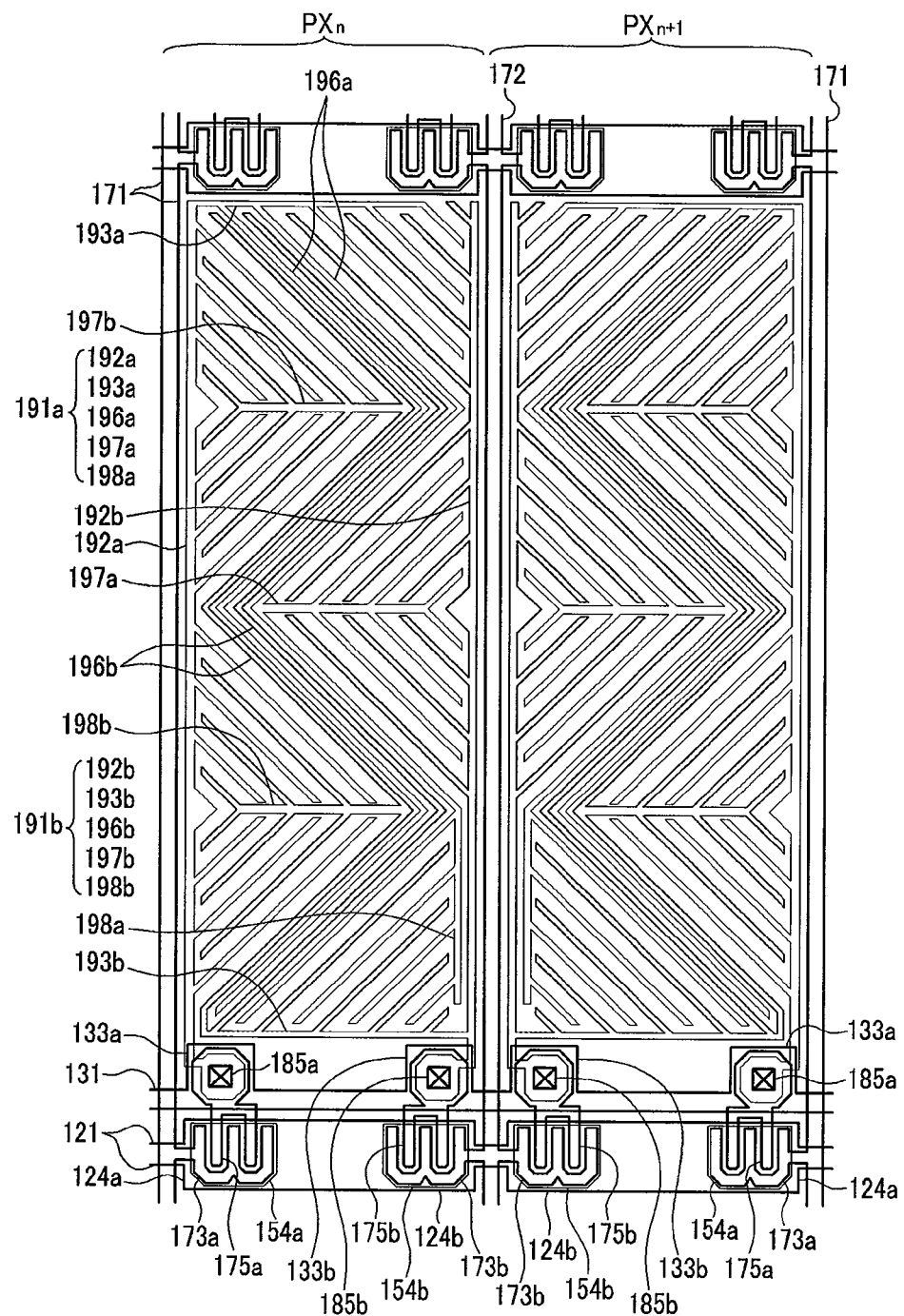

Next, referring to FIG. 47, a layered structure of the liquid crystal panel assembly according to the present embodiment also is the same as that of the liquid crystal panel assembly shown in FIG. 25. Hereinafter, points that are different from the embodiment shown in FIG. 25 will be mainly described.

The liquid crystal panel assembly according to the present embodiment also includes a plurality of data lines 171 and a plurality of shared data lines 172 positioned between pixels $PX_n$ and $PX_{n+1}$.

The first and second pixel electrodes 191a and 191b included in each of the pixels $PX_n$ and $PX_{n+1}$ will be described in more detail.

The first pixel electrode 191a includes a left vertical part 192a extending lengthily in a vertical direction, an upper horizontal part 193a, a pair of vertical curve parts 196a horizontally bent three times while extending downward from the upper horizontal part 193a, a horizontal part 197a extending to a right side from a center of a right vertical curve part 196a, a vertical part 198a extending downward from a lower curved point of the right vertical curve part 196a, and a plurality of oblique branch parts. The second pixel electrode 191b includes a right vertical part 192b, a lower horizontal part 193b, a pair of vertical curve parts 196b horizontally bent three times while extending upward from the lower horizontal part 193b, an upper horizontal part 197b extending to a left side from a lower curve point of the vertical curve part 196b, a lower horizontal part 198b extending to the left side from a lower curve point of the vertical curve part 196b, and a plurality of oblique branch parts. The oblique branch parts of the first and second pixel electrodes 191a and 191b may be inclined at approximately 45 degrees with respect to a gate line 121.

The oblique branch parts of the first and second pixel electrodes 191a and 191b are alternately disposed, and may have a regular interval. A gap between the vertical curve parts 196a and 196b of the first and second pixel electrodes 191a and 191b is smaller than that between the oblique branch parts of the adjacent first and second pixel electrodes 191a and 191b, whereby the inclination angle of liquid crystal molecules of a liquid crystal layer 3 is larger and thus transmittance is higher. In addition, the description in the other embodiments including the embodiment shown in FIG. 21 and FIG. 22 may be applied.

Further, the description of the data line 171, the shared data line 172, and the first and second pixel electrodes 191a and 191b is the same as that in the previous embodiment, whereby the description will be omitted.

In the embodiment shown in FIG. 44 to FIG. 47, a region where the first pixel electrode 191a and the second pixel electrode 191b are farther from each other in one pixel $PX_n$ or $PX_{n+1}$ and a region where the first pixel electrode 191a and the second pixel electrode 191b are closer to each other in the one pixel $PX_n$ or $PX_{n+1}$ are alternately disposed, whereby it is possible to vary the intensity of an electric field generated in a liquid crystal layer 3 and vary the inclination angle of the liquid crystal molecules 31, and it is possible to improve the side visibility of a liquid crystal display and improve the transmittance of the liquid crystal display.

Alternatively, several regions where the first and second pixel electrodes 191a and 191 b are farther from each other may be positioned following the region where the first and second pixel electrodes 191a and 191b are closer to each other. Further, several regions where the first and second pixel electrodes 191a and 191b are closer to each other may be positioned following the region where the first and second pixel electrodes 191a and 191b are farther from each other. In addition, it is possible to maximize the transmittance and improve the side visibility by adjusting a distance between the first and second pixel electrodes 191a and 191b or adjusting the arrangement of the region where the first and second pixel electrodes 191a and 191b are farther from each other and the region where the first and second pixel electrodes 191a and 191b are closer to each other.

Hereinafter, referring to FIG. 48, a liquid crystal panel assembly according to another embodiment of the present invention will be described in detail.

Figure 48:
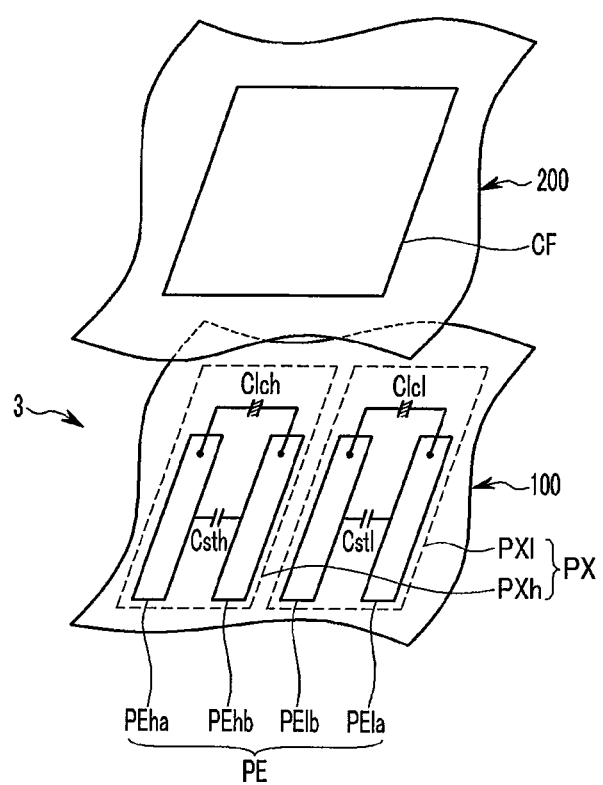
FIG. 48 is an equivalent circuit diagram illustrating a structure of a liquid crystal panel assembly and one pixel according to another embodiment of the present invention.

FIG. 48 is an equivalent circuit diagram illustrating a structure of a liquid crystal panel assembly and one pixel according to another embodiment of the present invention.

Referring to FIG. 48, each pixel PX includes a pair of subpixels, and each of the subpixels includes a liquid crystal capacitor Clch and Clcl and a storage capacitor Csth and Cstl. At least one of the two subpixels includes two switching elements (not shown) connected to a gate line, a data line and the liquid crystal capacitor Clch and Clcl.

The liquid crystal capacitors Clch and Clcl adopt first subpixel electrodes PEha and PEla and second subpixel electrodes PEhb and PElb of a lower panel 100 as both terminals. A liquid crystal layer 3 between the first subpixel electrodes PEha and PEla and the second subpixel electrodes PEhb and PElb serves as a dielectric material. Each of the second subpixel electrodes PEhb and PElb may be connected to a separate switching element (not shown), and at least one of the first subpixel electrodes PEha and PEla is also connected to a separate switching element (not shown). Alternatively, the second subpixel electrodes PEhb and PElb may not be separated from each other and may form an electrode connected to one switching element (not shown). However, contrary to this, the second subpixel electrodes PEhb and PElb may be provided in an upper panel 200. At this time, the second subpixel electrodes PEhb and PElb are not connected to the switching element and may be applied with a separate common voltage Vcom. Meanwhile, liquid crystal molecules of the liquid crystal layer 3 have dielectric anisotropy and may be aligned to be vertical to the panels 100 and 200. Contrary to this, the liquid crystal molecules may be aligned to be horizontal to the panels 100 and 200.

The storage capacitors Csth and Cstl performing an auxiliary role for the liquid crystal capacitors Clch and Clcl are formed of the first subpixel electrodes PEha and PEla and the second subpixel electrodes PEhb and PElb of the lower panel 100 with an insulator interposed therebetween.

In addition, the descriptions of a color filter CF and a polarizer (not shown) are the same as that in the previous embodiment and thus are omitted.

Hereinafter, referring to FIG. 49 to FIG. 51, an example of the liquid crystal panel assembly shown in FIG. 48 will be described in detail.

Figure 49:
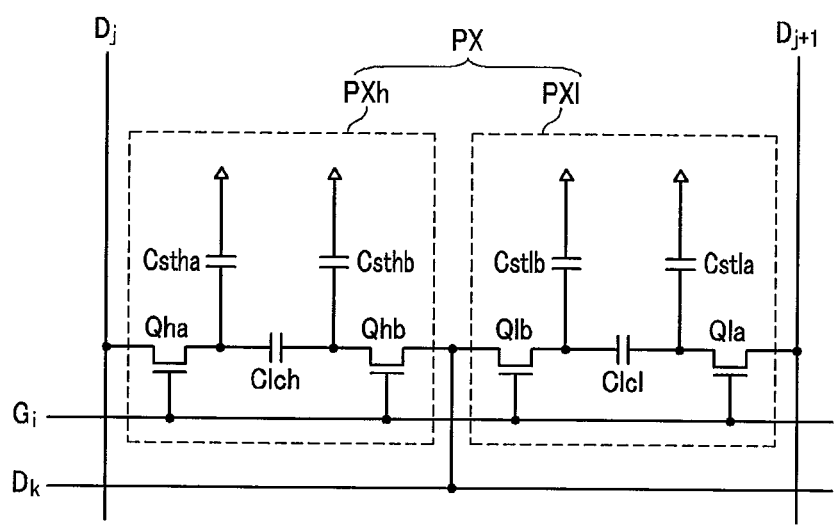
FIG. 49 to FIG. 51 are equivalent circuit diagrams of two subpixels of a liquid crystal panel assembly according to another embodiment of the present invention.
Figure 50:
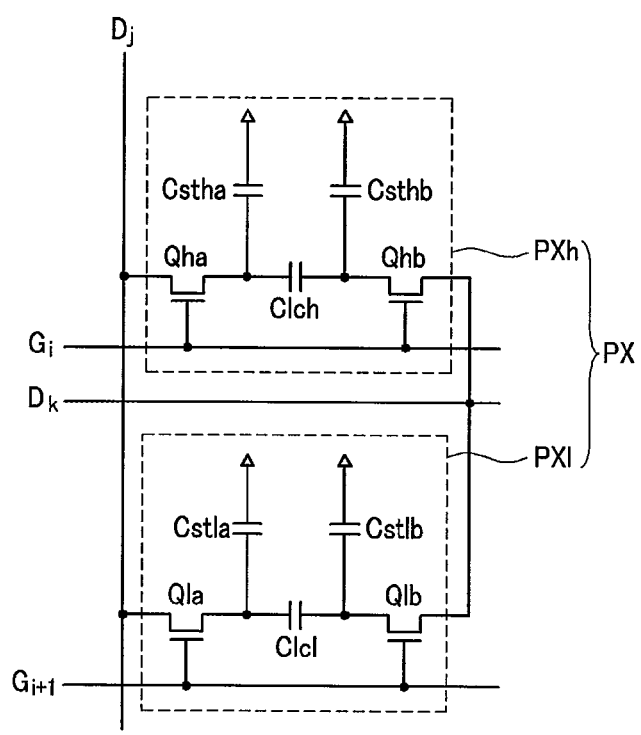
Figure 51:
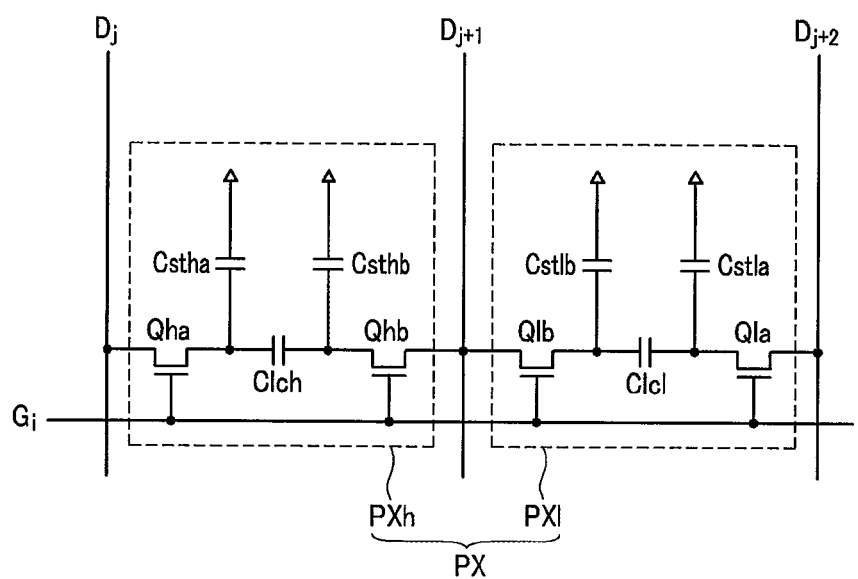

FIG. 49 to FIG. 51 are equivalent circuit diagrams illustrating two subpixels of a liquid crystal panel assembly according to another embodiment of the present invention.

First, referring to FIG. 49, the liquid crystal panel assembly according to the present embodiment includes a signal line including a gate line $G_i$, first and second data lines $D_j$ and $D_{j+1}$ adjacent to each other, and a shared data line $D_k$ adjacent to the gate line $G_i$, and pixels PX connected thereto.

The pixels PX include a pair of subpixels PXh and PXl. Each subpixel PXh/PXl includes first and second switching elements Qha and Qhb/Qla and Qlb connected to the corresponding gate line $G_i$ and the corresponding data lines $D_j/D_{j+1}$, a liquid crystal capacitor Clch/Clcl connected thereto, and first and second storage capacitors Cstha and Csthb/Cstla and Cstlb.

Separate electrodes may be superimposed by the first and second pixel electrodes PEha and PEhb/PEla and PElb with an insulator interposed therebetween to form the first and second storage capacitors Cstha and Csthb/Cstla and Cstlb.

Contrary to this, each of the subpixels PXh and PXl may include one storage capacitor Csth or Cstl.

The first switching element Qha of the first subpixel PXh is connected to the gate line $G_i$ and the first data line $D_j$. The second switching element Qhb of the first subpixel PXh is connected to the gate line $G_i$ and the shared data line $D_k$. The first switching element Qla of the second subpixel PXl is connected to the gate line $G_i$ and the second data line $D_{j+1}$. The second switching element Qlb of the second subpixel PXl is connected to the gate line $G_i$ and the shared data line $D_k$. That is, the adjacent switching elements Qhb and Qlb are connected to the same data line $D_k$. The shared data line $D_k$ is described above, whereby the detailed description will be omitted.

The first and second switching elements Qha and Qlb are also described above, whereby the description thereof will be omitted.

In a liquid crystal display including the liquid crystal panel assembly, a signal controller 600 receives input image signals R, G, and B for one pixel PX and converts the input image signals R, G, and B into an output image signal DAT for the two subpixels PXh and PXl to transmit it to a data driver 500. Contrary to this, gray voltages for the two subpixels PXh and PXl may be independently generated in a gray voltage generator 800 and alternately supplied to the data driver 500 or alternately selected in the data driver 500, thereby applying different voltages to the two subpixels PXh and PXl. However, at this time, it is preferable that the image signals are corrected or the gray voltages are generated so that a composed gamma curve of the two subpixels PXh and PXL is closer to a reference gamma curve in the front. For example, the composed gamma curve in the front conforms to the reference gamma curve in the front determined to be the most suitable for the liquid crystal assembly and a composed gamma curve in the side is the closest to the reference gamma curve in the front.

Next, referring to FIG. 50, the liquid crystal panel assembly according to the present embodiment includes a signal line including the first and second gate lines $G_i$ and $G_{i+1}$ adjacent to each other, a data line $D_j$, a shared data line $D_k$ adjacent to the gate line $G_i$, and pixels PX connected thereto. The pixel PX includes a pair of subpixels PXh and PXl. Each of the subpixel PXh/PXl includes switching elements Qha and Qhb/Qla and Qlb, a liquid crystal capacitor Clch/Clcl, and first and second storage capacitors Cstha and Csthb/Cstla and Cstlb.

Unlike the liquid crystal panel assembly shown in FIG. 49, in the liquid crystal panel assembly shown in FIG. 50, the two subpixels are adjacent to each other in a column direction and are connected to different gate lines $G_i$ and $G_{i+1}$.

That is, the first switching element Qha of the first subpixel PXh is connected to the first gate line $G_i$ and the data line $D_j$. The second switching element Qhb of the first subpixel PXh is connected to the first gate line $G_i$ and the shared data line $D_k$. The first switching element Qla of the second subpixel PXl is connected to the second gate line $G_{i+1}$ and the data line $D_j$. The second switching element Qlb of the second subpixel PXl is connected to the second gate line $G_{i+1}$ and the shared data line $D_k$. That is, the first/second switching elements Qha and Qla/Qhb and Qlb of each subpixel PXh or PXl are connected to the same data line $D_j/D_k$.

The operation of the liquid crystal display including the liquid crystal capacitors Clch and Clcl, the first and second storage capacitors Cstha and Csthb and Cstla and Cstlb, and the liquid crystal panel assembly is substantially the same as that in the previous embodiment, whereby the detailed description thereof will be omitted. However, in the liquid crystal display shown in FIG. 49, the two subpixels PXh and PXl constituting the one pixel PX are applied with data voltages at the same time, while in the present embodiment, the two subpixels PXh and PXl are applied with the data voltages with a time disparity.

Next, referring to FIG. 51, the liquid crystal panel assembly according to the present embodiment includes a signal line including the gate line $G_i$ and the first to third data lines $D_j$, $D_{j+1}$, and $D_{j+2}$ adjacent to each other, and the pixels PX connected thereto.

The pixels PX include a pair of subpixels PXh and PXl. Each of the subpixels PXh/PXl includes a first switching element Qha/Qla connected to the corresponding gate line $G_i$ and the corresponding data line $D_j/D_{j+2}$, a second switching element Qhb/Qlb connected to the gate line $G_i$ and the shared data line $D_{j+1}$, a liquid crystal capacitor Clch/Clcl connected thereto, and first and second storage capacitors Cstha and Csthb/Cstla and Cstlb.

The liquid crystal panel assembly according to the present embodiment is substantially the same as the liquid crystal panel assembly shown in FIG. 49, but the shared data line $D_{j+1}$ is not formed horizontal to the gate line $G_i$, but is formed between the subpixels PXh and PXl. The shared data line $D_{j+1}$ is formed in the same layer as other data lines $D_j$ and $D_{j+2}$ and is connected to a data driver 500 to be applied with a voltage.

Hereinafter, referring to FIG. 52 to FIG. 58, another example of the liquid crystal panel assembly shown in FIG. 48 will be described in detail.

FIG. 52 to FIG. 58 are equivalent circuit diagrams of two pixels of a liquid crystal panel assembly according to another embodiment of the present invention.

Figure 52:
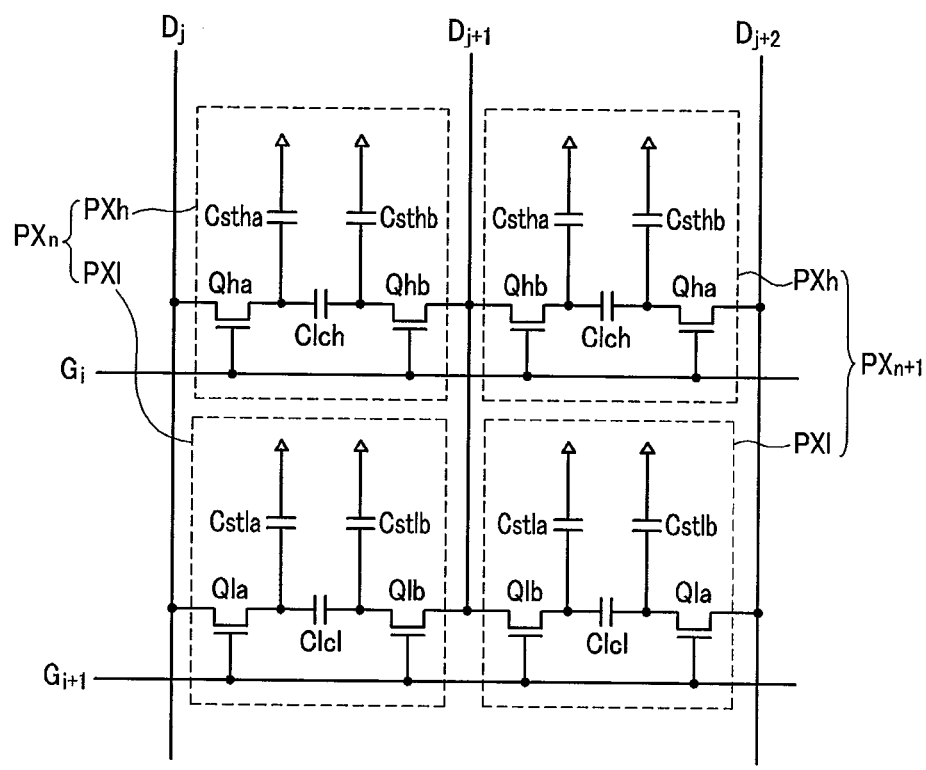
FIG. 52 to FIG. 58 are equivalent circuit diagrams of two pixels of a liquid crystal panel assembly according to another embodiment of the present invention.

Referring to FIG. 52, the liquid crystal panel assembly according to the present embodiment includes a signal line including first and second gate lines $G_i$ and $G_{i+1}$ and first to third data lines $D_j$, $D_{j+1}$, and $D_{j+2}$, and two pixels $PX_n$ and $PX_{n+1}$ connected thereto. Each of the pixels $PX_n$ and $PX_{n+1}$ includes a pair of subpixels PXh and PXl. Each subpixel PXh/PXl includes switching elements Qha and Qhb/Qla and Qlb, a liquid crystal capacitor Clch/Clcl connected thereto, and first and second storage capacitors Cstha and Csthb/Cstla and Cstlb.

Unlike the liquid crystal panel assembly shown in FIG. 49, in the liquid crystal panel assembly shown in FIG. 52, the switching elements Qhb and Qlb adjacent to each other in a row direction are commonly connected to the second data line $D_{j+1}$, that is, the shared data line $D_{j+1}$. That is, the second switching element Qhb of the first subpixel PXh of the first pixel $PX_n$, the second switching element Qhb of the first subpixel PXh of the second pixel $PX_{n+1}$, the second switching element Qlb of the second subpixel PXl of the first pixel $PX_n$, and the second switching element Qlb of the second subpixel PXl of the second pixel $PX_{n+1}$ are connected to the shared data line $D_{j+1}$.

Further, unlike the liquid crystal panel assembly shown in FIG. 51, in the liquid crystal panel assembly shown in FIG. 52, the two subpixels PXh and PXl constituting the one pixel $PX_n$ or $PX_{n+1}$ are adjacent to each other in a column direction and are connected to different gate lines $G_i$ and $G_{i+1}$. The detailed description thereof is substantially the same as that in the embodiment shown in FIG. 50, whereby the detailed description thereof will be omitted.

Figure 53:
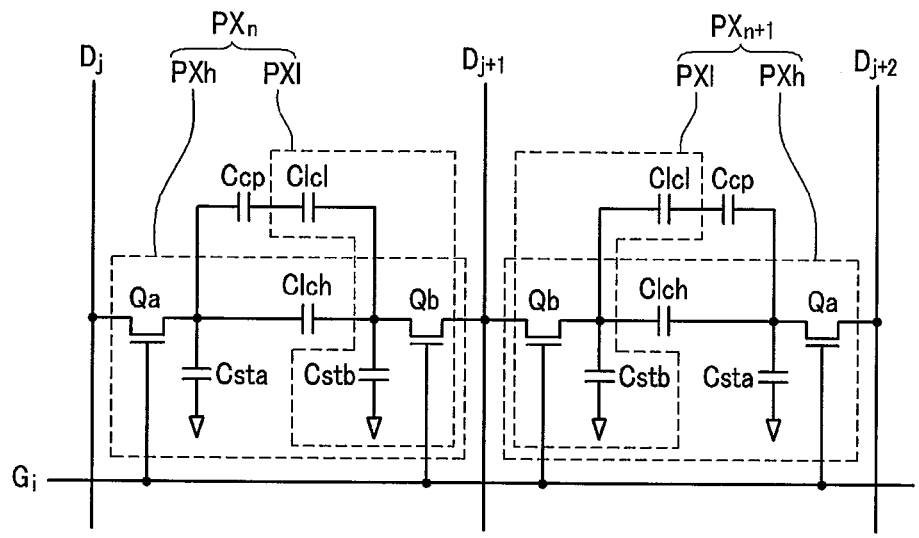

Next, referring to FIG. 53, the liquid crystal panel assembly according to the present embodiment includes a signal line including a gate line $G_i$ and first to third data lines $D_j$, $D_{j+1}$, and $D_{j+2}$ adjacent to each other, and two pixels $PX_n$ and $PX_{n+1}$ connected thereto.

The description of each pixel $PX_n$ or $PX_{n+1}$ is the same as the description of the liquid crystal panel assembly shown in 34, whereby the description thereof will be omitted.

However, in the present embodiment, the second switching element Qb of each of the adjacent pixels $PX_n$ and $PX_{n+1}$ is connected to the gate line $G_i$ and the shared data line $D_{j+1}$.

In the liquid crystal panel assembly according to the present embodiment, the shared data line $D_{j+1}$ is not formed horizontal to the gate line $G_i$, but is formed between the two pixels $PX_n$ and $PX_{n+1}$. The shared data line $D_{j+1}$ is described above, whereby the detailed description thereof will be omitted.

Figure 54:
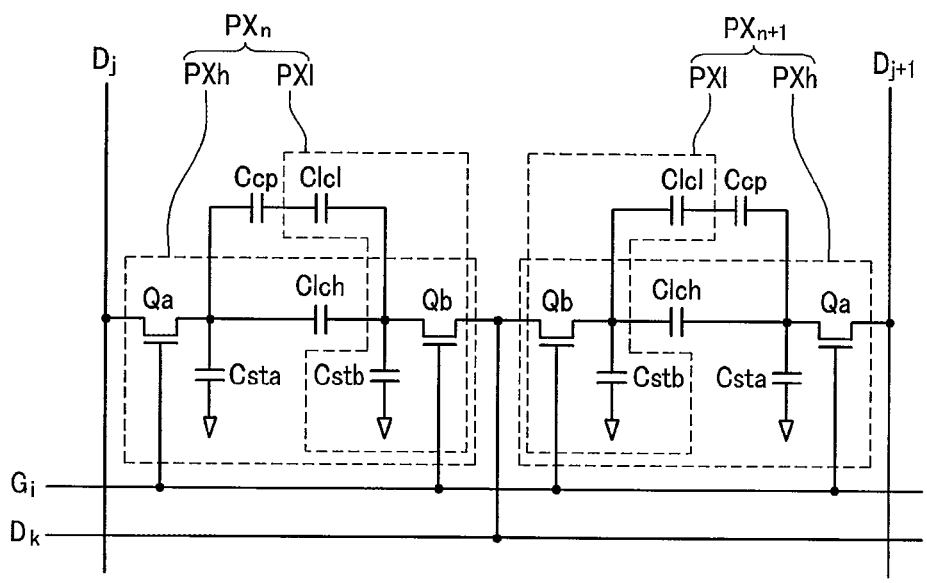

Next, referring to FIG. 54, the liquid crystal panel assembly shown in FIG. 54 is the same as the liquid crystal panel assembly shown in FIG. 53, but in the present embodiment, the shared data line $D_k$ is not formed between the pixels $PX_n$ and $PX_{n+1}$ and is formed horizontal to the gate line G. The shared data line $D_k$ is not formed in the same layer as other data lines $D_j$ and $D_{j+1}$ and is formed in the same layer as the gate line G. The shared data line $D_k$ is not connected to a data driver 500, unlike the other data lines $D_j$ and $D_{j+1}$. Accordingly, a voltage is not applied from the data driver 500, but voltages varying between a highest voltage and a lowest voltage every frame may be separately applied from the outside.

Figure 55:
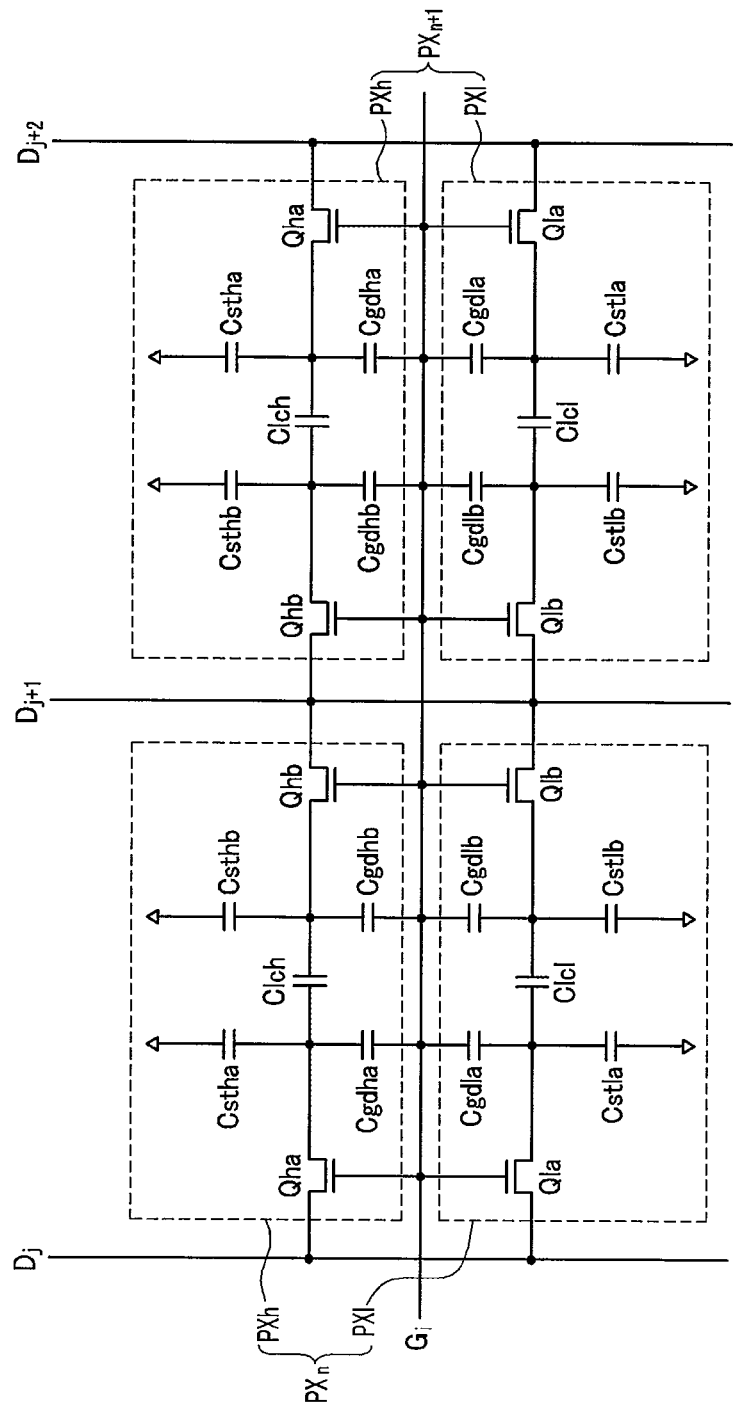

Next, referring to FIG. 55, the liquid crystal panel assembly according to the present embodiment includes a signal line including a gate line $G_i$ and first to third data lines $D_j$, and $D_{j+2}$ adjacent to each other, and two pixels $PX_n$ and $PX_{n+1}$ connected thereto.

The description of each pixel $PX_n$ or $PX_{n+1}$ is the same as the description of the liquid crystal panel assembly shown in FIG. 29, whereby the description thereof will be omitted.

However, in the present embodiment, the second switching elements Qhb and Qlb of each of the adjacent pixels $PX_n$ and $PX_{n+1}$ are connected to the gate line $G_i$ and the shared data line $D_{j+1}$.

The shared data line $D_{j+1}$ formed between the two pixels $PX_n$ and $PX_{n+1}$ is described above, whereby the detailed description thereof will be omitted.

Figure 56:
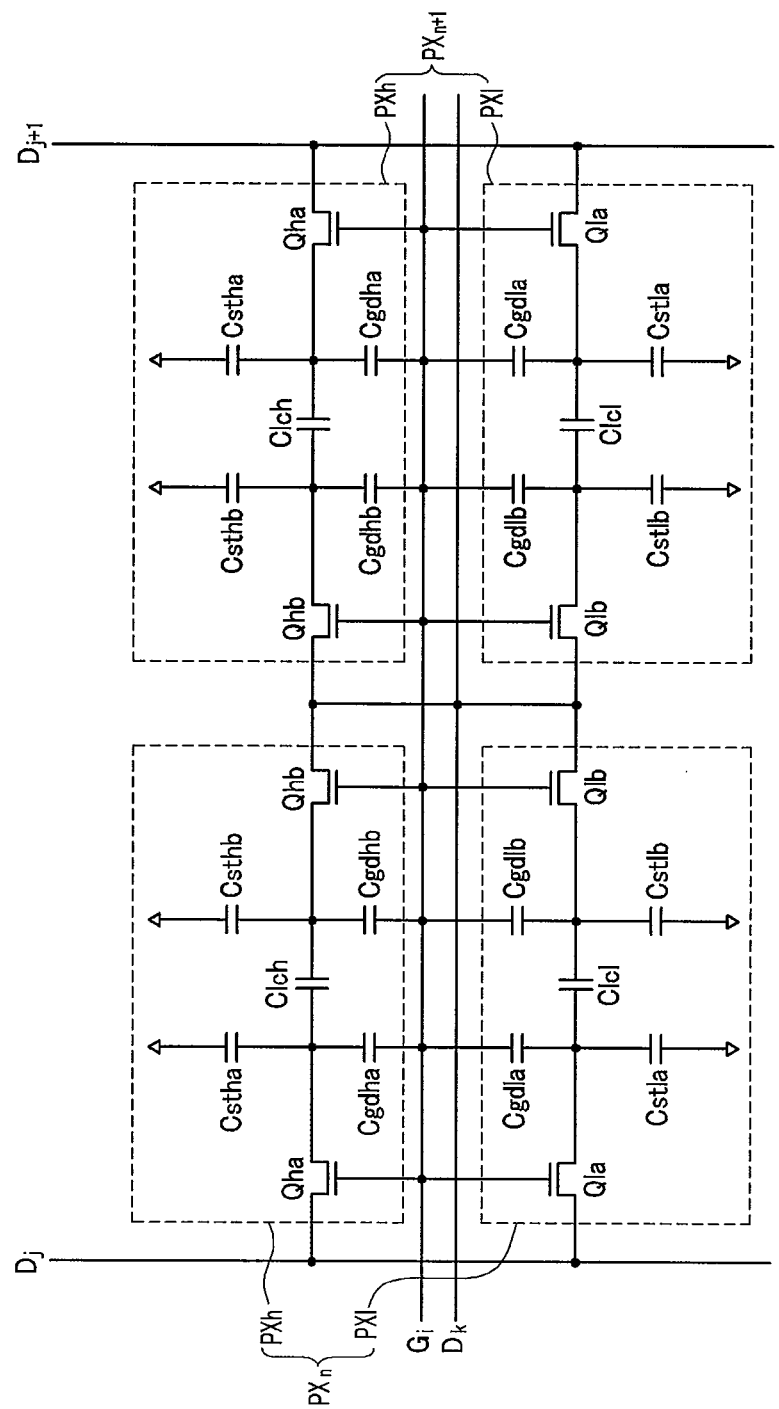

Next, referring to FIG. 56, the liquid crystal panel assembly shown according to the present embodiment is substantially the same as the liquid crystal panel assembly shown in FIG. 55, but the shared data line $D_k$ is not formed between the pixels $PX_n$ and $PX_{n+1}$ and is formed horizontal to the gate line $G_i$. Next, referring to FIG. 57, the liquid crystal panel assembly according to the present embodiment includes a signal line including a gate line $G_i$, first to third data lines $D_j$, $D_{j+1}$, and $D_{j+2}$ adjacent to each other, and a common voltage line (not shown), and two pixels $PX_n$ and $PX_{n+1}$ connected thereto.

The description of each pixel $PX_n$ or $PX_{n+1}$ is the same as the description of the liquid crystal panel assembly shown in FIG. 36, whereby the description thereof will be omitted.

However, in the present embodiment, the second switching element Qb of each of the adjacent pixels $PX_n$ and $PX_{n+1}$ is connected to the gate line $G_i$ and the shared data line $D_{j+1}$.

Figure 57:
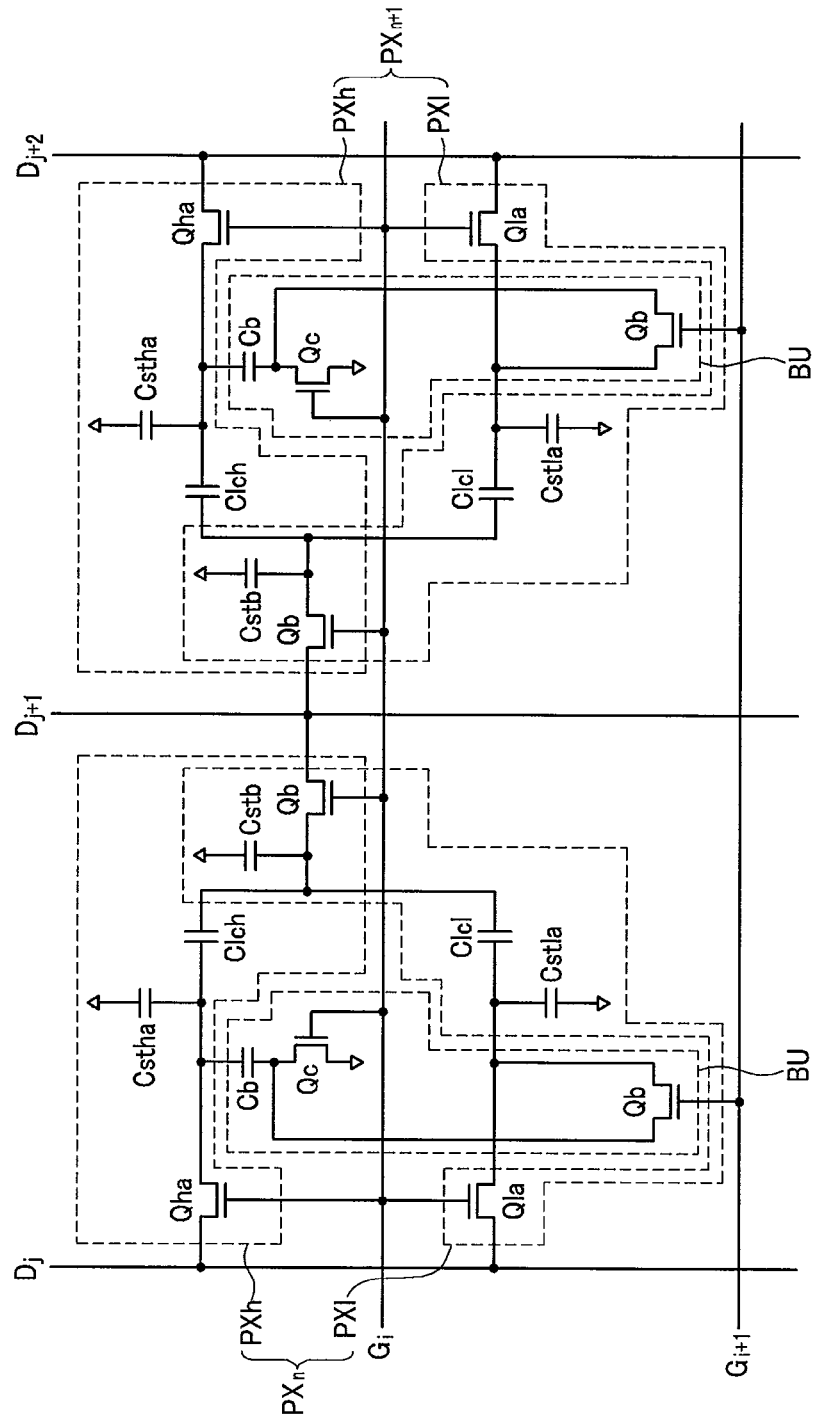
Figure 58:
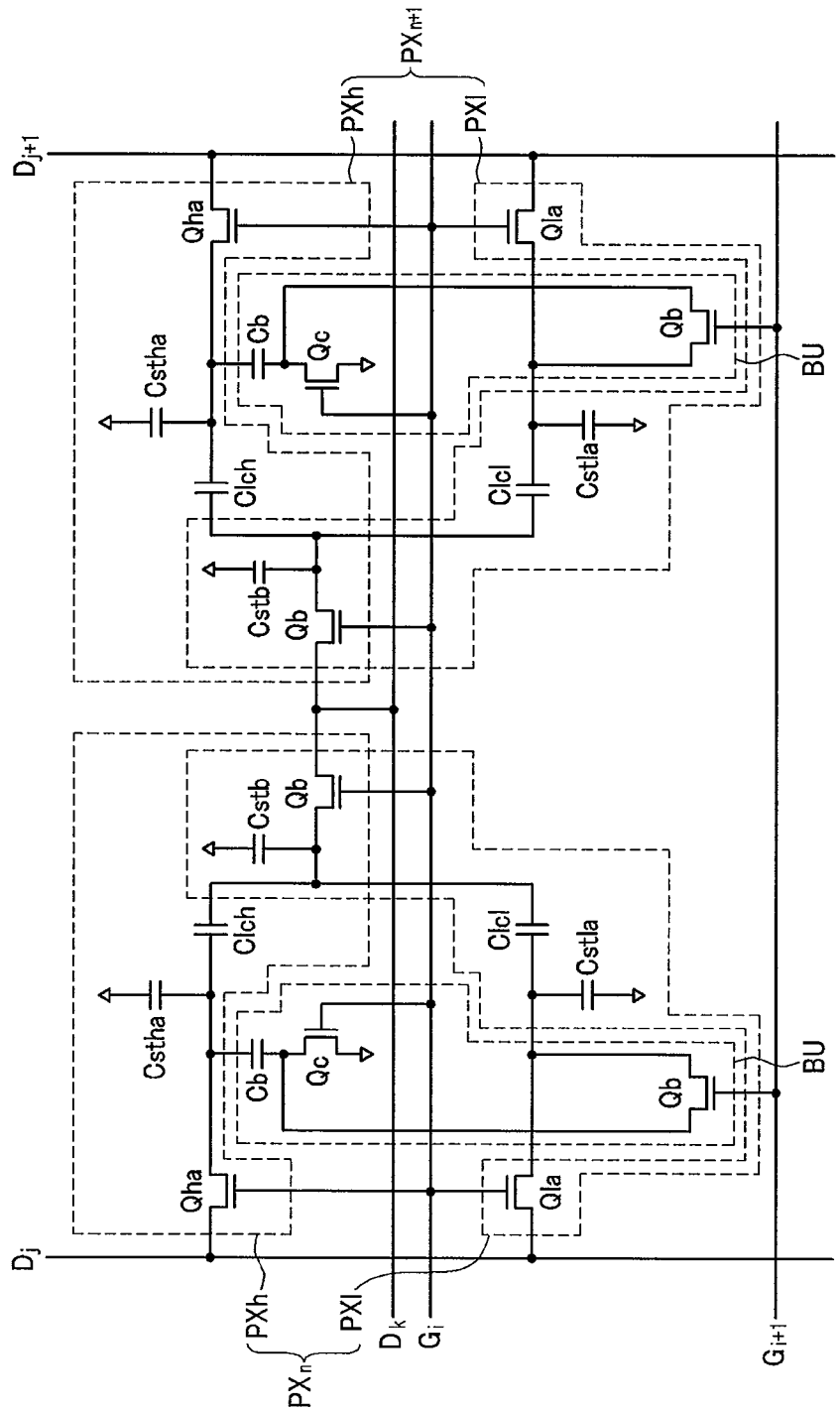

Next, referring to FIG. 58, the liquid crystal panel assembly shown according to the present embodiment is substantially the same as the liquid crystal panel assembly shown in FIG. 57, but the shared data line $D_k$ is not formed between the pixels $PX_n$ and $PX_{n+1}$ and is formed horizontal to the gate line $G_i$.

The driving method shown in FIG. 38 and FIG. 39 may be also applied to the liquid crystal display including the liquid crystal panel assembly shown in FIG. 37 to FIG. 57. Further, liquid crystal molecules of a liquid crystal layer have positive dielectric anisotropy and may be aligned to be vertical to panels 100 and 200 without an electric field. In this case, when the electric field is generated in the liquid crystal layer, the liquid crystal molecules are inclined to be parallel to a direction of the eclectic field, thereby varying a polarization state of light. In the case of using the liquid crystal molecules having the positive dielectric anisotropy, since the liquid crystal molecules have rotation viscosity that is lower than liquid crystal molecules having negative dielectric anisotropy, it is possible to acquire faster response speed, and since the inclination direction of the liquid crystal molecules 31 is defined to the direction of the electric field, the liquid crystal molecules 31 are rearranged even though the liquid crystal molecules 31 are dispersed due to an external influence. Therefore, it is possible to acquire an excellent display characteristic.

According to the present invention, it is possible to improve transmittance by increasing a pixel voltage range that is usable by the liquid crystal display without replacement of the data driver, and the like. Further, it is possible to decrease the manufacturing cost of the driver and improve the aperture ratio of the panels.

According to an embodiment of the present invention, it is possible to secure a high contrast ratio and a wide light viewing angle of the liquid crystal display, and to increase the response speed of the liquid crystal molecules.

In addition, it is possible to acquire the excellent display characteristic without influences such as pressure from the outside of the liquid crystal display, and the like.

Although preferred embodiments of the present invention have been described in detail, it will be apparent that those skilled in the art can make various modifications and changes thereto without departing from the principles and spirit of the general inventive concept, the scope of which is defined in the appended claims and their equivalents.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a plurality of pixels arranged in a matrix;
a plurality of gate lines formed on a substrate and transmitting a gate signal; and
a plurality of first and second data lines formed on the substrate and respectively transmitting first and second data voltages,
wherein a pixel of the plurality of pixels includes a first switching element connected to the gate line and the first data line, a second switching element connected to the gate line and the second data line, and a liquid crystal capacitor connected to the first and second switching elements,
the liquid crystal capacitor includes a first pixel electrode, a second pixel electrode, and a liquid crystal layer having positive dielectric anisotropy and positioned between the first and second pixel electrodes,
the liquid crystal layer is a vertical alignment layer, and
each pixel displays a low-gray image for at least one frame after displaying an image for one or more frames.

2. The liquid crystal of claim 1, wherein the plurality of pixels display the low-gray image for the same frame.

3. The liquid crystal display of claim 2, wherein the low-gray image is displayed for one frame.

4. The liquid crystal display of claim 1, wherein at least one pixel row or at least pixel column among the plurality of pixels displays the low-gray image and the remaining pixels display the image for the same frame.

5. The liquid crystal display of claim 4, wherein two adjacent pixel rows or two adjacent pixel columns sequentially display the low-gray image for two successive frames.

6. The liquid crystal display of claim 4, wherein at least one pixel row displaying the low-gray image simultaneously displays the low-gray image for the same frame.

7. The liquid crystal display of claim 1, wherein a data voltage of the low-gray image is equal to $2/3$ or less than a data voltage of the image.

* * * * *